US012465924B2

(12) United States Patent
Shelkunov

(10) Patent No.: US 12,465,924 B2
(45) Date of Patent: Nov. 11, 2025

(54) EMBODIMENTS OF A MODULAR CONCENTRATING BOWL FOR A CENTRIFUGAL CONCENTRATOR

(71) Applicant: Yury Anatolevich Shelkunov, Barnaul (RU)

(72) Inventor: Yury Anatolevich Shelkunov, Barnaul (RU)

( * ) Notice: Subject to any disclaimer, the term of this patent is extended or adjusted under 35 U.S.C. 154(b) by 0 days.

(21) Appl. No.: 18/272,736

(22) PCT Filed: Mar. 18, 2022

(86) PCT No.: PCT/RU2022/050089

§ 371 (c)(1),
(2) Date: Jul. 17, 2023

(87) PCT Pub. No.: WO2022/197217

PCT Pub. Date: Sep. 22, 2022

(65) Prior Publication Data

US 2024/0299952 A1 Sep. 12, 2024

(30) Foreign Application Priority Data

Mar. 19, 2021 (RU) ............................ RU2021107269
Aug. 6, 2021 (RU) ............................ RU2021123484

(51) Int. Cl.
*B03B 5/32* (2006.01)

(52) U.S. Cl.
CPC .................................... *B03B 5/32* (2013.01)

(58) Field of Classification Search
CPC .................................................... B03B 5/32
USPC .................................................... 209/725
See application file for complete search history.

(56) References Cited

U.S. PATENT DOCUMENTS 3,012,710 A * 12/1961 Steinacker ................ B04B 1/08 494/67
7,144,360 B2 * 12/2006 Zonneveld .............. B04B 15/12 494/80
2006/0135338 A1 * 6/2006 Zonneveld .............. B04B 11/02 494/80

(Continued)

FOREIGN PATENT DOCUMENTS

EA 022542 B1 * 1/2016 ............ B04B 15/12
EA 045985 B1 * 1/2024
JP 2704523 B2 1/1998

(Continued)

*Primary Examiner* — Terrell H Matthews
(74) *Attorney, Agent, or Firm* — Muncy, Geissler, Olds & Lowe, P.C.

(57) ABSTRACT

The options for the modular concentration bowl of the centrifugal concentrator and the options for the method of its manufacture relate to devices designed for mineral dressing, and can be used to separate solid particles by density. As an example, the claimed invention can be used for processing auriferous ores and finely dispersed sands as well as copper and nickel ores that are not amenable to magnetic separation. The objective of the claimed invention is to create a device for gravitational separation of ores with a long service lifetime and convenient in service as well as to develop a method for its manufacture. The technical result of the claimed invention with respect to the device and method is an increase in the service lifetime of the concentration bowl, its maintainability, reliability of the device and ease of manufacture.

34 Claims, 48 Drawing Sheets

(56) References Cited

U.S. PATENT DOCUMENTS

2011/0315621 A1* 12/2011 Heley ........................ B04B 3/04
210/232

FOREIGN PATENT DOCUMENTS

| | | | | | |
|---|---|---|---|---|---|
| RU | 2211864 | C1 | * | 9/2000 | |
| RU | 2579160 | C1 | | 4/2016 | |
| RU | 207391 | U1 | * | 10/2021 | ............... B03B 5/32 |
| WO | WO-2019144179 | A1 | * | 8/2019 | ............... B04B 1/14 |
| WO | WO-2023043338 | A1 | * | 3/2023 | ............... B03B 7/00 |

* cited by examiner

EMBODIMENTS OF A MODULAR CONCENTRATING BOWL FOR A CENTRIFUGAL CONCENTRATOR

TECHNICAL FIELD

The claimed invention relates to devices designed for mineral dressing, and can be used to separate solid particles by density. As an example, the claimed invention can be used for processing auriferous ores and finely dispersed sands as well as copper and nickel ores that are not amenable to magnetic separation.

STATE OF ART

There is a known technical solution disclosed in patent for the invention RU 2579160 C1 (IPC B03B 5/32, H02K 33/00, B04B 7/08, B04B 9/10; published on Apr. 10, 2016) "Centrifugal concentrator" which is a centrifugal concentrator with discontinuous operation. The known device contains a cone-shaped concentration bowl. The inner frame of the concentration bowl is monolithic and consists of a base and a side wall. The side wall of the frame contains a number of metal ribs of the frame. The working surface of the concentration bowl is formed by the inner surface of the concentration bowl and contains a number of ledges formed by the ribs of the frame and cavities located between them.

The known device has a number of disadvantages, namely, the fact that the inner frame of the concentration bowl is made monolithic which excludes the possibility of replacing the upper and lower parts of the concentration bowl independently of each other, and also excludes the possibility of vertical separation of the concentration bowl into interchangeable segments. In addition, in the design of the working surface of the inner frame of the concentration bowl, there are no wear-resistant elements, such as inserts made of wear-resistant material which significantly reduces the service lifetime of the concentration bowl. Also, the working surface of the concentration bowl is made of inelastic material which significantly reduces the service lifetime of the concentration bowl of the known device.

There is a known technical solution disclosed in patent application for the invention WO 2019144179 A1 (IPC B04B 15/06, B04B 7/08, B04B 7/14: published on Aug. 1, 2019) "Bowl for a centrifugal concentrator with discontinuous operation" which is a concentration bowl of a centrifugal concentrator. The known concentration bowl consists of vertical segments hollow inside, each of which consists of two vertical parts. In the construction of the segments, ledges and cavities located between the ledges are made from the inside. Nozzles for the injection of fluidizing liquid are made in the cavities. At least one insert made of wear-resistant material is fixed on the surface of at least one ledge. As one of the possible embodiments of the implementation of the known concentration bowl, inserts made of wear-resistant material can be located inside the ledges of the vertical segments of the concentration bowl.

The known invention has a number of significant disadvantages, namely, the absence of a rigid inner frame with a side wall containing metal ribs in the known concentration bowl. Besides, inserts made of wear-resistant material are fixed on the surface of the segment ledges, that is, on the working surface made of elastic material which increases the risk of separating the insert from the working surface during operation of the claimed invention due to abrasive wear of the working surface. If inserts made of wear-resistant material are located inside the ledges of the segment, the disadvantage is the lack of fastening of the base of the insert to a rigid inner frame, for example, to the metal edge of the inner frame. Accordingly, this type of construction does not provide reliable fastening of inserts made of wear-resistant material which means that it does not provide an increase in the service lifetime of the known invention. In addition, there is no outer frame of the concentration bowl in the design of the known invention which significantly reduces its reliability and reduces the duration of its service lifetime.

As the closest analogue for the concentration bowl of the centrifugal concentrator, the known technical solution disclosed in patent for the invention U.S. Pat. No. 7,144,360 B2 (IPC B04B 11/04; published on Dec. 5, 2006) "Centrifugal separator with a strip-shaped insert element installed in the bowl" which is a centrifugal concentrator with discontinuous operation, was chosen. The known device contains a cone-shaped concentration bowl. The inner frame of the concentration bowl is modular and contains a base and a side wall, the upper part of which is removable. At the same time, the side wall of the inner frame of the concentration bowl, in turn, contains metal ribs forming the ledges on the working surface of the concentration bowl, and cavities for collecting products of gravitational separation of the mixture. The metal ribs of the inner frame are attached to the modular side wall of the inner frame of the concentration bowl by means of fasteners forming an internal support structure. The metal ribs of the inner frame of the concentration bowl, in turn, are covered with an elastic material forming a work surface made with the possibility of replacement. Inserts made of wear-resistant material are attached to the ledges on the working surface formed by the metal ribs of the inner frame. The cavities located between the ledges formed by the ribs of the inner frame on the working surface of the concentration bowl are equipped with nozzles for injecting the fluidizing liquid.

Besides, inserts made of wear-resistant material within the framework of the implementation of the known invention can be fixed in the cavities between the ribs of the inner frame.

The known device works as follows. A mixture is fed into a cone-shaped concentration bowl using a feed device for the source material. After that, the rotation of the concentration bowl is provided. Then a fluidizing liquid is fed through the nozzles, and the components of the mixture with a higher density are collected in the cavities of the working surface after which they are removed using a concentrate unloading device. Besides, light fractions obtained as a result of the gravitational separation process are removed using the tailings removal device.

The known technical solution has a number of significant disadvantages which lies in the fact that inserts made of wear-resistant material are placed on top of the working surface of the concentration bowl and fixed to it with glue. This significantly reduces the service lifetime of the concentration bowl since there is no reliable fastening of inserts made of wear-resistant material. Accordingly, during operation, the working surface is destroyed in the area of contact with inserts made of wear-resistant material and their subsequent separation from the working surface of the concentration bowl.

If inserts made of wear-resistant material are fixed between the ribs of the frame in the cavities, then inserts made of wear-resistant material are designed to prevent abrasive wear of the annular cavities during operation of the known device, and not the annular ledges on the working surface. In turn, this feature does not allow extending the service lifetime of the known concentration bowl since it is the annular ledges of the working surface that are subject to maximum wear during operation. In addition, the design of the known device lacks an external frame as well as the possibility of vertical separation of the upper part of the concentration bowl into interchangeable segments which significantly affects the maintainability of the known device.

With regard to the method of manufacturing the concentration bowl of a centrifugal concentrator, a technical solution disclosed in patent for the invention JP 2704523 B2 (IPC B04B 3/00, B04B 3/04, B04B 7/16; published on Jan. 26, 1998) "Centrifugal separator" is known. In the known device, the concentration bowl is made as follows. First, the inner frame of the cone-shaped concentration bowl is assembled by attaching to the base of the side wall of the inner frame made of nickel. The side wall is also provided with nozzles for injecting the waiting liquid. Next, the side wall is covered with a layer of TiN with a thickness from 0.1 microns to 10 microns thereby creating a coating of wear-resistant material after which the ledges are fixed on the inner surface of the side wall of the inner frame.

The known method of manufacturing a concentration bowl of a centrifugal concentrator has a significant disadvantage which is that the described method does not allow creating a concentration bowl, the working surface and ledges of which were protected by a wear-resistant material ensuring a long service lifetime of the resulting concentration bowl.

There is a known technical solution disclosed in patent application for the invention WO 2019144179 A1 (IPC B04B 15/06, B04B 7/08, B04B 7/14; published on Aug. 1, 2019) "Bowl for a centrifugal concentrator with discontinuous operation". In the known invention, the method of manufacturing the concentration bowl of the centrifugal concentrator is disclosed. First, hollow vertical segments are made inside, consisting of two vertical parts. On the inside of the vertical segments, ledges and cavities located between the ledges are performed. After that, nozzles for injecting the fluidizing liquid are carried out in the cavities. Further, at least one insert of wear-resistant material is fixed on the surface of at least one ledge. As one of the possible embodiments for implementing the method of manufacturing the known concentration bowl, inserts made of wear-resistant material can be placed inside the ledges of the vertical segments of the concentration bowl. After that, the vertical segments are connected to each other to obtain the concentration bowl.

The known method of manufacturing the concentration bowl has a number of significant disadvantages, namely, the absence of a rigid inner frame with a side wall containing metal ribs in the concentration bowl obtained according to this manufacturing method. In addition, within the framework of the known manufacturing method, inserts made of wear-resistant material are fixed on the surface of the segment ledges, that is, on the working surface made of elastic material, which increases the risk of separating the insert from the working surface during operation of the resulting concentration bowl due to abrasive wear of the working surface. If inserts made of wear-resistant material are located inside the ledges of the segment, the disadvantage is the lack of fastening of the base of the insert to a rigid inner frame, that is, to the metal edge of the inner frame. Accordingly, this type of design of the concentration bowl obtained according to the known manufacturing method does not provide reliable fastening of inserts made of wear-resistant material, which means that it does not ensure the manufacture of a concentration bowl with a long service life. Besides, this type of design of the concentration bowl obtained according to the known manufacturing method does not provide reliable fixation of the segments of the concentration bowl relative to each other due to the absence of an external frame of the concentration bowl which also significantly affects the maintainability of the device obtained according to the known method.

As the closest analogue regarding the manufacturing method of the concentration bowl, the known technical solution disclosed in patent for the invention U.S. Pat. No. 7,144,360 B2 (IPC B04B 11/04; published on Dec. 5, 2006) "Centrifugal separator with a strip-shaped insert element installed in the bowl". In the known invention, the method for manufacturing the concentration bowl of a centrifugal concentrator is disclosed in which the side wall of the inner frame of the concentration bowl, equipped with a removable upper part, and the lower part of the concentration bowl are first mounted, then metal ribs of the inner frame are mounted on the side wall of the inner frame and fixed with fasteners. As one of the embodiments, fasteners are first mounted on the side wall at the locations of the metal ribs of the inner frame, and then metal ribs of the inner frame are placed on the fasteners. After that, an elastic material is applied to the surface of the metal ribs of the inner frame, with the formation of the working surface. After that, the cavities located between the metal ribs of the inner frame are provided with nozzles for injecting the waiting liquid. After that, inserts made of wear-resistant material are attached to the ledges on the working surface formed by the metal ribs of the inner frame with glue on top of the working surface.

Besides, inserts made of wear-resistant material within the framework of the implementation of the known invention can be fixed in the cavities between the ribs of the inner frame.

If inserts made of wear-resistant material are fixed in the cavities between the ribs of the inner frame, then inserts made of wear-resistant material are designed to prevent abrasive wear of the cavities during operation of the known device, and not ledges on the working surface. In turn, this feature does not allow extending the service lifetime of the known concentration bowl since it is the ledges of the working surface that are subject to maximum wear during operation.

The known method of manufacturing the concentration bowl of a centrifugal concentrator has a significant disadvantage due to the fact that the installation of inserts made of wear-resistant material is carried out on top of the working surface. Thus, during operation, the elastic material of the working surface under the inserts is worn out and the inserts are disconnected from it. Besides, only the upper part of the concentration bowl obtained according to the known method will be made with the possibility of independent replacement while the lower part remains rigidly fixed. Besides, this type of design of the concentration bowl, obtained according to the known manufacturing method, does not provide the possibility of vertical separation of the upper part of the concentration bowl into interchangeable segments, fixed, including the outer frame of the upper part of the concentration bowl, due to its absence, which significantly affects the maintainability of the known device.

BRIEF DESCRIPTION OF THE INVENTION

The objective of the claimed invention is to create a device for gravitational separation of ores with a long service lifetime and convenient in service as well as to develop a method for its manufacture.

The technical result of the claimed invention with respect to the device and method is an increase in the service lifetime of the concentration bowl, its maintainability, reliability of the device and ease of manufacture.

The claimed technical result with respect to the elements of the device is achieved as follows.

The modular concentration bowl is proposed, consisting of interconnected upper and lower parts as well as the working surface attached to them. In this case, the upper part of the bowl has an internal frame, the working surface covers the inner surface of the upper part of the concentration bowl with the formation of ledges and cavities between the ledges. At the same time, at least one insert is attached to the inner frame of the upper part of the bowl to form at least one ledge.

The uniqueness of the proposed technical solution consists in the presence of at least one insert in the design of the claimed modular concentration bowl, on the one hand—used to form at least one ledge, and on the other—attached to the inner frame of the upper part of the modular concentration bowl. It is this feature that ensures the maintainability of the claimed invention as well as its reliability and long service lifetime. In addition to this, the presence in the design of the claimed modular concentration bowl of at least one insert used to form at least one ledge and attached to the inner frame of the upper part of the modular concentration bowl ensures ease of manufacture of the claimed device.

Within the framework of the implementation of the claimed invention, at least one insert can be made of a wear-resistant material. Also, at least one insert can be made reinforcing. At the same time, at least one insert of wear-resistant material attached to at least one reinforcing insert can be used to form at least one ledge within the framework of the implementation of the claimed invention.

Within the framework of any of the possible approaches in the implementation of the claimed device, the insert is fixed with the material of the working surface, and the material of the working surface itself in this case may also include an epoxy compound with filler.

In the design of the claimed invention, an insert made of a wear-resistant material can be made protruding from the level of the working surface. Besides, at least one insert made of wear-resistant material can be fixed by the material of the working surface, at least on two sides.

Within the framework of the implementation of the claimed device, the inner frame of the upper part of the bowl may contain ribs, and at least one insert of wear-resistant material can be fixed on at least one rib.

Besides, the inner frame of the upper part of the bowl can contain ribs, and at least one reinforcing insert and at least one insert made of wear-resistant material can be attached to at least one rib.

One of the possible approaches in the implementation of the claimed invention is the use of at least one insert to form at least one ledge close to the border of the upper and lower parts of the bowl. At the same time, all the ledges of the claimed device can be formed using inserts.

The insert made of wear-resistant material can be made in the form of a set of rectangular elements in the plan.

At the same time, the rib with an insert can be additionally equipped with a shell.

At least one ledge of the upper part of the concentration bowl can be made with the possibility of independent replacement. In turn, the upper part and the lower part of the concentration bowl can be made with the possibility of independent replacement, and also the upper part of the bowl can be made of segments with the possibility of their independent replacement.

Within the framework of the implementation of the claimed invention, the cavities of the working surface of the upper part of the concentration bowl can be additionally equipped with nozzles.

Within the framework of the implementation of the claimed invention, the angle of inclination of the side wall of the frame to the horizontal surface and the angle of inclination of the working surface to the horizontal surface can range from 15° to 90°.

Regarding the claimed method of manufacturing the modular concentration bowl, the claimed technical result is achieved as follows.

The method of manufacturing the modular concentration bowl, which consists in attaching at least one insert to the inner frame of the upper part of the concentration bowl, covering the inner surface of the upper part of the concentration bowl with the material of the working surface after which the lower part of the concentration bowl is attached, is proposed.

Within the framework of the implementation of this embodiment of the method of manufacturing the modular concentration bowl, before applying the material of the working surface, at least one insert can be attached to the inner frame of the upper part of the concentration bowl to form at least one ledge.

Regarding the claimed method of manufacturing the modular concentration bowl, the claimed technical result is achieved as follows.

The method of manufacturing the modular concentration bowl, lying in the fact that the inner surface of the upper part of the concentration bowl is covered with the working surface material, at least one ledge is attached to the inner frame of the upper part of the concentration bowl, for the formation of which at least one insert is used after which the lower part of the concentration bowl is attached, is proposed.

The uniqueness of the implementation embodiment of the claimed method lies in the manufacture of the modular concentration bowl.

The method of manufacturing the modular concentration bowl is proposed which consists in mechanically removing the worn-out upper part of the modular concentration bowl from the inner surface. At the same time, within the framework of one of the implementation embodiment of the claimed method, at least one insert is first attached to the inner frame of the upper part of the concentration bowl, and then the material of the working surface is applied after which chemical etching of the mechanically treated surface is carried out and the surface of the annular ribs is restored. After that, at least one annular rib is provided with an insert made of wear-resistant material and with the formation of ledges and cavities between the ledges, and at least one ledge is formed using at least one insert attached to the inner frame of the upper part of the concentration bowl. At the same time, during the application of the working surface material, additional fixation of at least one insert used to form, at least one ledge can be carried out with the working surface material from at least two sides.

Within the framework of the implementation of another embodiment of the claimed method, the inner surface of the upper part of the concentration bowl is first covered with the material of the working surface, and then at least one ledge is attached to the inner frame of the upper part of the concentration bowl, for the formation of which at least one insert is used. This approach makes it possible to perform at least one ledge with the possibility of independent replacement.

Nevertheless, any of the possible implementation embodiments of the claimed method ensures ease of manufacture, as well as reliability, long service lifetime of the resulting device and its maintainability.

Within the framework of any of the possible implementation embodiments of the claimed method, the reinforcing insert can be used as an insert, and an insert made of wear-resistant material can also be used as an insert. At the same time, at least one insert of wear-resistant material attached to at least one reinforcing insert can be attached to the inner frame of the upper part of the concentration bowl. In turn, ledges can be made in the working surface, and cavities can be made between the ledges. In this case, the cavities can be supplied with nozzles.

At least one insert made of wear-resistant material can be used to form at least one ledge close to the border of the upper and lower parts of the concentration bowl.

In turn, the inner frame of the upper part of the concentration bowl can be provided with ribs, and at least one insert of wear-resistant material can be attached to the rib. At the same time, all the ribs can be provided with inserts within the framework of any of the possible implementation options of the claimed method of manufacturing the modular concentration bowl.

At least one rib can be additionally provided with the shell, and the insert made of wear-resistant material can be attached to the shell.

The proposed modular concentration bowl is reliable, easy to use, is maintainable and has a long service lifetime, and the method of their manufacture is simple, due to the presence in the design of the claimed modular concentration bowl, at least one ledge, for the formation of which at least one insert attached to the inner frame of the claimed modular concentration bowl is used. Within the framework of the implementation of the claimed method, it is possible both to fix the inserts with the material of the working surface of the upper part of the concentration bowl, and to perform at least one ledge, for the formation of which at least one insert with the possibility of independent replacement was used, which also provides additional reliability of the device, its maintainability and the service lifetime of the concentration bowl.

DESCRIPTION OF THE DRAWINGS

The essence of the invention is explained by drawings, where.

The features of the invention are disclosed in the following description and attached images explaining the invention. Within the framework of this invention, alternative embodiments of its implementation can be developed. Besides, the known elements of the invention will not be described in detail or will be omitted so as not to overload the description of the present invention with details.

The Detailed Description of the Invention in Terms of the Device.

Figure 10:
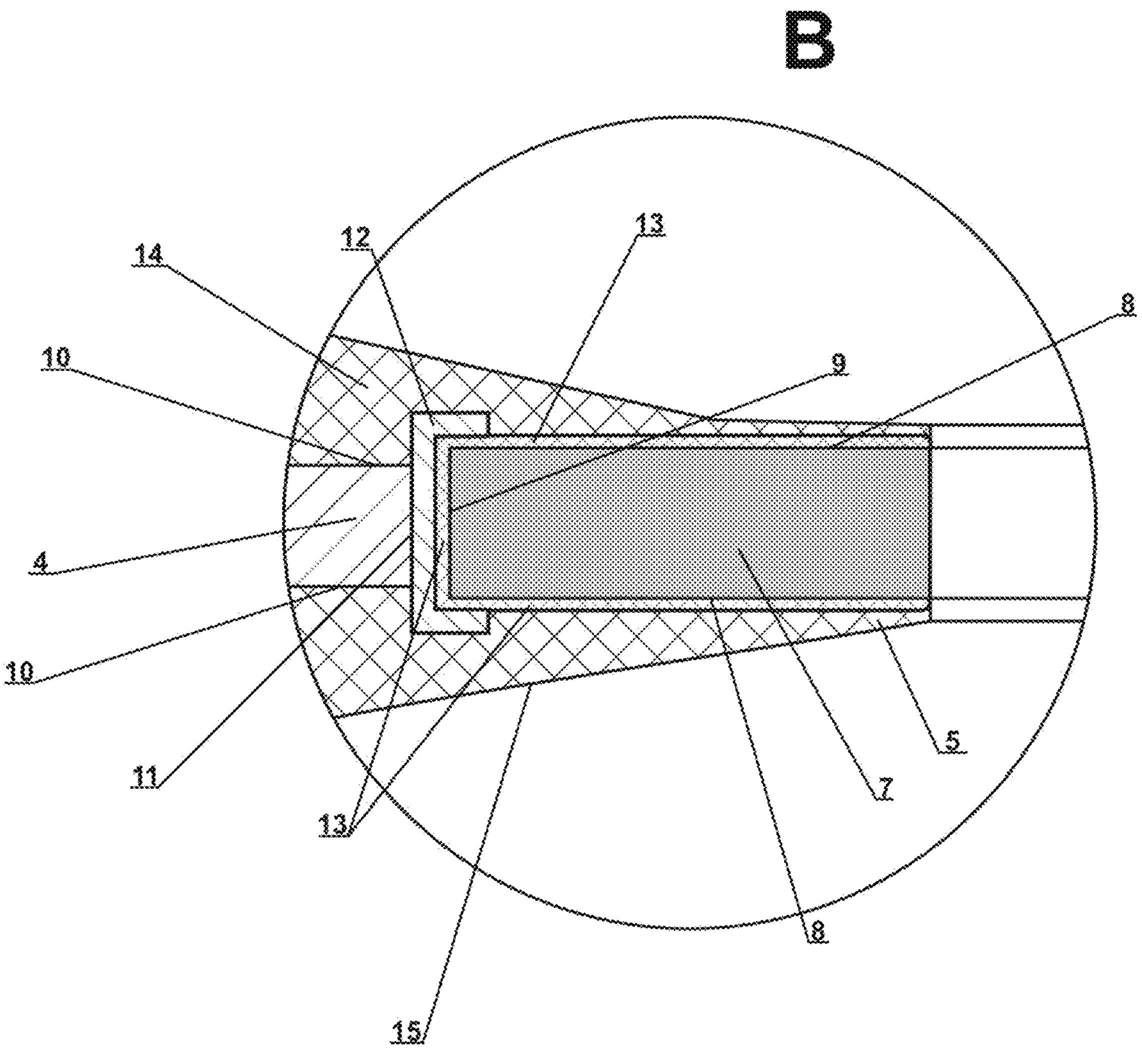
FIG. 10 shows area B illustrating the relative position of retaining shell 12, ledge 5, end surface 11 of rib 4 of inner frame 3 and inserts 7 of wear-resistant material, side surfaces 8 of which are provided with additional connecting layer 13, side view.

The main component exposed to maximum abrasion during operation of the centrifugal concentrator is its concentration bowl. In the claimed invention, the concentration bowl is modular. The concentration bowl consists of two parts: upper part 1 of the concentration bowl and lower part 2 of the concentration bowl, as shown in FIG. 10. In this case, upper part 1 of the concentration bowl and lower part 2 of the concentration bowl are made with the possibility of replacement, independently of each other. This design of the concentration cone ensures the convenience of using the claimed invention, and also increases the service lifetime of the centrifugal concentrator, the functional element of which is the claimed modular concentration bowl.

The side wall of inner frame 3 of upper part 1 of the concentration bowl is made in such a way that the angle of inclination of the side wall of inner frame 3 of upper part 1 of the concentration bowl is from 15° to 90° inclusive to the horizontal surface. Thus, if the angle of inclination of the side wall of inner frame 3 of upper part 1 of the concentration bowl is at least 15° but less than 90° to the horizontal surface then in the longitudinal section the concentration bowl has essentially the shape of a truncated cone facing its wide part upwards which ensures the reliability and simplicity of the claimed device as well as its maintainability. Thus, in this case, the concentration bowl can be made of a cone shape as shown in FIGS. 1-3, 26, 30, 32, 34, 35, 43 and 50.

If the angle of inclination of the side wall of inner frame 3 of upper part 1 of the concentration bowl is 90° then in the longitudinal section the concentration bowl has essentially the shape of a cylinder. Thus, in this case, the concentration bowl can be made of a cylindrical shape as shown in FIGS. 4-7, 24 and 25 which ensures the simplicity of manufacturing the claimed invention, its reliability and maintainability.

Figure 8:
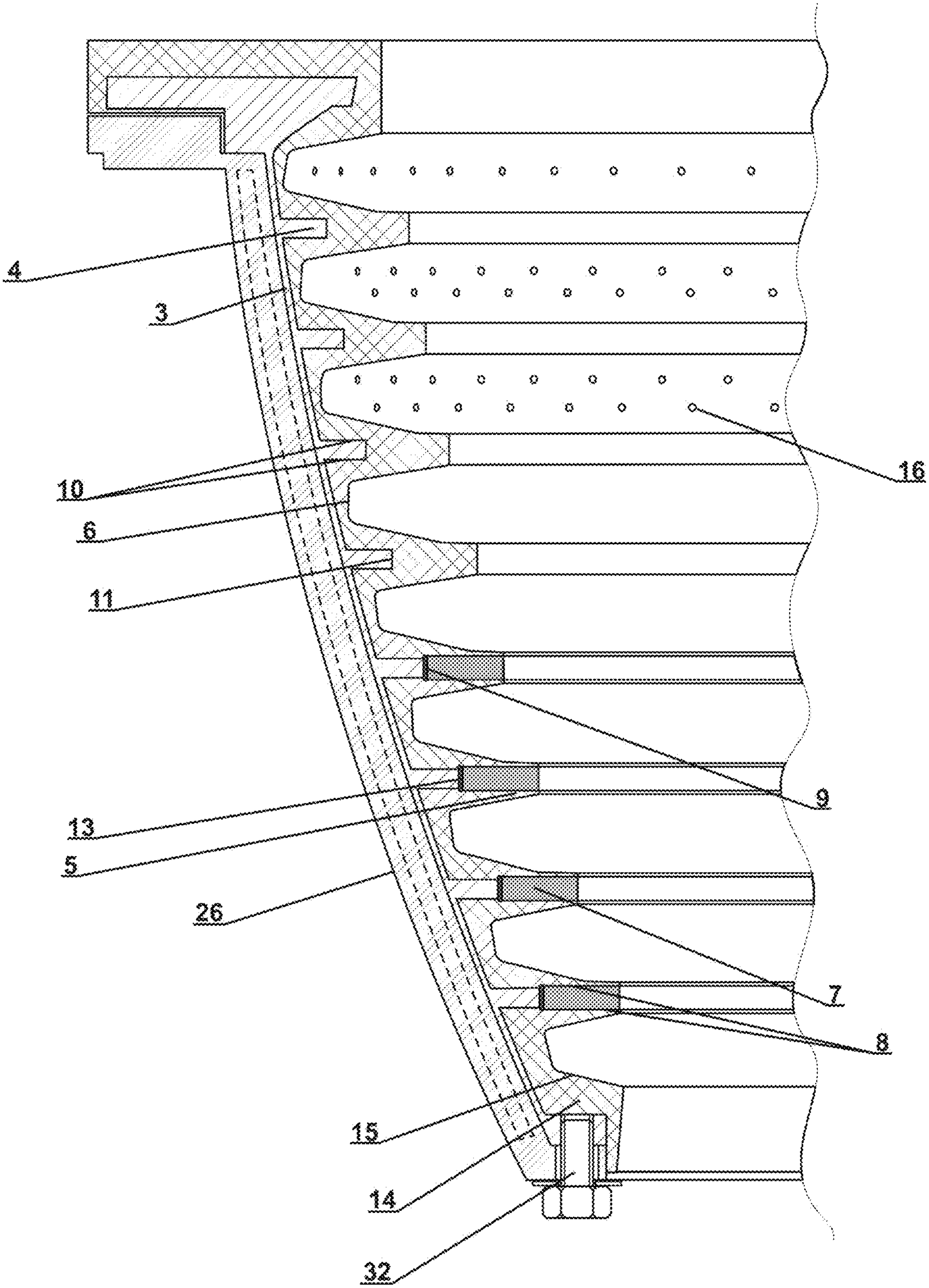
FIG. 8 shows the embodiment of executing upper part 1 of the modular concentration bowl equipped with outer frame 26 with guides 29 and the side wall of inner frame 3 of curvilinear shape, side view.

Besides, the side wall of inner frame 3 of upper part 1 of the concentration bowl can be made of a curved shape as shown in FIG. 8, or the angle of inclination of the side wall of inner frame 3 of upper part 1 of the concentration bowl can be made variable and can vary in the range from 15° to 90° to the horizontal surface.

The side wall of inner frame 3 of upper part 1 of the concentration bowl may additionally contain ribs 4 of inner frame 3 of upper part 1 of the concentration bowl, arranged horizontally, as shown in FIGS. 1-8, 11-15, 18, 19, 24-43 and 50.

If the angle of inclination of the side wall of inner frame 3 of upper part 1 of the concentration bowl is not less than 15° but less than 90° to the horizontal surface or is variable in the range from 15° to 90° to the horizontal surface, ribs 4 of inner frame 3 of upper part 1 of the concentration bowl in the design of the claimed invention can be made of various lengths and can be arranged in such a way that the length of ribs 4 of inner frame 3 of upper part 1 of the concentration bowl, attached to the side wall of inner frame 3 of upper part 1 of the concentration bowl, can increase in the direction from bottom to top, with the formation of a cone shape of the claimed concentration bowl which ensures the reliability of the claimed device, an increase in its service lifetime as well as the simplicity of manufacturing the claimed invention.

If the angle of inclination of the side wall of inner frame 3 of upper part 1 of the concentration bowl is 90°, ribs 4 of inner frame 3 of upper part 1 of the concentration bowl in the design of the claimed invention can be made of the same length in longitudinal section as shown in FIGS. 4-7 and 24 which ensures ease of manufacture of the claimed invention and its maintainability.

In the design of the claimed invention, ribs 4 of inner frame 3 of upper part 1 of the concentration bowl, if they are supplied to the side wall of inner frame 3, include side faces 10 of ribs 4 of inner frame 3 of upper part 1 of the concentration bowl and end surface 11 of ribs 4 of inner frame 3 of upper part 1 of the concentration bowl and can be made wedge-shaped or rectangular in cross-section. In turn, the angle of inclination of side faces 10 of ribs 4 of inner frame 3 of upper part 1 of the concentration bowl can range from 0° to 45°.

As a material for ribs 4 of inner frame 3 of upper part 1 of the concentration bowl, any known metal of high strength, for example, steel of the corresponding grades, composite material with a suitable set of properties or polymers with a suitable set of properties can be used, which is necessary to ensure the reliability of the claimed device, increase its service lifetime as well as ease of manufacture of the claimed invention and ensure its maintainability. In the case of supplying the side wall of inner frame 3 of upper part 1 of the concentration bowl with ribs 4, ribs 4 of inner frame 3 of upper part 1 of the concentration bowl can be attached to the side wall of inner frame 3 of upper part 1 of the concentration bowl via any known way. As an example, ribs 4 of inner frame 3 of upper part 1 of the concentration bowl can be attached to the side wall of inner frame 3 of upper part 1 of the concentration bowl by screw connection, bolt connection, rivet connection, welded connection, glued to the side wall of inner frame 3 of upper part 1 of the concentration bowl, soldered to the side wall of inner frame 3 of upper part 1 of the concentration bowl or connected to it according to the "mortise and tenon" principle with the appropriate additional fasteners (not shown in the drawings).

Figure 26:
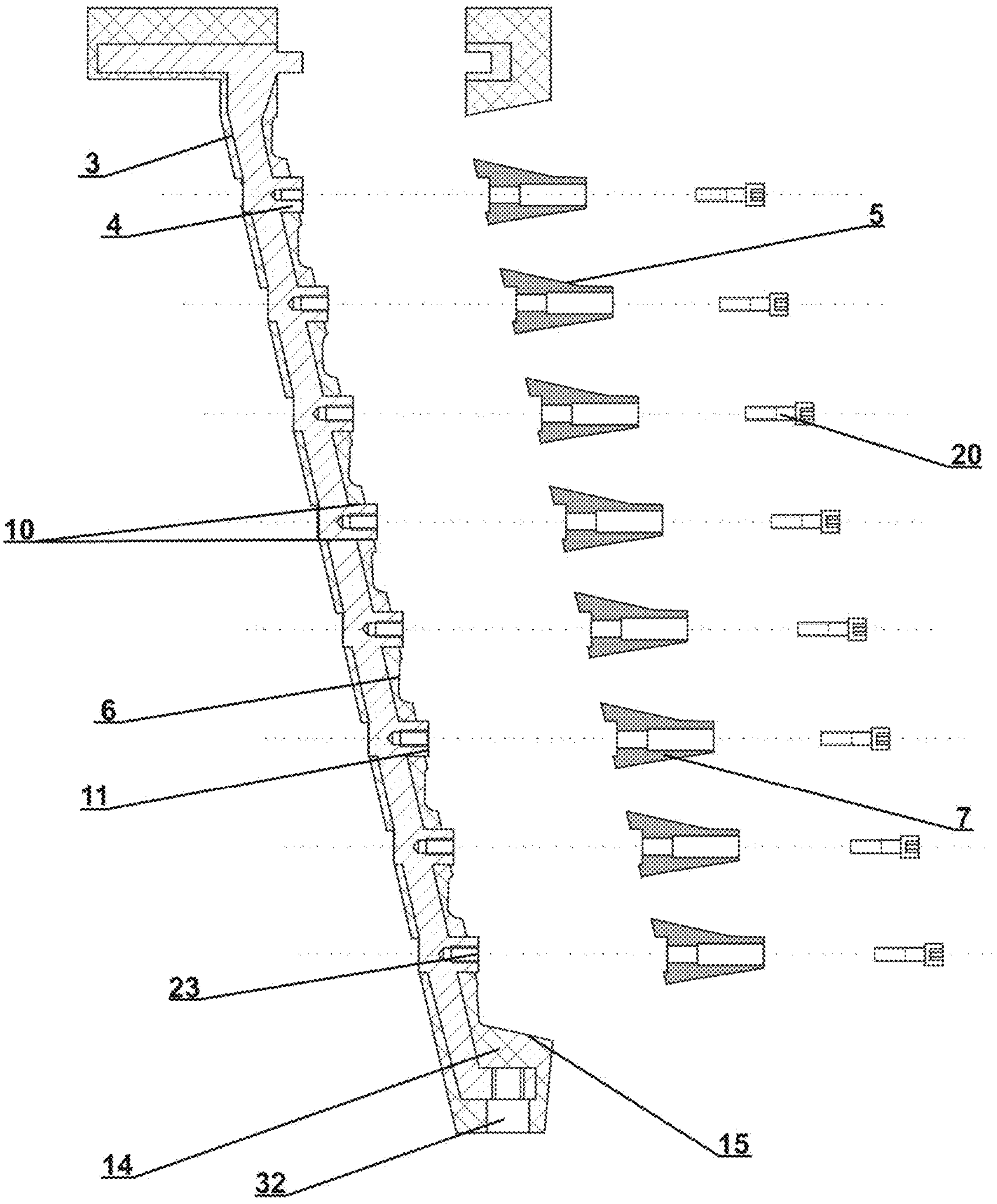
FIG. 26 shows the embodiment of attaching ledges 5, made with the possibility of independent replacement to the side wall of inner frame 3 of upper part 1 of the concentration bowl where fasteners 20 are located on the side of the internal volume of the modular concentration bowl, side view.
Figure 27:
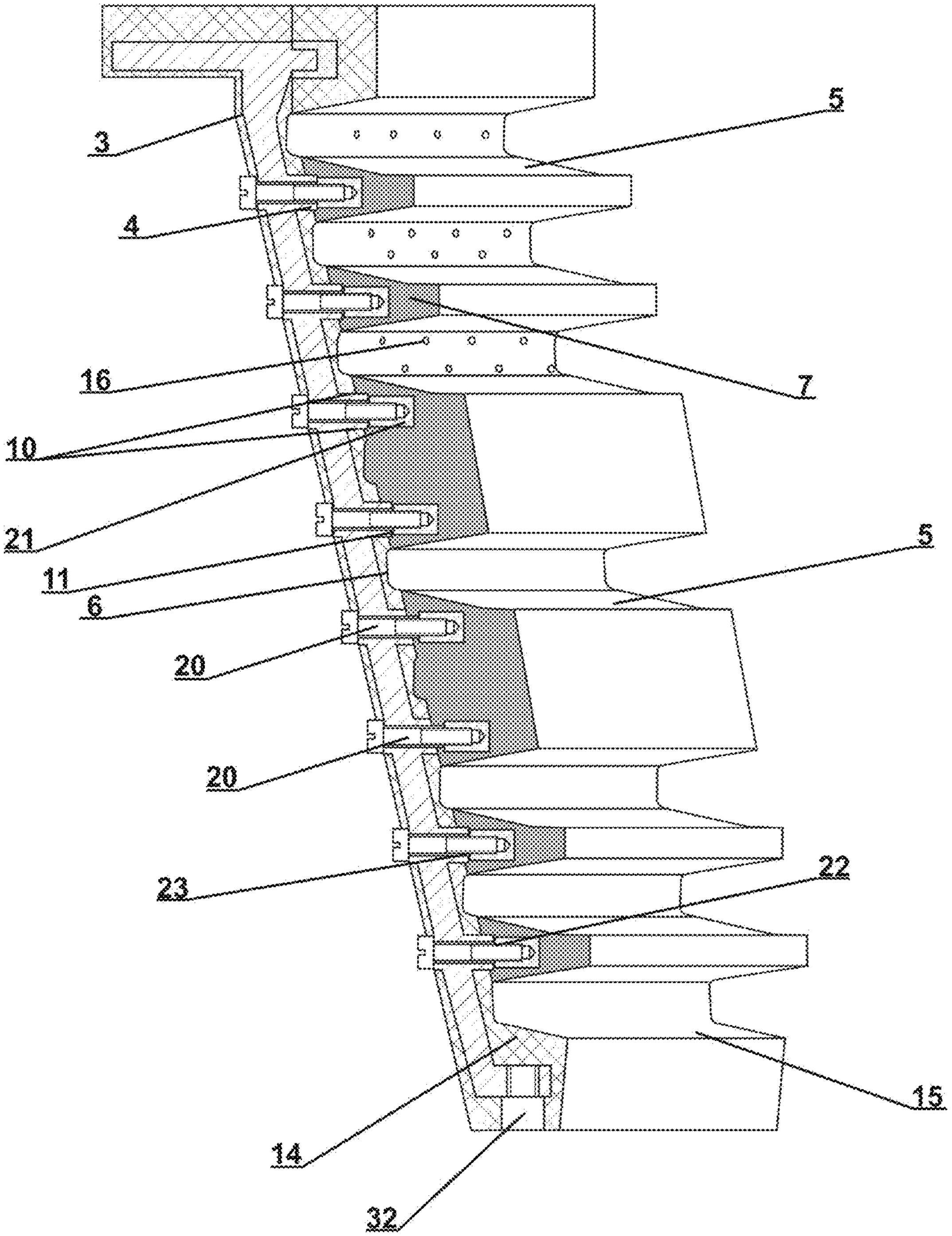
FIG. 27 shows the embodiment of implementing upper part 1 of the concentration bowl, at least one ledge 5 of which is trapezoidal in shape and fixed to the side wall of inner frame 3 with at least two fasteners 20, side view.

On the side of the free volume, inside the claimed concentration bowl, the side wall of inner frame 3 of upper part 1 of the concentration bowl is covered with material 14 of working surface 15, used to form ledges 5 and cavities 6 on working surface 15, located between ledges 5, respectively. Ledges 5 in the design of the claimed invention may have a V-shaped cross-section as shown in FIGS. 1-10, 14-25, 30-36, 43, 44-46 and 50, a U-shaped or trapezoidal shape which is shown in FIG. 27. At the same time, in the case of the implementation of ledges 5 with trapezoidal cross-section, the angle of inclination of the side faces of ledges 5 can range from 0° to 135°. In turn, cavities 6 located between the ledges 5 can also have a V-shaped cross-section as shown in FIGS. 1-8, 14-27, 30, 32, 34, 35, 37-43, 44 and 50. Also, cavities 6 located between ledges 5 may have a trapezoidal or U-shaped cross-section. The described embodiments for the design of cavities 6 within the framework of the implementation of the claimed invention ensure its reliability.

In turn, the outer side of inner frame 3 of upper part 1 of the concentration bowl can also be covered with material 14 which ensures the maintainability of the claimed invention.

Besides, in the body of working surface 15, in the area of cavities 6, there are also injector compliances of nozzles 16 for injecting a fluidizing liquid. Within the framework of the implementation of the claimed invention, nozzles 16 for the injection of a fluidizing liquid can be made in the form of round holes as shown in FIGS. 14, 16, 18, 20, 22, 27, 34, 37, 39, 41, 43 and 44 which ensures the reliability of the claimed device.

As a material 14, any known elastic material, wear-resistant material or a combination of them can be used to perform working surface 15 of the concentration bowl. As an example of an elastic material when performing material 14, polyurethane, silicone, polyethylene, thermoplastic, raw rubber, rubber and their derivatives, including polyurethane, silicone, polyethylene, thermoplastic, raw rubber or rubber, as well as any other similar known materials, as well as any combinations thereof, can be used. Any known ceramics, aluminum oxide, zirconium oxide, titanium nitride, technical diamond, composite materials, or any other similar material can be used as a wear-resistant material as well as any combinations thereof when performing material 14. Also, materials containing metal carbides, for example, tungsten carbide, or nonmetal carbides, for example, silicon carbide or any other known metal carbides or nonmetal carbides, as well as any combinations thereof, can be used as a wear-resistant material when performing material 14. High-chromium steels or high-manganese steels can also be used as a wear-resistant material when performing material 14. Besides, epoxy compound 17 with the filler can be used as a wear-resistant material when performing material 14, which can be used, for example, any known ceramics, aluminum oxide, zirconium oxide, titanium nitride as well as metal and nonmetal carbides, for example, silicon carbide or tungsten carbide, or technical diamond. Such a choice of material 14 for performing working surface 15 of the concentration bowl within the framework of the implementation of the claimed invention provides an increase in the service lifetime of the modular concentration bowl, the reliability of the claimed device as well as the simplicity of its manufacture.

In this case, if material 14 of working surface 15 is elastic, working surface 15 can be made entirely of one elastic material 14. Besides, material 14 made elastic and used to perform cavities 6, and material 14 made elastic and used to perform at least one ledge 5, can perform different from each other.

If the side wall of inner frame 3 of upper part 1 of the concentration bowl in the design of the claimed invention is provided with ribs 4 of inner frame 3 of upper part 1 of the concentration bowl, each rib 4 of inner frame 3 of upper part 1 of the concentration bowl from the side of the free volume, inside the claimed concentration bowl can be used to form ledge 5 on working surface 15 as shown in FIGS. 1-15, 18, 19, 25-43 and 50. In this case, between ribs 4 of inner frame 3 of upper part 1 of the concentration bowl, there are sections of the side wall of inner frame 3 of upper part 1 of the concentration bowl. Consequently, between ledges 5 on working surface 15, for the formation of which ribs 4 of inner frame 3 of upper part 1 of the concentration bowl can be used, cavities 6 are located on working surface 15 which is necessary to ensure an effective process of gravitational separation of the source material during the operation of the claimed device.

In the claimed invention, in order to ensure its maintainability, at least one insert 7 of wear-resistant material can be attached to the side wall of inner frame 3 of upper part 1 of the concentration bowl as shown in FIGS. 16, 17 and 20-23. If the side wall of inner frame 3 of upper part 1 of the concentration bowl is made with at least one insert 7 of wear-resistant material attached to the side wall of inner frame 3 of upper part 1 of the concentration bowl at least one insert 7 of wear-resistant material can be used to form at least one ledge 5 of upper part 1 of the concentration bowl (FIGS. 1-10, 15, 17, 19, 23, 35, 36, 38, 40, 42, 43 and 50). The surface of inserts 7 made of wear-resistant material includes side faces 8 and 7 made of wear-resistant material and base 9 of inserts 7 made of wear-resistant material.

Within the framework of the implementation of the claimed invention, in the cross section of insert 7 made of wear-resistant material can be made wedge-shaped, rectangular or trapezoidal. In turn, the angle of inclination of side faces 8 of inserts 7 made of wear-resistant material can range from 0° to 45°. Besides, inserts 7 made of wear-resistant material can be made of rectangular shape in cross-section.

Figure 11:
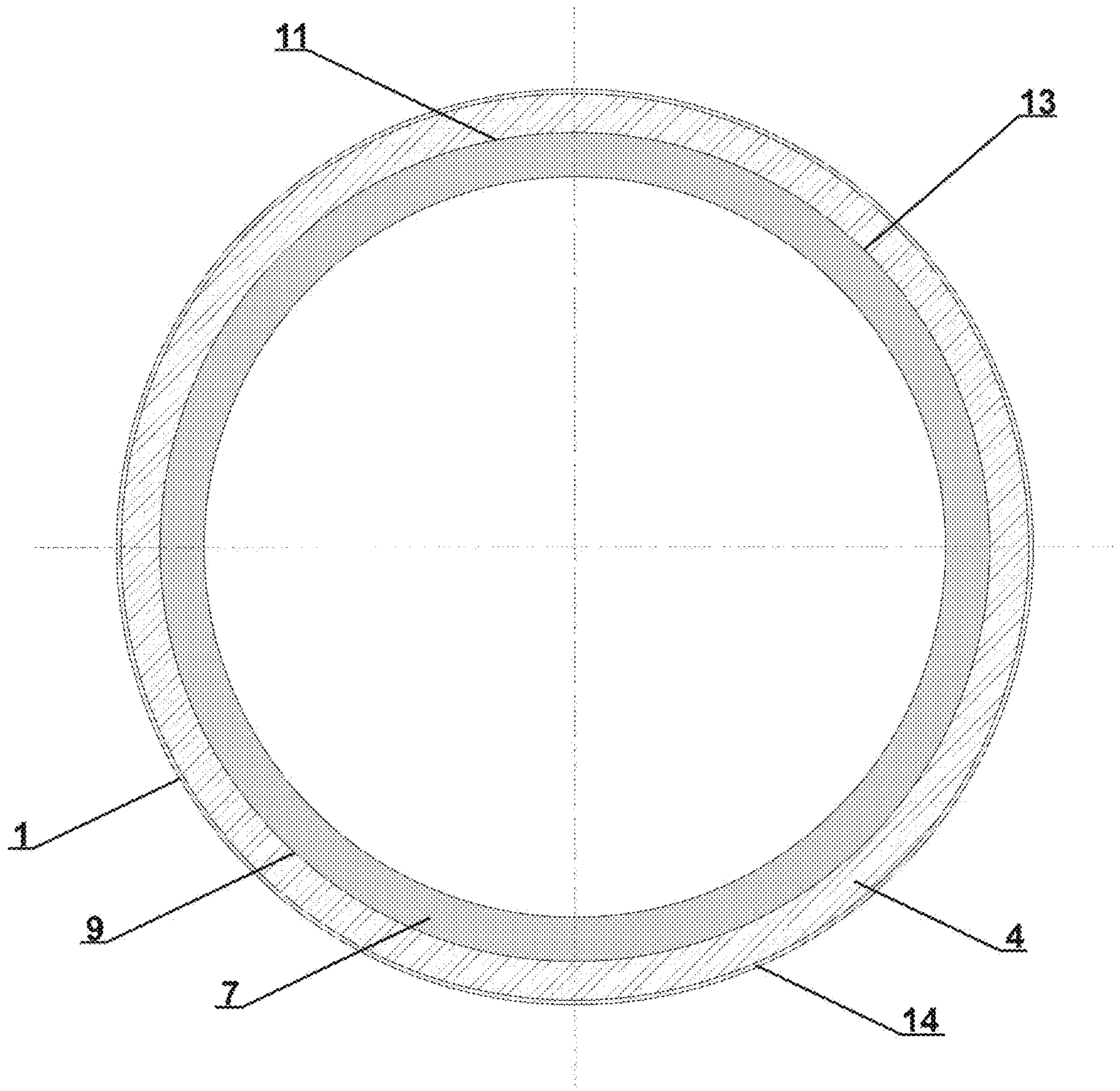
FIG. 11 shows the embodiment of implementing insert 7 made of wear-resistant material, performed in an annular shape in plan.

Within the framework of the implementation of the claimed invention, inserts 7 made of wear-resistant material can be implemented in any shape in the plan. As an example, inserts 7 made of wear-resistant material can be made in the form of a monolithic ring as shown in FIG. 11. Thus, in this embodiment, inserts 7 made of wear-resistant material can be made of an annular shape in longitudinal section. Such an embodiment of inserts 7 made of wear-resistant material within the framework of the implementation of the claimed invention ensures the reliability of the claimed invention, an increase in its service lifetime as well as the simplicity of manufacturing the claimed device.

Figure 12:
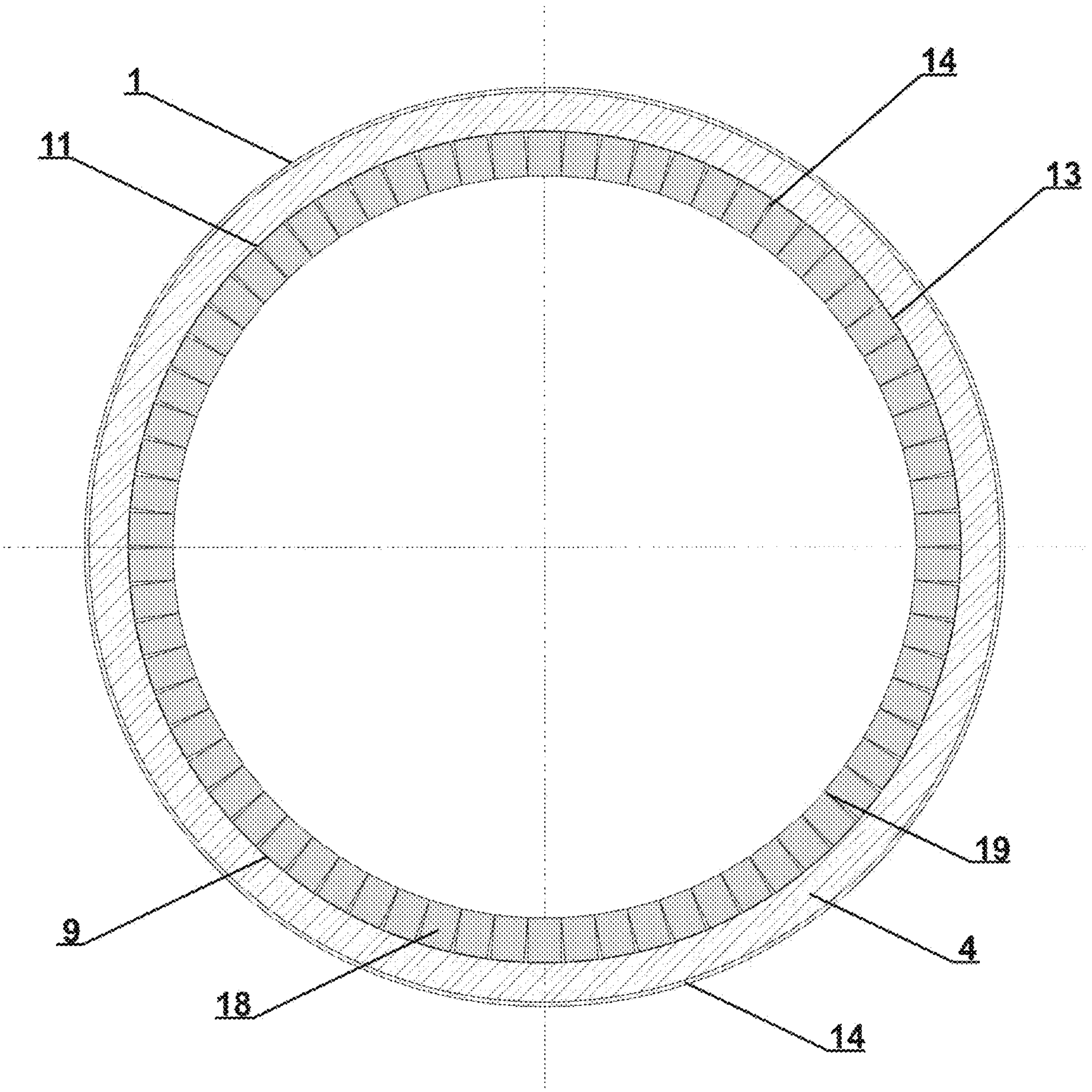
FIG. 12 shows the embodiment of implementing insert 7 made of wear-resistant material, made in the form of a set of elements 18 of insert 7 made of wear-resistant material of rectangular shape in plan.
Figure 13:
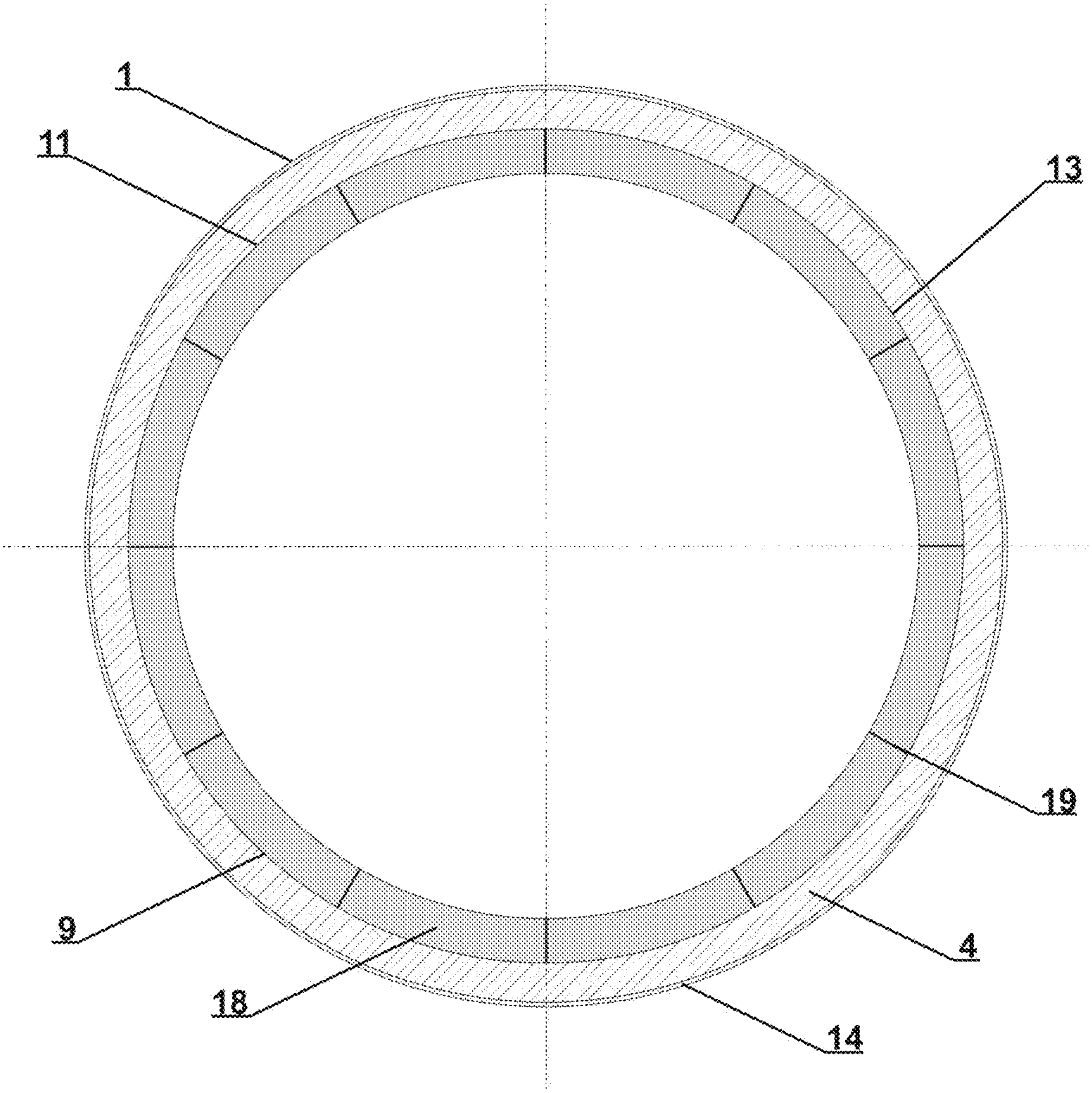
FIG. 13 shows the embodiment of implementing insert 7 made of wear-resistant material, performed in the form of a set of elements 18 of insert 7 made of wear-resistant arc-shaped material in plan.
Figure 14:
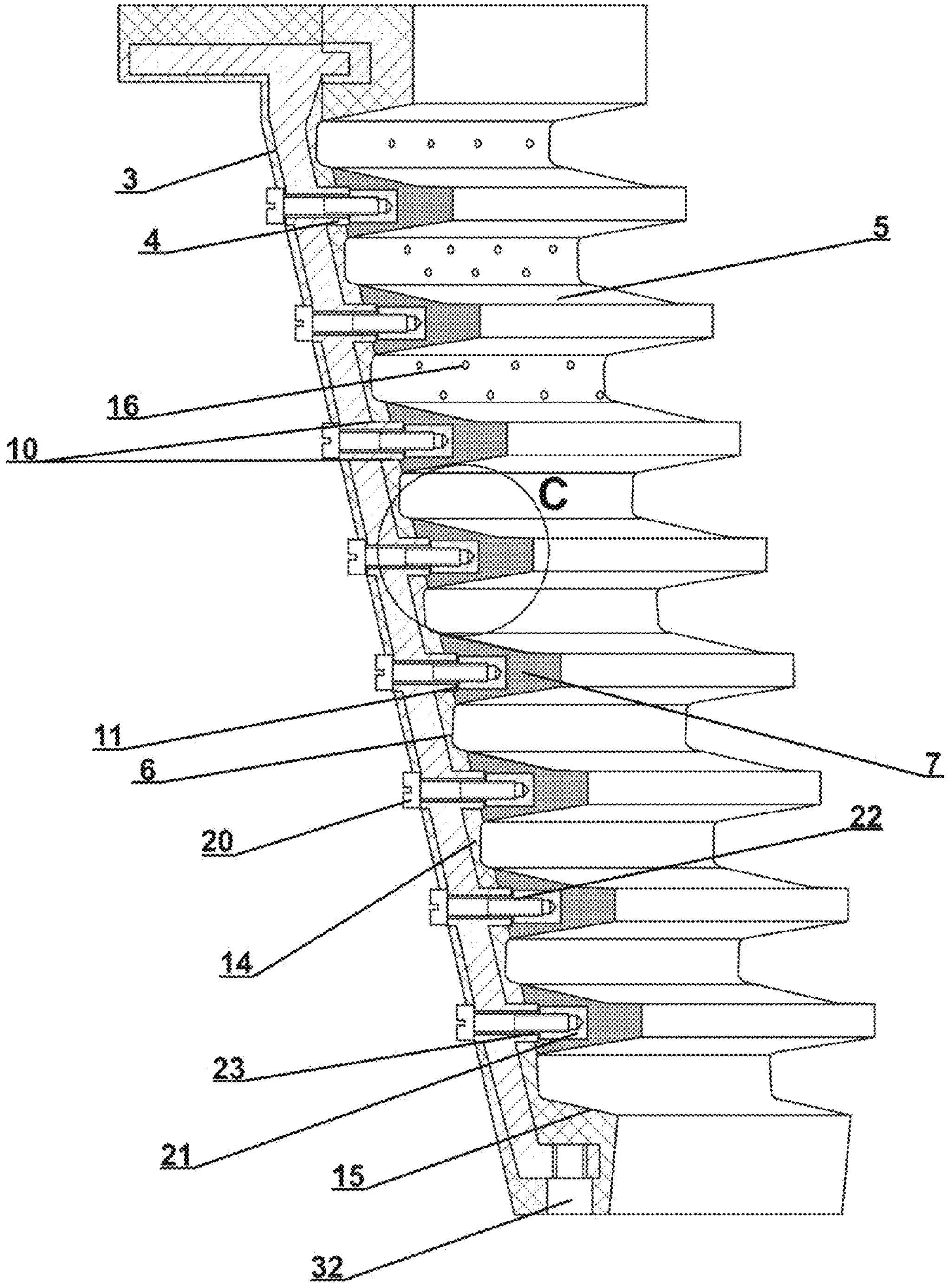
FIG. 14 illustrates the embodiment of performing upper part 1 of the concentration bowl, equipped with at least one ledge 5, made with the possibility of independent replacement. Moreover, at least one insert 7 made of wear-resistant material used to form at least one ledge 5 is additionally provided with reinforcing insert 21 and attached to end surface 11 of at least one rib 4 of inner frame 3 by means of fastener 20, side view.
Figure 28:
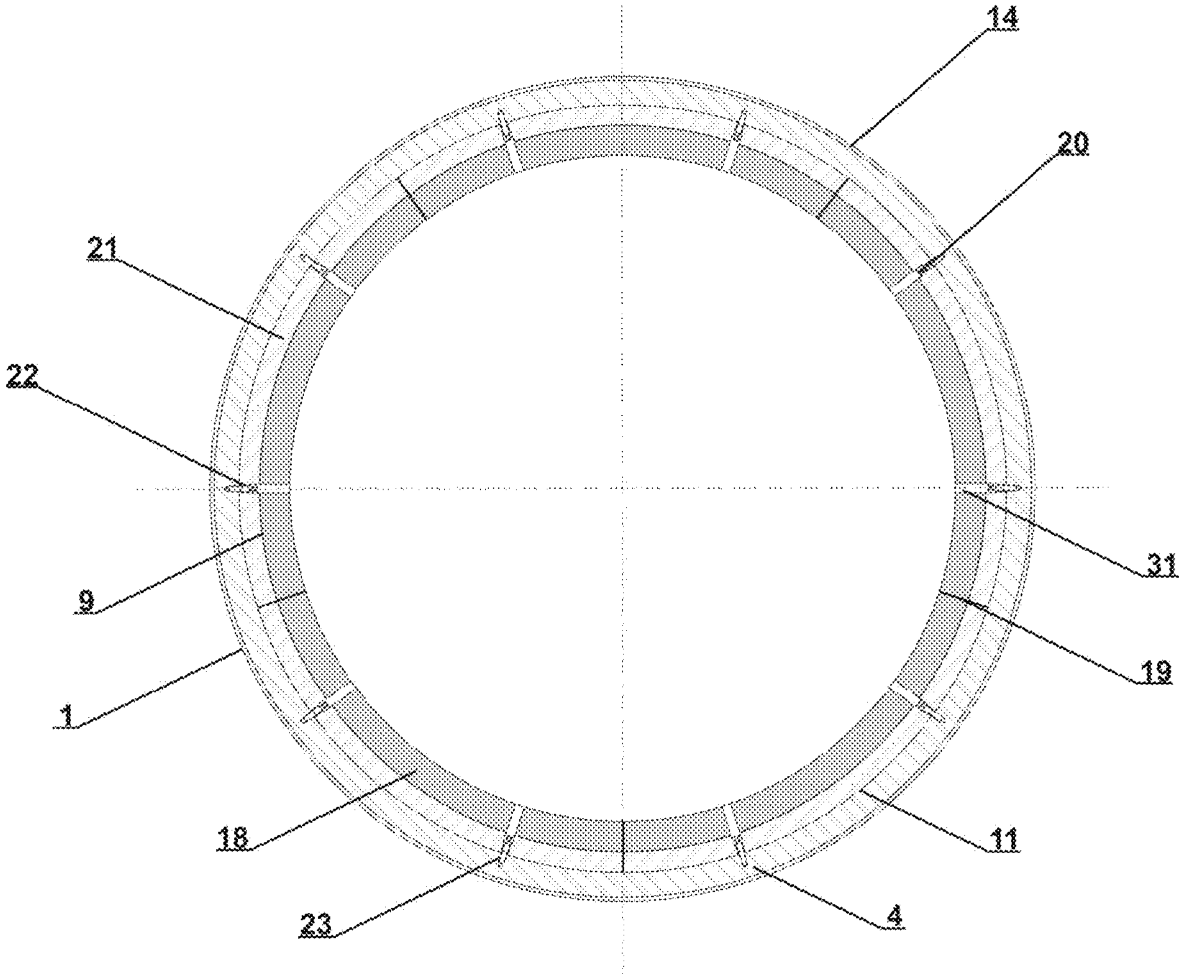
FIG. 28 shows the embodiment of implementing insert 7 made of wear-resistant material, performed in the form of a set of elements 18 of insert 7 made of wear-resistant arc-shaped material in plan, attached to end surface 11, at least one rib 4 of inner frame 3 by means of reinforcing inserts 21 and fasteners 20 from the side of the inner volume of upper part 1 of the concentration bowl.
Figure 29:
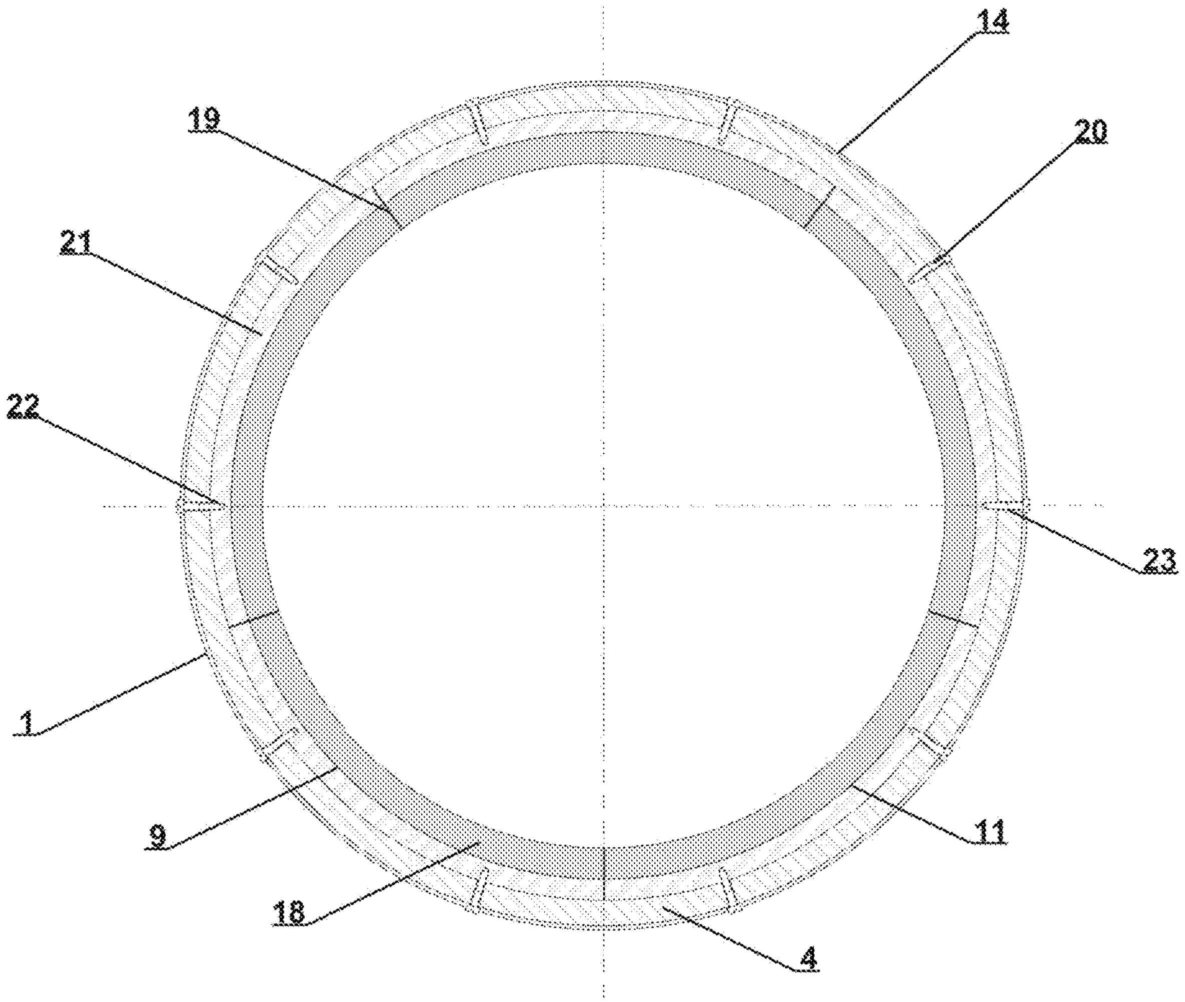
FIG. 29 shows the embodiment of implementing insert 7 made of wear-resistant material, performed in the form of a set of elements 18 of insert 7 made of wear-resistant arc-shaped material in plan, attached to end surface 11, at least one rib 4 of inner frame 3 using reinforcing inserts 21 and fasteners 20 on the outside of inner frame 3 of upper part 1 of the concentration bowl.

As another example of the implementation of the claimed invention, inserts 7 made of wear-resistant material can be made in the form of a set of elements 18 of inserts 7 made of wear-resistant material of various shapes in plan as shown in FIGS. 12, 13, 28 and 29. In this case, inserts 7 of wear-resistant material can be made in the form of a set of elements 18 of inserts 7 of wear-resistant material of rectangular shape in plan (FIG. 12), and hence in longitudinal section. Also, inserts 7 made of wear-resistant material can be made in the form of a set of elements 18 of inserts 7 made of wear-resistant material of an arc shape in plan, and therefore in longitudinal section as shown in FIGS. 13, 28 and 29. Also, as an example, inserts 7 made of wear-resistant material can be made in the form of a set of elements 18 of inserts 7 made of wear-resistant material of polygonal shape in plan, and hence in longitudinal section. At the same time, each set of elements 18 of inserts 7 made of wear-resistant material can contain from two or more elements 18 of inserts 7 made of wear-resistant material which makes it easy to replace elements 18 of inserts 7 made of wear-resistant material worn out during operation which means to ensure an increase in the service lifetime of the claimed invention, the reliability of the device, its maintainability and ease of manufacture. The described embodiments of inserts 7 made of wear-resistant material having any of the listed forms in the plan, provide an increase in the service lifetime of the claimed invention, the reliability of the device and the simplicity of its manufacture.

Any material resistant to abrasion can be used as a wear-resistant material for making inserts 7. At the same time, it is desirable to use materials resistant to abrasion, with a relatively low density. As an example of such a material, any known ceramics, aluminum oxide, zirconium oxide, titanium nitride, technical diamond, composite materials, or any other similar material can be used. Also, materials containing metal carbides, for example, tungsten carbide, or nonmetal carbides, for example, silicon carbide or any other known metal carbides or nonmetal carbides, can be used as a wear-resistant material for making inserts 7. Also, high-chromium steels or high-manganese steels can be used as a wear-resistant material for making inserts 7. Besides, any combination of the listed materials resistant to abrasion, or any other known materials resistant to abrasion and having a low density, can be used as a wear-resistant material for the implementation of inserts 7. The choice of the listed materials as a wear-resistant material when performing inserts 7 of a wear-resistant material ensures an increase in the life of the claimed invention as well as its reliability and maintainability.

Inserts 7 made of wear-resistant material can be attached to the side wall of inner frame 3 of upper part 1 of the concentration bowl via any known method. As an example, inserts 7 made of wear-resistant material can be attached to the side wall of inner frame 3 of upper part 1 of the concentration bowl using a screw connection, bolt connection, rivet connection, can be attached using a self-tapping screw or ceramic spraying on the surface of the side wall of inner frame 3 of upper part 1 of the concentration bowl or attached via any other known method. At the same time, inserts 7 made of wear-resistant material can be attached to the side wall of inner frame 3 of upper part 1 of the concentration bowl from base 9 of each insert 7 made of wear-resistant material which ensures reliable fastening of inserts 7 made of wear-resistant material on the surface of the side wall of inner frame 3 of upper part 1 of the concentration bowl, and, accordingly, allows you to increase the service lifetime of the claimed invention as well as to ensure its reliability and maintainability.

In the case of the implementation of the claimed invention, provided with a side wall of inner frame 3 of upper part 1 of the concentration bowl with at least one insert 7 of wear-resistant material attached to it, at least one insert 7 of wear-resistant material can be made with the possibility of independent replacement which ensures the maintainability of the claimed invention. In this case, at least one insert 7 made of wear-resistant material can be fixed to the side wall of inner frame 3 of upper part 1 of the concentration bowl by means of a screw connection, bolt connection, rivet connection or can be attached via any other known method.

As an example, at least one insert 7 made of wear-resistant material can be attached to the inner surface of the side wall of inner frame 3 of upper part 1 of the concentration bowl of upper part 1 of the concentration bowl using fastener 20, for example, a bolt, stud, screw or self-tapping screw as shown in FIGS. 14-28, 34 and 37-42. In the case of this type of connection, at least one insert 7 made of wear-resistant material can additionally be provided with reinforcing insert 21 designed to attach insert 7 made of wear-resistant material to the inner surface of the side wall of inner frame 3 of upper part 1 of the concentration bowl which ensures the maintainability of the claimed invention. In turn, in the case of the design of claimed upper part 1 of the concentration bowl, at least one insert 7 of wear-resistant material with the possibility of independent replacement, respectively, at least one protrusion 5, for the formation of which at least one insert 7 of wear-resistant material was used, can also be performed with the possibility of independent replacement, as shown in FIGS. 14-27, 34, 37-42, which, in turn, ensures the maintainability of the claimed invention. At the same time, at least one insert 7 made of wear-resistant material can be attached using fastener 20 of reinforcing insert 21 to the side wall of inner frame 3 of upper part 1 of the concentration bowl can be carried out both from the outside of inner frame 3 of upper part 1 of the concentration bowl, as shown in FIGS. 16, 17 and 20-23, and from the side of the free volume inside upper part 1 of the concentration bowl (not shown in the drawings), or in the form of a combination of attachment from the outside of inner frame 3 of upper part 1 of the concentration bowl and attachment from the side of the free volume inside upper part 1 of the concentration bowl (not shown in the drawings).

At the same time, in the case of attachment by means of fastener 20, at least one insert 7 of wear-resistant material to end surface 11, at least one rib 4 of inner frame 3 of upper part 1 of the concentration bowl from the side of the free volume inside upper part 1 of the concentration bowl, the hole in insert 7 above fixing element 20 can be additionally filled with a wear-resistant material, for example, epoxy compound 17 with the filler.

Figure 17:
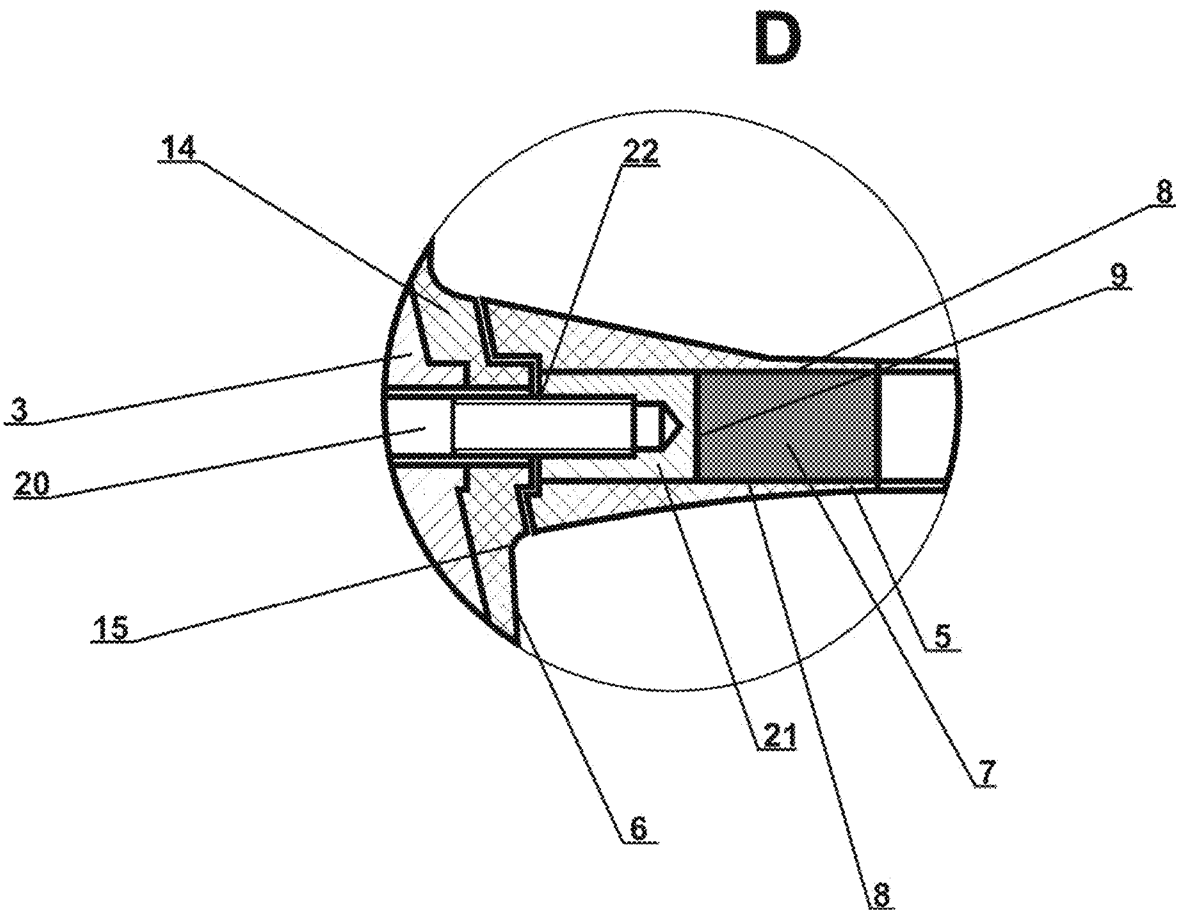
FIG. 17 shows the area D illustrating the relative position of ledge 5, insert 7 of wear-resistant material, reinforcing insert 21, side wall of inner frame 3, provided with a layer of material 14, and fastener 20.
Figure 18:
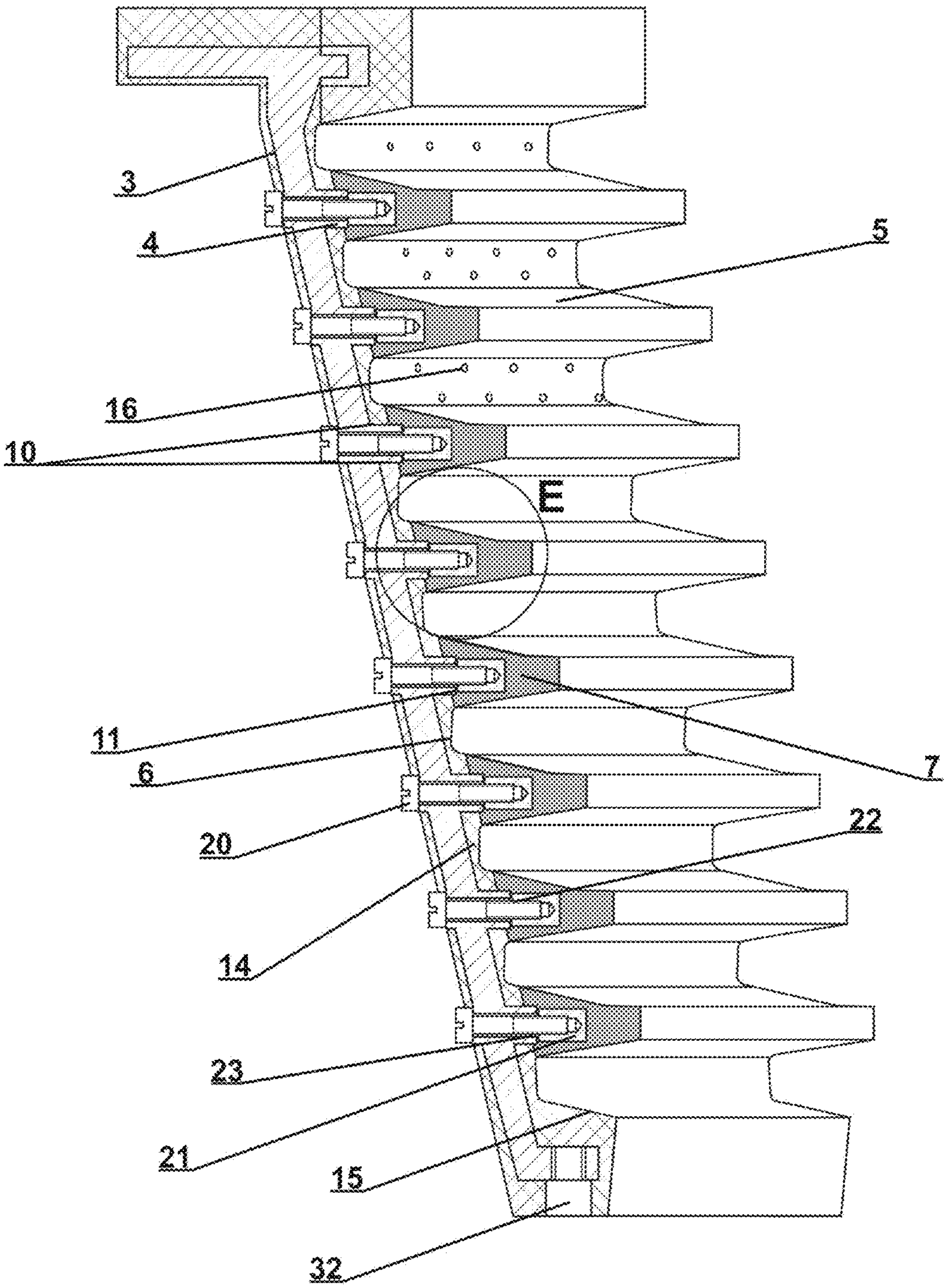
FIG. 18 shows the embodiment of performing upper part 1 of the concentration bowl, equipped with at least one ledge 5, made with the possibility of independent replacement, side view. Moreover, at least one insert 7 made of wear-resistant material used to form at least one ledge 5 is additionally equipped with a reinforcing insert 21, additionally fixed with material 14 on three sides, and is attached to end surface 11 of at least one rib 4 of inner frame 3 by means of reinforcing insert 21 and fastener 20.
Figure 21:
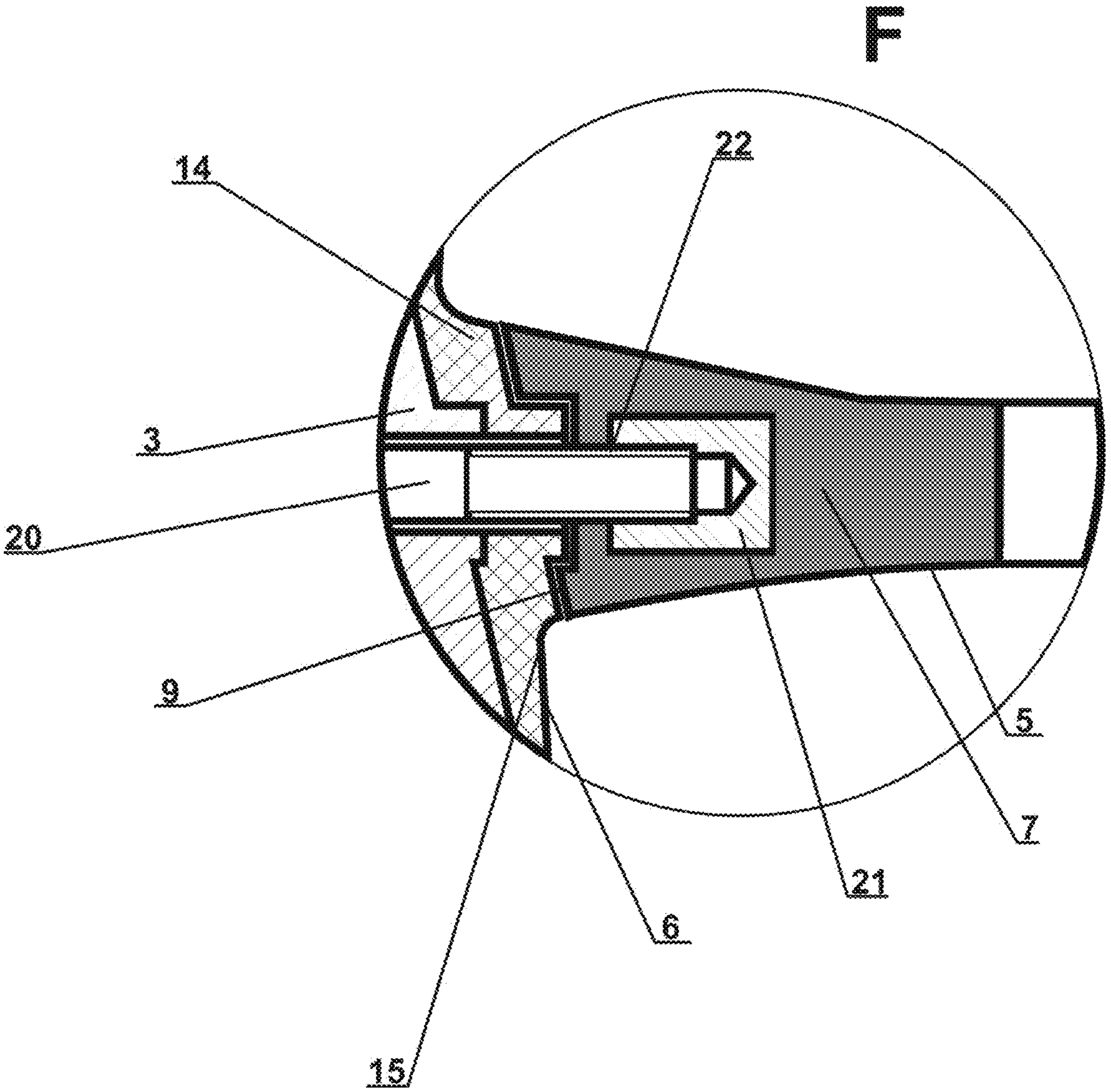
FIG. 21 shows the area F illustrating the relative position of insert 7 of wear-resistant material, reinforcing insert 21, side wall of inner frame 3, provided with a layer of material 14, and fastener 20.
Figure 22:
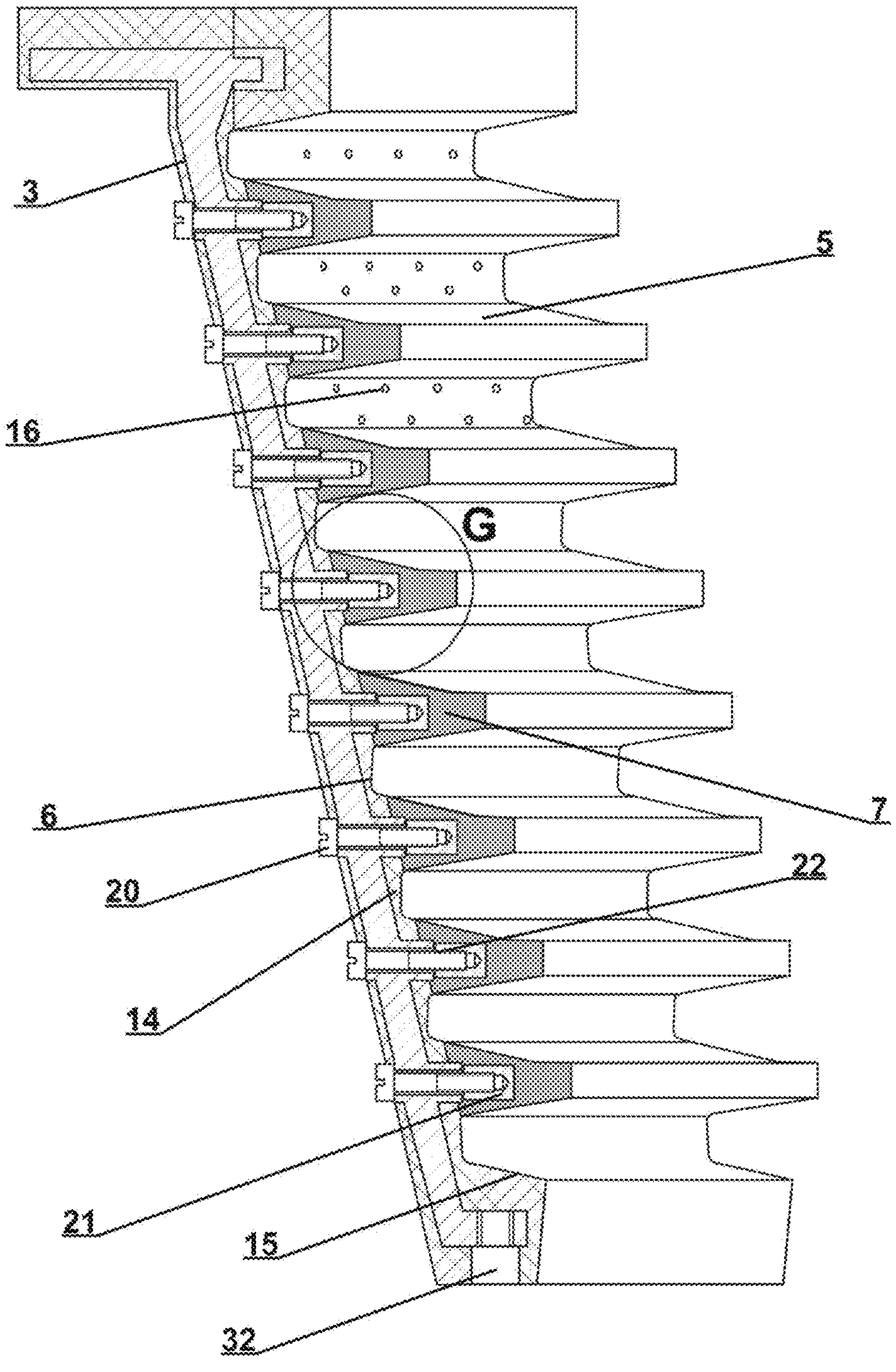
FIG. 22 shows the embodiment of performing upper part 1 of the concentration bowl, equipped with at least one ledge 5, made with the possibility of independent replacement, side view. Moreover, at least one insert 7 made of wear-resistant material used to form at least one ledge 5 is additionally provided with reinforcing insert 21, additionally fixed with material 14 on three sides, and attached by means of reinforcing insert 21 and fastener 20 to the side wall of inner frame 3 provided with layer of material 14.
Figure 23:
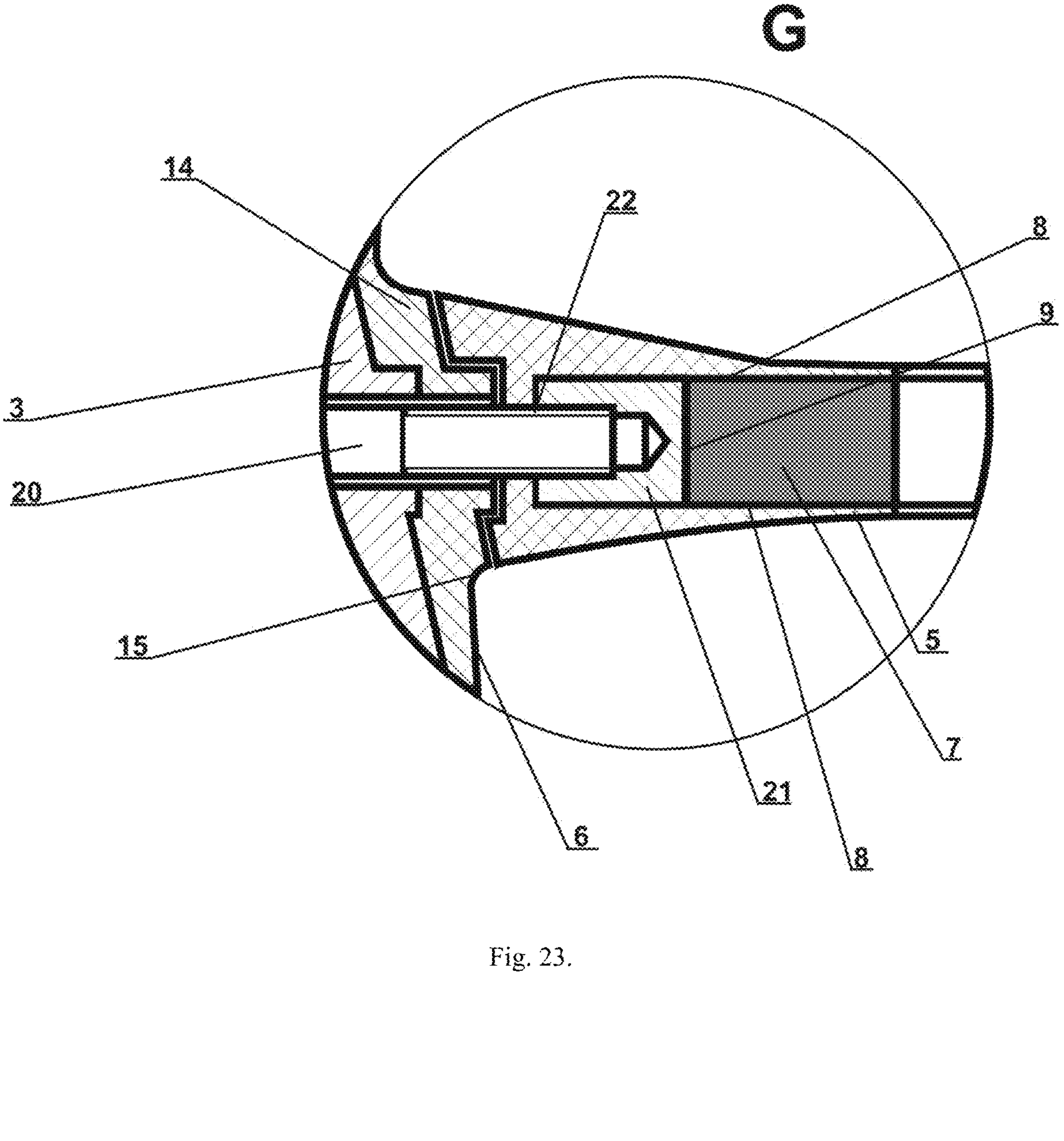
FIG. 23 shows the area G illustrating the relative position of ledge 5, insert 7 made of wear-resistant material, reinforcing insert 21, additionally fixed with material 14 on three sides, the side wall of inner frame 3 provided with a layer of material 14, and fastener 20.
Figure 24:
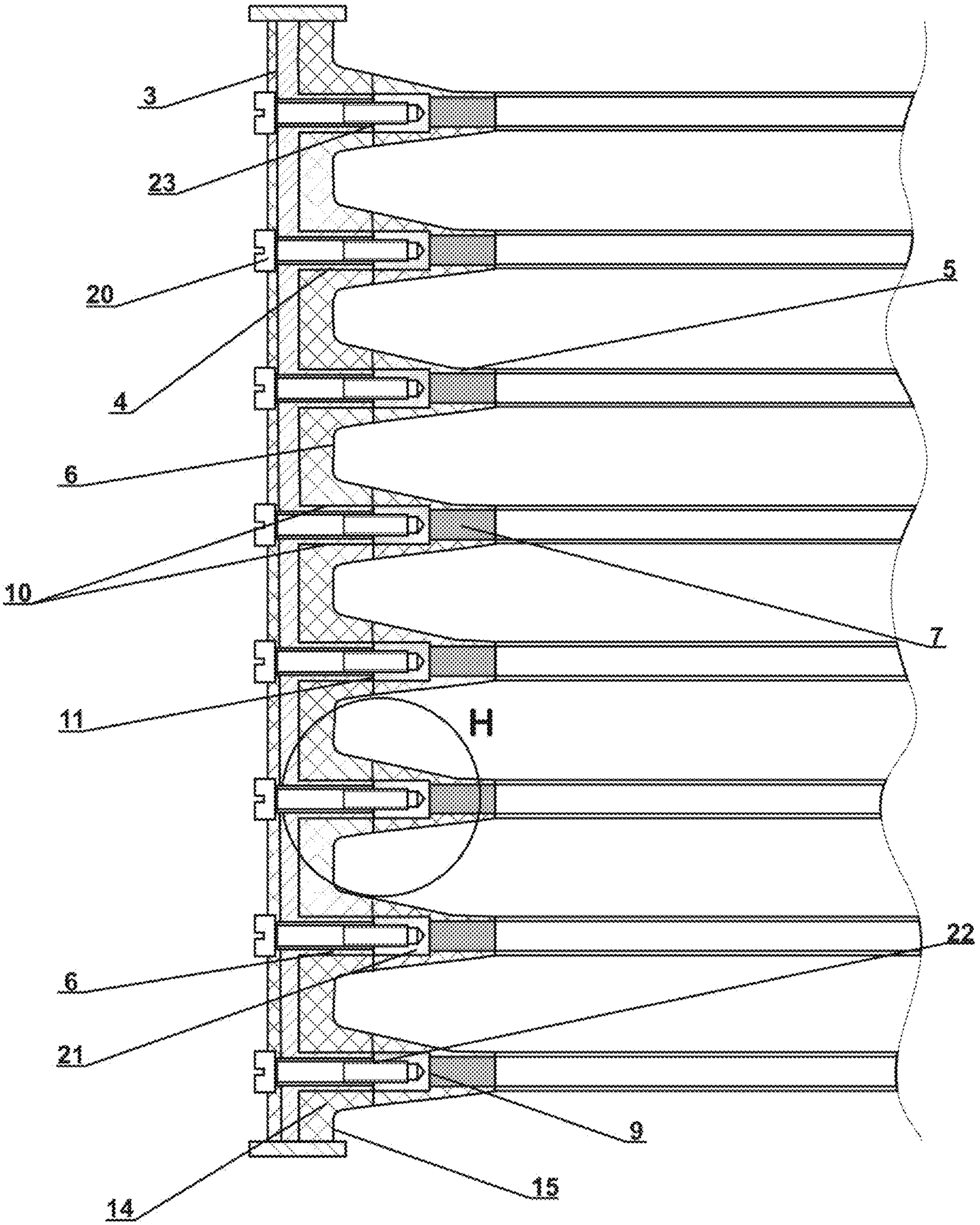
FIG. 24 shows a schematic diagram of upper part 1 of the concentration bowl equipped with at least one ledge 5, made with the possibility of independent replacement, and the side wall of inner frame 3 of which is made at the angle of 90° to the horizontal surface, side view.

In addition, as shown in FIGS. 17, 21 and 23, in the area of attachment of at least one insert 7 of wear-resistant material to the side wall of inner frame 3 of upper part 1 of the concentration bowl, the side wall of inner frame 3 of upper part 1 of the concentration bowl can additionally be provided with a layer of material 14 of working surface 15 which ensures the maintainability of the claimed invention.

As a material for reinforcing insert 21, any known high-strength metal can be used, for example, steel of the appropriate grades, composite material with a suitable set of properties or polymers with a suitable set of properties which is necessary to ensure the reliability of the claimed device, increase its service lifetime as well as ease of manufacture of the claimed invention and ensure its maintainability. In this case, reinforcing insert 21 can be made of any shape in cross-section, for example, rectangular or wedge-shaped, and can be additionally provided with hole 22 for attaching embedded fitting 21 to the side wall of inner frame 3 of upper part 1 of the concentration bowl which ensures the maintainability of the claimed invention. At the same time, hole 22 for fixing reinforcing insert 21, if necessary, can be additionally provided with a thread (not shown in the drawings). In the longitudinal section, reinforcing insert 21 can also be made of any known shape. As an example, reinforcing insert 21 can be arc-shaped in plan, or it can be made in the form of a monolithic ring.

In the case of at least one ledge 5 in the structure of upper part 1 of the concentration bowl, equipped with at least one insert 7 of wear-resistant material, made with the possibility of independent replacement, ledge 5 can be made with the possibility of independent replacement and implemented of any known design.

Figure 15:
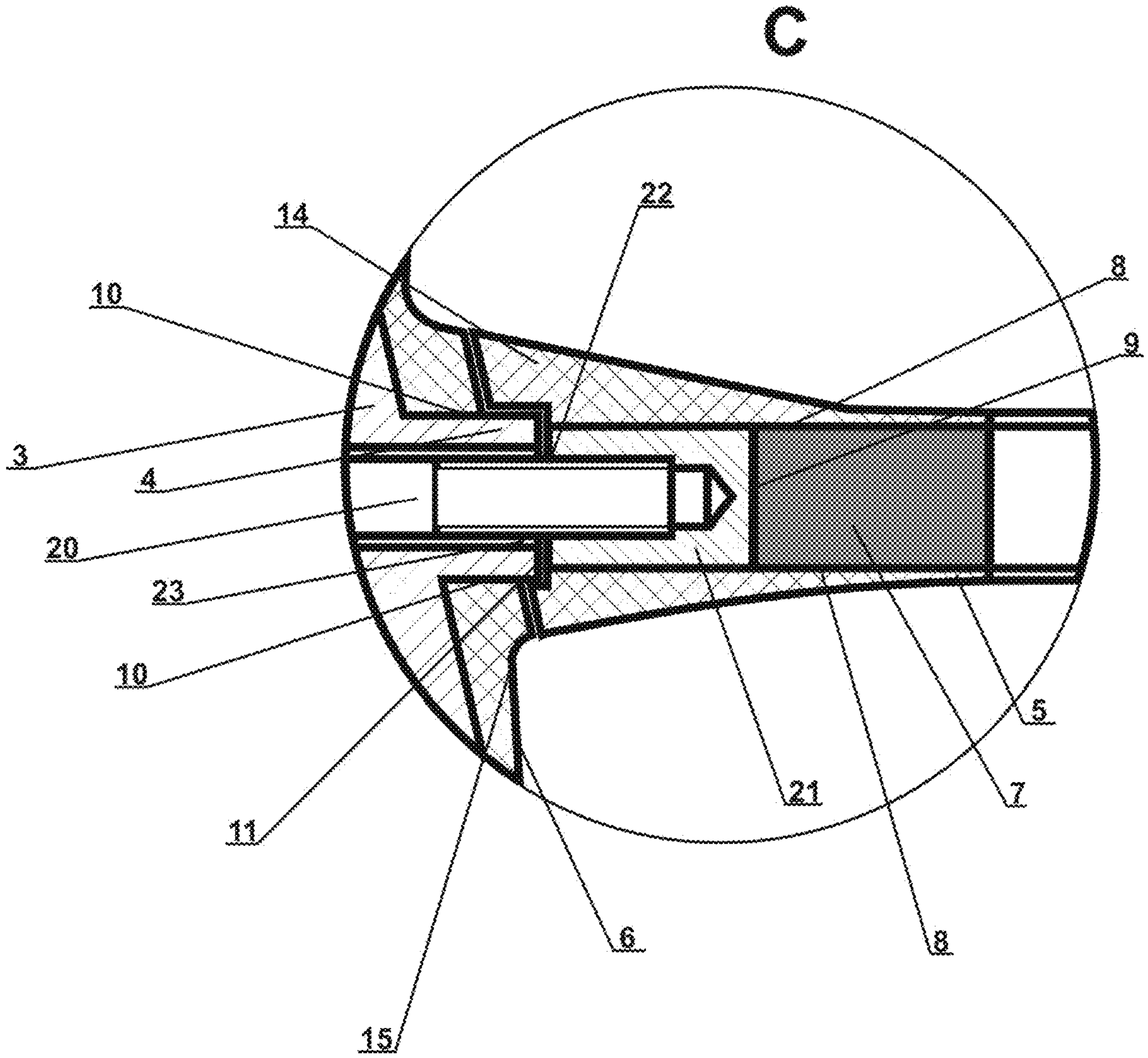
FIG. 15 shows the area C illustrating the relative position of ledge 5, inserts 7 made of wear-resistant material, reinforcing insert 21, ribs 4 of inner frame 3 and fastener 20.
Figure 16:
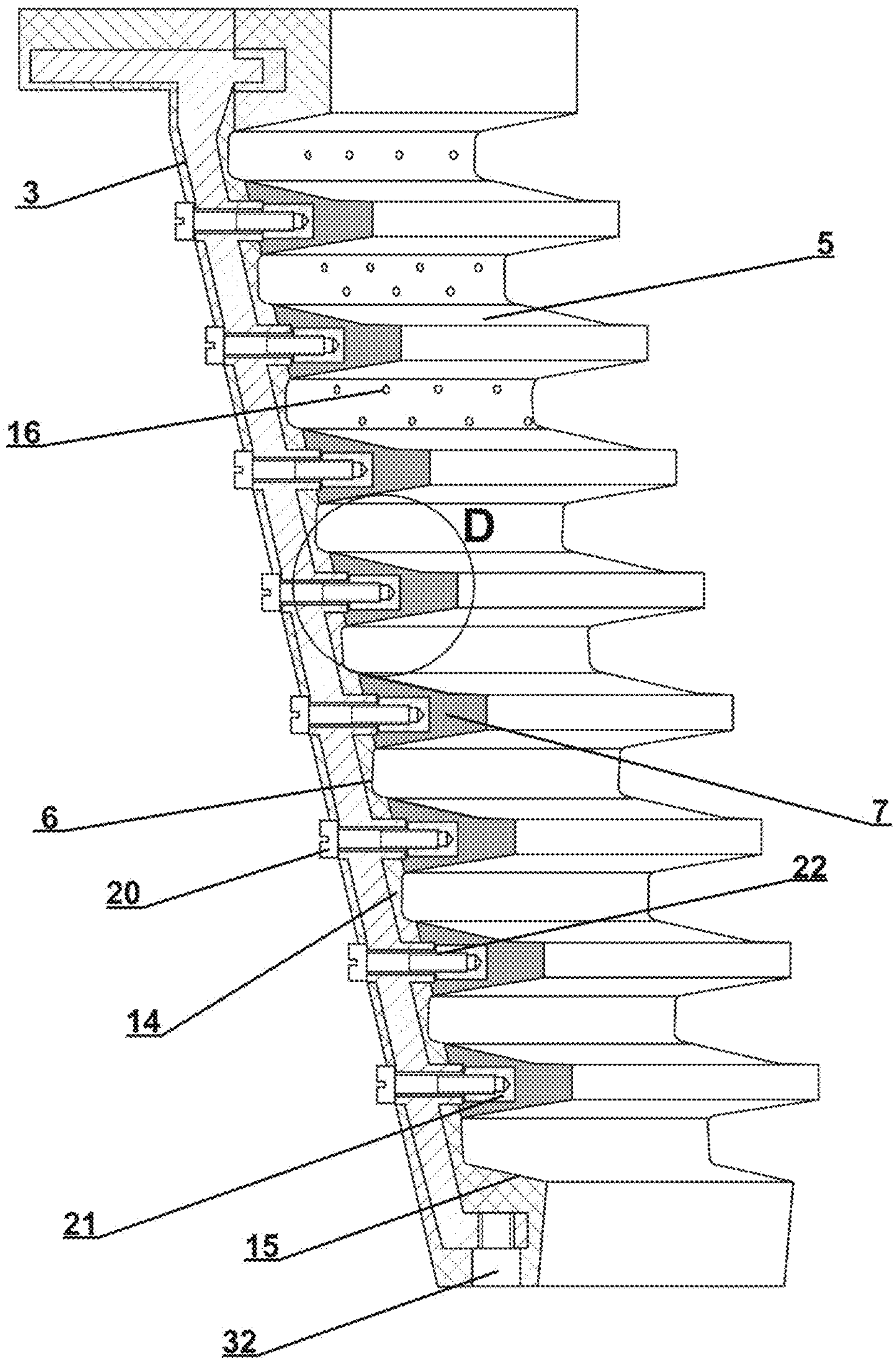
FIG. 16 shows the embodiment of performing upper part 1 of the concentration bowl, equipped with at least one ledge 5, made with the possibility of independent replacement, side view. Moreover, at least one insert 7 made of wear-resistant material used to form at least one ledge 5 is additionally provided with reinforcing insert 21 and attached with fastener 20 to the side wall of inner frame 3 provided with a layer of material 14.
Figure 25:
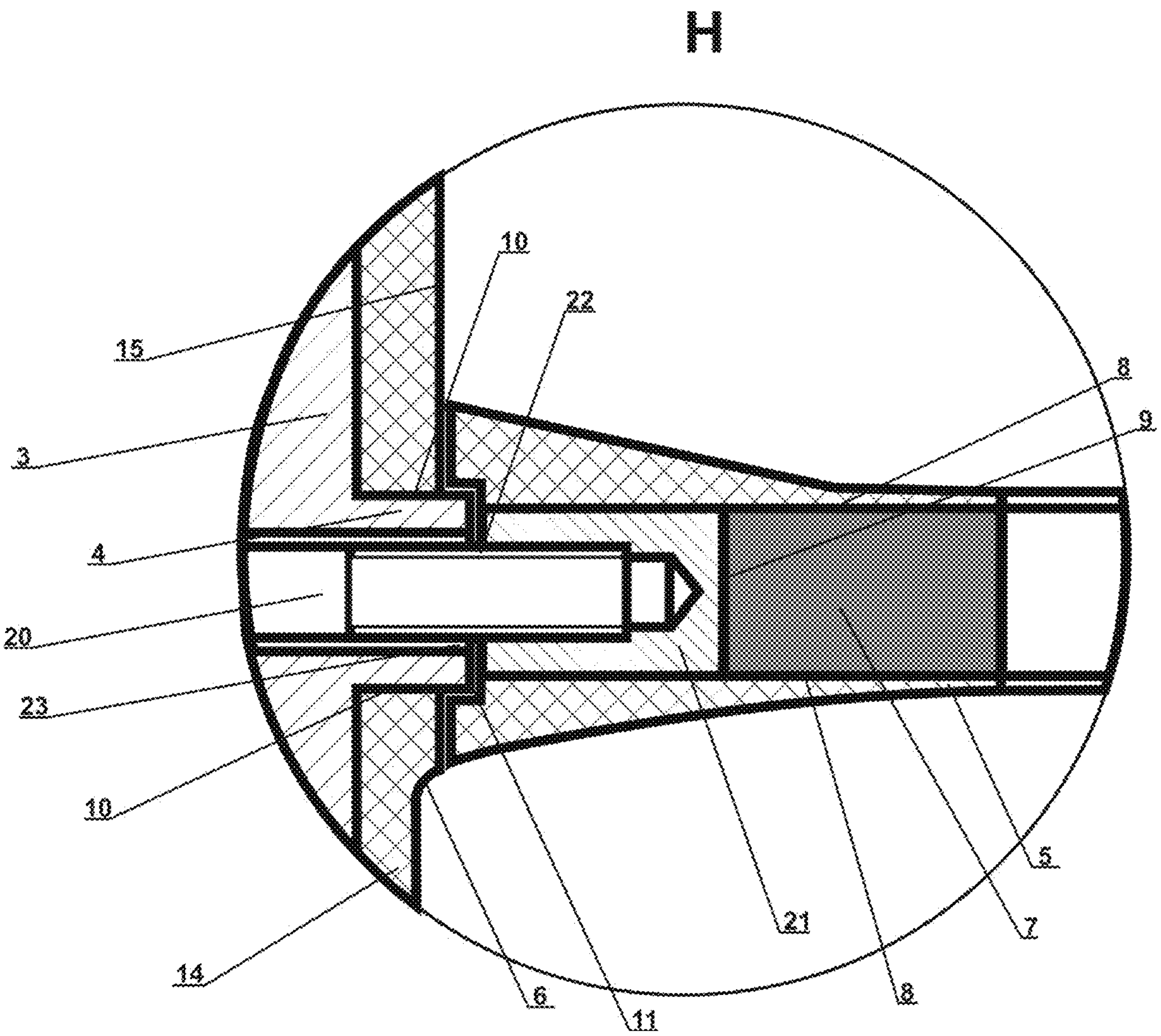
FIG. 25 shows the area H illustrating the relative position of ledge 5, insert 7 made of wear-resistant material, additionally equipped with reinforcing insert 21, side wall of inner frame 3, rib 4 of inner frame 3, fastener 20 and material 14.

As an example, at least one ledge 5 of upper part 1 of the concentration bowl equipped with at least one insert 7 of wear-resistant material made with the possibility of independent replacement can be implemented as follows. At least one ledge 5 can include at least one insert 7 made of wear-resistant material, additionally equipped with a reinforcing insert 21 on the side of base 9 of insert 7 made of wear-resistant material and additionally fixed on at least two sides with material 14 of working surface 15, for example, as shown in FIGS. 15, 17 and 25, as viewed from side surfaces 8, inserts 7 are made of wear-resistant material which increases the service lifetime of at least one ledge 5, made with the possibility of independent replacement. This means that it ensures the maintainability of at least one ledge 5, and the claimed concentration bowl as a whole.

At the same time, if reinforcing insert 21 is arc-shaped in plan, at least one ledge 5, made with the possibility of independent replacement, for the formation of which reinforcing insert 21 was used and at least one insert 7 made of wear-resistant material, equipped with such reinforcing insert 21, can be made vertically divided into at least two parts, and the length of at least one of the parts of at least one ledge 5 coincides with the length of reinforcing insert 21 used to form at least one ledge 5 which ensures the maintainability of the claimed invention.

Besides, reinforcing insert 21 can be additionally fixed relative to insert 7 made of wear-resistant material used to form at least one ledge 5 by fixing reinforcing insert 21 with material 14 of working surface 15 on three sides as shown in FIGS. 19, 23, 38, 40 and 42. Thus, the reliability of the connection of reinforcing insert 21 with base 9 of insert 7 made of wear-resistant material is ensured, and, therefore, the maintainability of the claimed invention.

As another embodiment of the claimed invention, reinforcing insert 21 can be located inside at least one insert 7 made of wear-resistant material as shown in FIG. 21. In this case, at least one insert 7 made of wear-resistant material can be used to form at least one entire ledge 5, made with the possibility of independent replacement which also ensures ease of implementation and maintainability of the claimed invention. In this case, reinforcing insert 21 is also provided with hole 22 which can be additionally threaded (not shown in the drawings), and designed to attach reinforcing insert 21 to the side wall of inner frame 3 of upper part 1 of the concentration bowl using fastener 20.

In the case of supplying the side wall of inner frame 3 of upper part 1 of the concentration bowl with ribs 4 of inner frame 3 of upper part 1 of the concentration bowl, at least one insert 7 made of wear-resistant material, made with the possibility of independent replacement, by supplying insert 7 made of wear-resistant material with reinforcing insert 21 can be attached to end surface 11 of at least one rib 4 of inner frame 3 of upper part 1 of the concentration bowl by means of fastening element 20 as shown in FIGS. 15, 17, 24 and 25. As an example, at least one insert 7 made of wear-resistant material, performed with the possibility of independent replacement by supplying insert 7 made of wear-resistant material with reinforcing insert 21, can be attached to end surface 11 of at least one rib 4 of inner frame 3 of upper part 1 of the concentration bowl using screw connection, bolt connection, rivet connection, can be attached by spraying ceramics on end surface 11, of at least one rib 4 of inner frame 3 of upper part 1 of the concentration bowl or attached via any other known method. As an example, at least one insert 7 made of wear-resistant material can be attached to end surface 11 of at least one rib 4 of inner frame 3 of upper part 1 of the concentration bowl using fastener 20, for example, a bolt, stud, screw or self-tapping screw as shown in FIGS. 14, 15, 18, 19, 24-29, 34 and 37-42. In this case, end surface 11 of at least one rib 4 of inner frame 3 of upper part 1 of the concentration bowl can be additionally provided with opening 23 of end surface 11 of at least one rib 4 of inner frame 3 of upper part 1 of the concentration bowl for attaching to it at least one insert 7 made of wear-resistant material by means of fastener 20. As shown in FIGS. 14, 15, 18, 19, 24-29 34 and 37-42, hole 23 of end surface 11 of at least one rib 4 of inner frame 3 of upper part 1 of the concentration bowl can be located perpendicular to end surface 11 of at least one rib 4 of inner frame 3 of upper part 1 of the concentration bowl. In addition, the attachment by means of fastener 20 of at least one insert 7 made of wear-resistant material to end surface 11 of at least one rib 4 of inner frame 3 of upper part 1 of the concentration bowl can be carried out both from the outside of inner frame 3 of upper part 1 of the concentration bowl as shown in FIGS. 14, 15, 18, 19, 24, 25, 27, 29, 34 and 37-42, and from the side of the free volume inside upper part 1 of the concentration bowl as shown in FIG. 26 and FIG. 28 which ensures the maintainability of the claimed invention, or in the form of a combination of attachment from the outside of inner frame 3 of upper part 1 of the concentration bowl and attachment from the side of the free volume inside upper part 1 of the concentration bowl.

At the same time, in the case of attachment by means of fastener 20, at least one insert 7 of wear-resistant material to end surface 11, at least one rib 4 of inner frame 3 of upper part 1 of the concentration bowl from the side of the free volume inside upper part 1 of the concentration bowl, the hole in insert 7 above fixing element 20 can be additionally filled with a wear-resistant material, for example, epoxy compound 17 with the filler.

In any embodiment of the claimed invention as provided with upper part 1 of the concentration bowl equipped with solid inner frame 3, in the case of at least one insert 7 made of wear-resistant material used to form at least one ledge 5, with the possibility of independent replacement of at least one insert 7 made of wear-resistant material can be additionally equipped with reinforcing insert 21 and attached to the side wall of inner frame 3 of upper part 1 of the concentration bowl as follows.

As shown in FIG. 15 and FIG. 25, at least one insert 7 made of wear-resistant material can be additionally provided with reinforcing insert 21 and attached by means of reinforcing insert 21 and fastener 20 to end surface 11 of at least one rib 4 of inner frame 3 of upper part 1 of the concentration bowl. In addition, at least one insert 7 made of wear-resistant material can be attached by means of reinforcing insert 21 and fastening element 20 to the side wall of inner frame 3 of upper part 1 of the concentration bowl provided with material 14 of working surface 15 as shown in FIG. 17.

Figure 19:
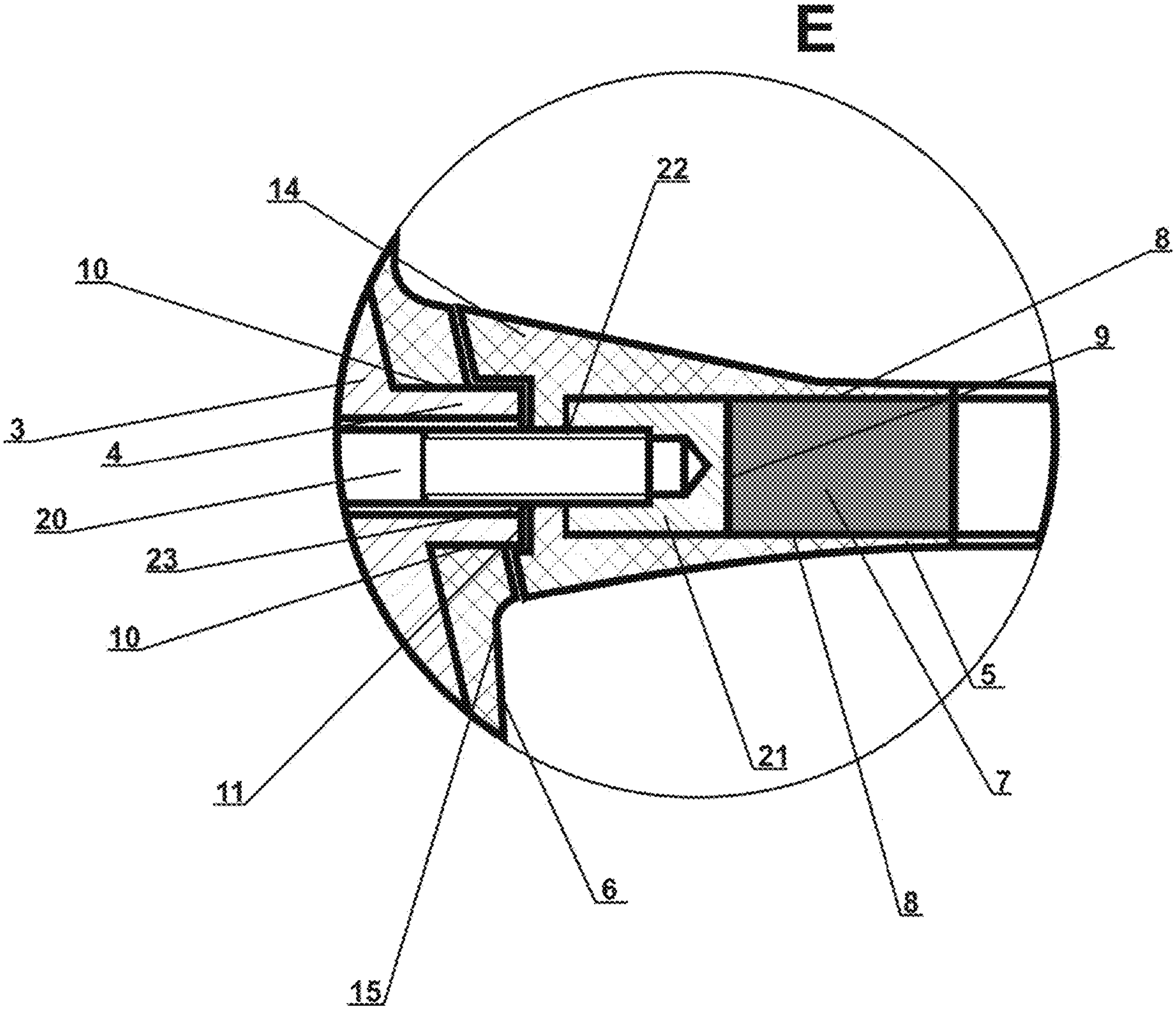
FIG. 19 shows the area E illustrating the relative position of ledge 5, inserts 7 made of wear-resistant material, reinforcing insert 21, additionally fixed with material 14 on three sides, ribs 4 of inner frame 3 and fastener 20.
Figure 20:
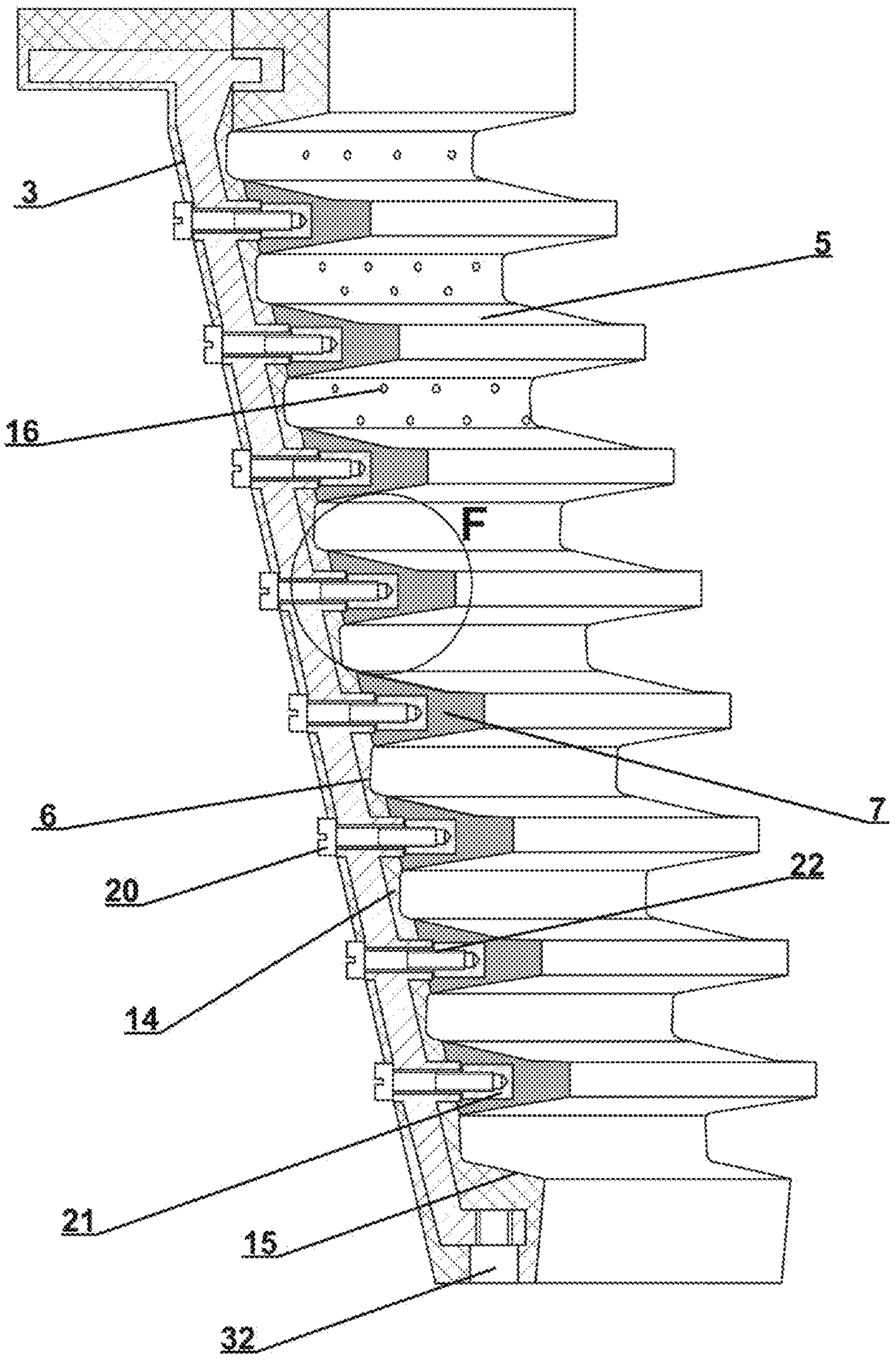
FIG. 20 shows the embodiment of performing upper part 1 of the concentration bowl, equipped with at least one ledge 5, made with the possibility of independent replacement, side view. Moreover, at least one insert 7 made of wear-resistant material used to form at least one ledge 5 is additionally provided with reinforcing insert 21 located inside insert 7 made of wear-resistant material and attached with fastener 20 to the side wall of inner frame 3 provided with a layer of material 14.

As shown in FIG. 19 and FIG. 23, at least one insert 7 made of wear-resistant material can be provided with reinforcing insert 21 by attaching it to at least one insert 7 made of wear-resistant material using material 14 of working surface 15 from side surfaces 8 of insert 7 made of wear-resistant material and from the side of hole 22 for attaching reinforcing insert 21 to the side wall of inner frame 3 of upper part 1 of the concentration bowl using fastener 20, that is, reinforcing insert 21 can be fixed using material 14 of working surface 15 on three sides. In turn, at least one insert 7 made of wear-resistant material, additionally equipped with a reinforcing insert 21, fixed by material 14 of working surface 15 on three sides, can be attached to end surface 11 of at least one rib 4 of inner frame 3 of upper part 1 of the concentration bowl using reinforcing insert 21 and fastening element 20, as shown in FIG. 19.

Besides, at least one insert 7 made of wear-resistant material, additionally equipped with reinforcing insert 21, fixed by material 14 of working surface 15 on three sides, can be attached to the side wall of inner frame 3 of upper part 1 of the concentration bowl, equipped with material 14 of working surface 15 by means of fastener 20 as shown in FIG. 23.

In any of the possible embodiments of the claimed invention, ledges 5 can be made of different widths in cross-section. As an example, at least one ledge 5 can be trapezoidal and can be independently replaced. In this case, this ledge 5 can be installed with the overlap of at least two fasteners 20 in cross-section, as shown in FIG. 27, and fixed with at least two fasteners 20.

As shown in FIGS. 1-10, 13-15, 18, 19, 24-43 and 50, in the case of supplying the side wall of inner frame 3 of upper part 1 of the concentration bowl with at least one rib 4 of inner frame 3 of upper part 1 of the concentration bowl, on end surface 11 of at least one rib 4 of inner frame 3 of upper part 1 of the concentration bowl on the side of the free volume, inside the claimed concentration bowl, at least one insert 7 of wear-resistant material can be fixed, used to form at least one ledge 5. This makes it possible to increase the service lifetime of the claimed invention by increasing the service lifetime of ledges 5 of the concentration bow, as well as to ensure the maintainability of the claimed invention.

Within the framework of the implementation of the claimed invention, inserts 7 made of wear-resistant material used to form at least one ledge 5 can be implemented in any shape in plan. As an example, inserts 7 made of wear-resistant material can be made in the form of a monolithic ring as shown in FIG. 11. Thus, in this embodiment, inserts 7 made of wear-resistant material can be made of an annular shape in longitudinal section. Such an embodiment of making inserts 7 of wear-resistant material within the framework of the implementation of the claimed invention ensures the maintainability of the claimed invention.

As another example of the implementation of the claimed invention, inserts 7 made of wear-resistant material used to form at least one ledge 5 can be made in the form of a set of elements 18 of inserts 7 made of wear-resistant material of various shapes in plan as shown in FIGS. 12, 13, 28 and 29. In this case, inserts 7 of wear-resistant material used to form at least one ledge 5 can be made in the form of a set of elements 18 of inserts 7 of wear-resistant material of rectangular shape in plan (FIG. 12), and hence in longitudinal section. Also, inserts 7 made of wear-resistant material used to form at least one ledge 5 can be made in the form of a set of elements 18 of inserts 7 made of wear-resistant arc-shaped material in plan, and hence in longitudinal section, as shown in FIGS. 13, 28 and 29. Also, as an example, inserts 7 made of wear-resistant material can be made in the form of a set of elements 18 of inserts 7 made of wear-resistant material of polygonal shape in plan, and hence in longitudinal section. At the same time, each set of elements 18 of inserts 7 made of wear-resistant material can contain from two or more elements 18 of inserts 7 made of wear-resistant material which makes it easy to replace elements 18 of inserts 7 made of wear-resistant material worn out during operation which means to ensure an increase in the service lifetime of the claimed invention, the reliability of the device and ease of its manufacture as well as its maintainability and environmental friendliness. The described embodiments of inserts 7 made of wear-resistant material having any of the listed forms in the plan, provide an increase in the maintainability of the claimed invention, the reliability of the device and the simplicity of its manufacture.

In the case of at least one ledge 5 with the possibility of independent replacement, and at least one insert 7 made of wear-resistant material used to form at least one ledge 5, additionally equipped with reinforcing insert 21 and made in the form of a set of elements 18, inserts 7 made of wear-resistant material rectangular in plan, elements 18 of insert 7 made of wear-resistant material can be provided with holes 31 and attached by means of reinforcing insert 21 to the side wall of inner frame 3 of upper part 1 of the concentration bowl, or at least one rib 4 of inner frame 3 of upper part 1 of the concentration bowl using fasteners 20 located in holes 31 of elements 18 which ensures the maintainability of the claimed invention. In this case, gaps 19 are formed between two adjacent elements 18 of inserts 7 made of wear-resistant material.

In the case of at least one ledge 5 with the possibility of independent replacement, and at least one insert 7 made of wear-resistant material used to form at least one ledge 5, additionally equipped with reinforcing insert 21 and made in the form of a set of elements 18 of insert 7 made of wear-resistant material of an arc shape in plan, fasteners 20 for attaching reinforcing insert 21 and at least one insert 7 to the side wall of inner frame 3 of upper part 1 of the concentration bowl or at least one rib 4 of inner frame 3 of upper part 1 of the concentration bowl can be located in gaps 19 between two adjacent elements 18 of inserts 7 made of wear-resistant material which ensures the maintainability of the claimed invention. As shown in FIG. 28 and FIG. 29, fasteners 20 for attachment using reinforcing insert 21, at least one insert 7 to the side wall of inner frame 3 of upper part 1 of the concentration bowl or at least one rib 4 of inner frame 3 of upper part 1 of the concentration bowl in the case of fastening elements 18 of inserts 7 with by means of fasteners 20 from the side of the inner volume of upper part 1 of the concentration bowl, elements 18 of inserts 7 made of wear-resistant material can be additionally provided with holes 31 of elements 18, and fasteners 20, in turn, can be located in holes 31 of elements 18 of inserts 7 made of wear-resistant material which ensures the maintainability of the claimed invention.

As one of the possible implementation embodiments, at least one element 18 of insert 7 made of wear-resistant material can be connected to at least two reinforcing inserts 21 which also ensures the maintainability of the claimed invention.

At the same time, in the case of inserts 7 made of wear-resistant material used to form at least one ledge 5, in the form of a set of elements 18 of inserts 7 made of wear-resistant material of rectangular, polygonal or arc shape in plan, elements 18 of inserts 7 made of wear-resistant material can also be attached to end surface 11 of at least one rib 4 of inner frame 3 of upper part 1 of the concentration bowl or to retaining shell 12 from the side of base 9 of inserts 7 of made wear-resistant material with the formation of gap 19 between two adjacent elements 18 of inserts 7 made of wear-resistant material as shown in FIGS. 12, 13, 28 and 29 which ensures the reliability of the claimed invention, increasing its service lifetime as well as ease of manufacture.

Besides, in the case of at least one ledge 5 with the possibility of independent replacement and use at least one insert 7 made of wear-resistant material for the formation of this ledge 5, at least one insert 7 made of wear-resistant material can additionally be provided with reinforcing insert 21 from the side of base 9 of insert 7 made of wear-resistant material. In this case, at least one insert 7 made of wear-resistant material can be attached to reinforcing insert 21 from the side of base 9 of insert 7 made of wear-resistant material, and retaining shell 12, in turn, can be attached to reinforcing insert 21. If at least one insert 7 made of wear-resistant material used to form at least one ledge 5, performed with the possibility of independent replacement, is made in the form of a set of elements 18 of insert 7 made of wear-resistant material, elements 18 of insert 7 made of wear-resistant material can be attached to reinforcing insert 21 with the sides of base 9, and retaining shell 12 itself can be attached to reinforcing insert 21.

Retaining shell 12 can be attached to reinforcing insert 21 via any known method. As an example, each retaining shell 12 can be attached to reinforcing insert 21 by means of a welded joint, screw joint, bolt joint, rivet joint, glue, can be soldered or attached via any other known method. The supply of reinforcing insert 21 with retaining shell 12 ensures reliable fastening of each insert 7 made of wear-resistant material used to form at least one ledge 5 and, accordingly, allows to increase the service lifetime of the claimed invention, to ensure its reliability as well as its maintainability. At the same time, the supply of the inner surface of retaining shell 12 with connecting layer 13 also ensures the maintainability of the claimed device.

Figure 9:
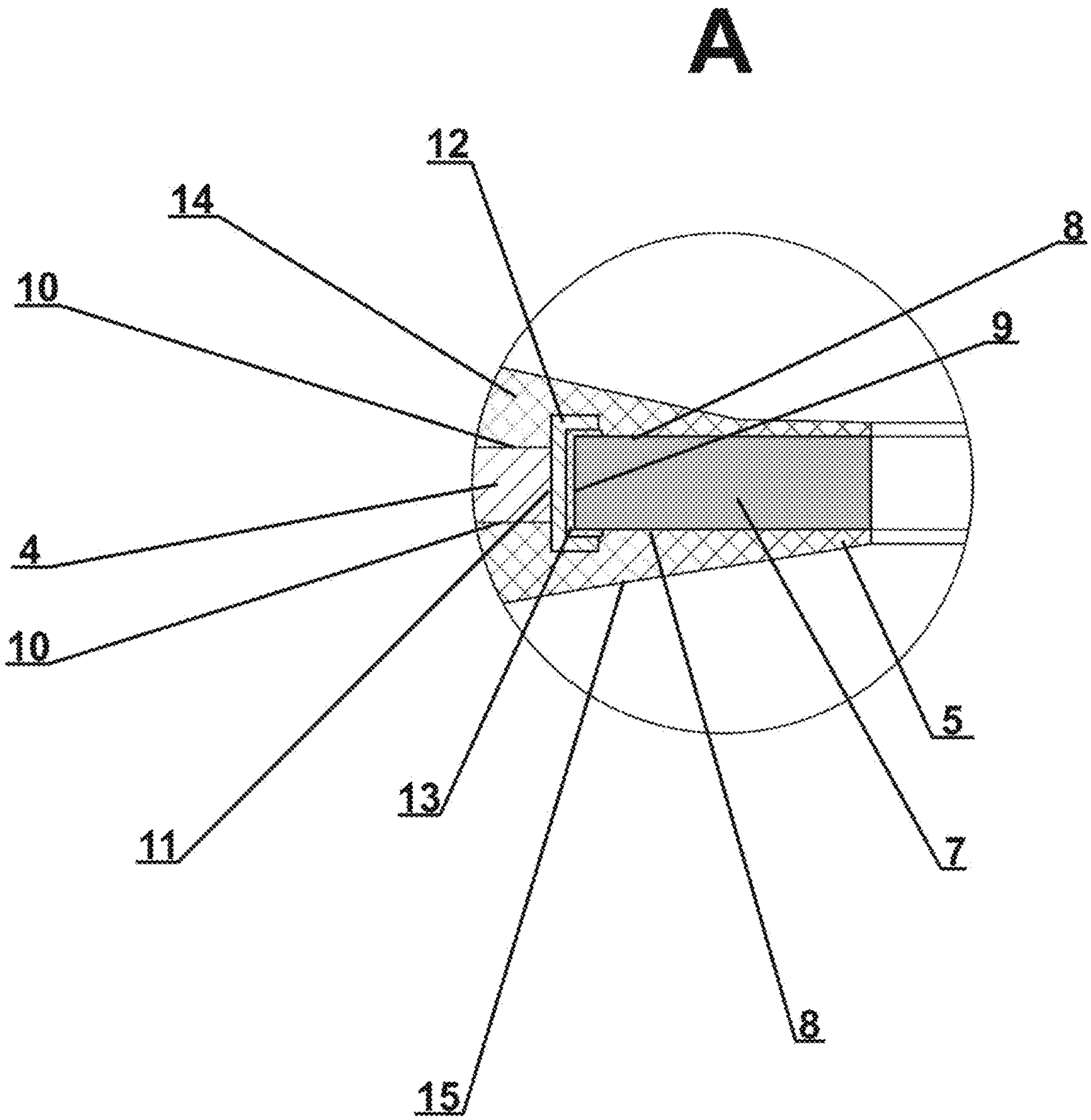
FIG. 9 shows area A illustrating the relative position of retaining shell 12, ledge 5, end surface 11 of rib 4 of inner frame 3 and insert 7 of wear-resistant material, side view.
Figure 36:
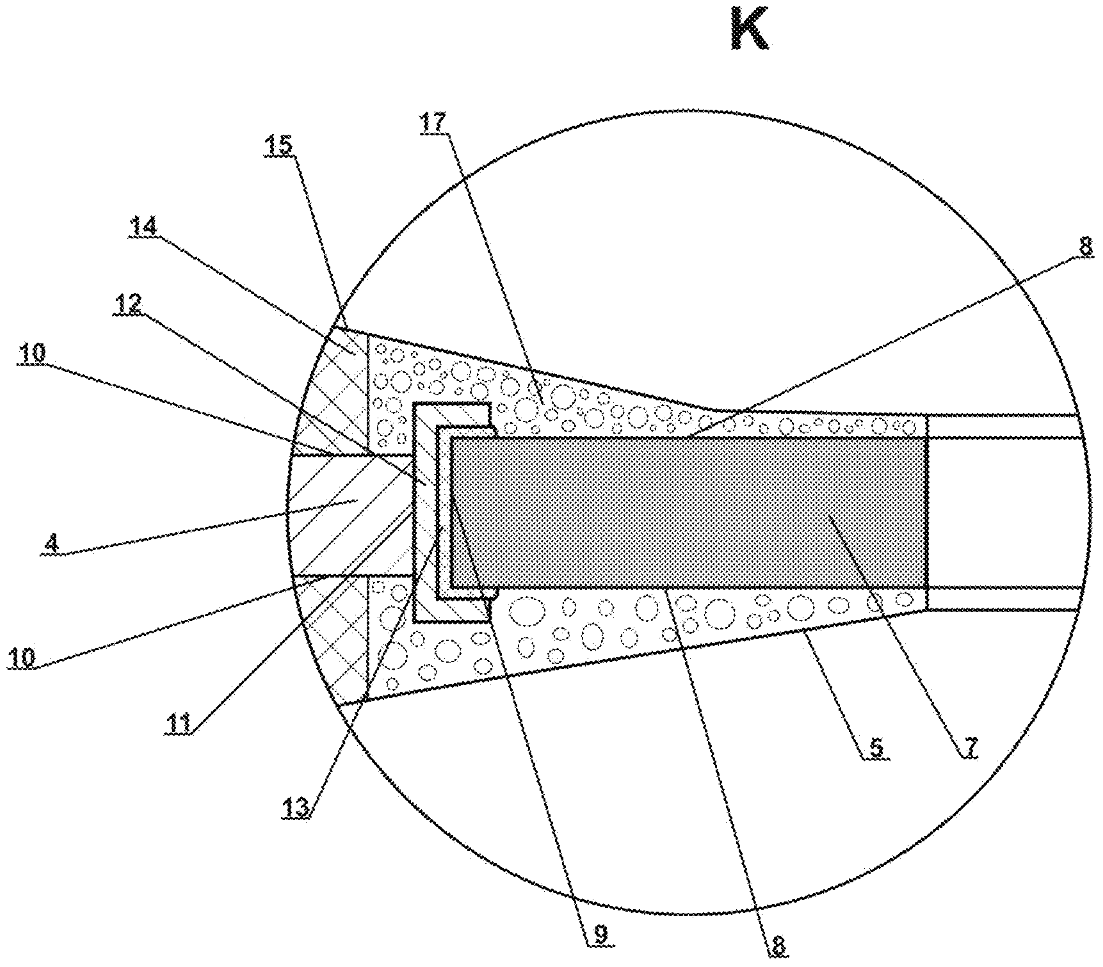
FIG. 36 shows the area K illustrating the relative position of rib 4 of inner frame 3, material 14, insert 7 of the wear-resistant material, epoxy compound 17 and connecting layer 13.

In turn, the inner surface of retaining shell 12 can be provided with connecting layer 13 designed to attach insert 7 made of wear-resistant material to the surface of retaining shell 12 as shown in FIGS. 9, 10 and 36. As connecting layer 13, the layer of any connecting material can be used. As an example of such connecting layer 13, an adhesive layer or a solder layer can be used as well as a layer of polyurethane, silicone, polyethylene, thermoplastic, raw rubber and their derivatives, or any other similar known materials.

In turn, for improved fixation of inserts 7 made of wear-resistant material used to form ledges 5, retaining shells 12 can be made U-shaped in cross-section as shown in FIGS. 9, 10 and 36. This cross-sectional shape of retaining shells 12 ensures reliable attachment of inserts 7 made of wear-resistant material to retaining shell 12, and, accordingly, increases the service lifetime of the claimed invention and ensures its reliability and maintainability.

As an example, elements 18 of inserts 7 made of wear-resistant material can be attached to end surface 11 of at least one rib 4 of inner frame 3 of upper part 1 of the concentration bowl from the side of base 9 of insert 7 using connecting layer 13 as shown in FIGS. 12, 13, 28 and 29. As connecting layer 13, the layer of any connecting material can be used. As an example of such connecting layer 13, an adhesive layer or a solder layer can be used as well as a layer of polyurethane, silicone, polyethylene, thermoplastic, raw rubber and their derivatives, or any other similar known materials. This implementation of connecting layer 13 provides a long service lifetime, ease of manufacture of the device and its reliability.

Also, as an example, inserts 7 made of wear-resistant material used to form at least one ledge 5 can be attached to end surface 11 of ribs 4 of inner frame 3 of upper part 1 of the concentration bowl using connecting layer 13 as shown in FIGS. 1, 2, 4, 5, 8-10, 30-33, 36, 43 and 50. As connecting layer 13, the layer of any connecting material can be used. As an example of such connecting layer 13, an adhesive layer or a solder layer can be used as well as a layer of polyurethane, silicone, polyethylene, thermoplastic, raw rubber and their derivatives, or any other similar known materials which allows to increase the service lifetime of the claimed invention and ensure its reliability.

Within the framework of the implementation of the claimed invention, at least one insert 7 made of wear-resistant material used to form at least one ledge 5 can be attached to end surface 11 of at least one rib 4 of inner frame 3 of upper part 1 of the concentration bowl as follows. For improved fixation of at least one insert 7 made of wear-resistant material, end surface 11 of at least one rib 4 of inner frame 3 of upper part 1 of the concentration bowl can be additionally provided with retaining shell 12 as shown in FIG. 3 and FIGS. 6, 7, 9, 10, 35 and 36. In turn, the inner surface of retaining shell 12 can be provided with connecting layer 13 designed to attach insert 7 made of wear-resistant material to the surface of retaining shell 12 as shown in FIGS. 9, 10 and 36. As connecting layer 13, the layer of any connecting material can be used. As an example of such connecting layer 13, an adhesive layer or a solder layer can be used as well as a layer of polyurethane, silicone, polyethylene, thermoplastic, raw rubber and their derivatives, or any other similar known materials. Each retaining shell 12 can be fixed to end surface 11 of at least one rib 4 of inner frame 3 of upper part 1 of the concentration bowl via any known method. As an example, retaining shell 12 can be fixed to end surface 11 of at least one rib 4 of inner frame 3 of upper part 1 of the concentration bowl by means of a welded joint, screw joint, bolt joint, rivet joint, glue, can be connected by soldering or can be fixed via any other known method. Providing end surface 11 with at least one rib 4 of inner frame 3 of upper part 1 of the concentration bowl with retaining shell 12 ensures reliable fastening of each insert 7 made of wear-resistant material used to form at least one ledge 5, on end surface 11, at least one rib 4 of inner frame 3 of upper part 1 of the concentration bowl, and, respectively, allows to increase the service lifetime of the claimed invention, to ensure its reliability as well as its maintainability. At the same time, the supply of the inner surface of retaining shell 12 with connecting layer 13 also ensures the maintainability of the claimed device.

In turn, for improved fixation of inserts 7 made of wear-resistant material used to form ledges 5, retaining shells 12 can be made U-shaped in cross-section as shown in FIGS. 9, 10 and 36. This cross-sectional shape of retaining shells 12 ensures reliable attachment of inserts 7 made of wear-resistant material to retaining shell 12, and, accordingly, increases the service lifetime of the claimed invention and ensures its reliability and maintainability.

In one of the possible embodiments of the claimed invention, insert 7 made of wear-resistant material used to form ledge 5 can be fixed on end surface 11 of at least one rib 4 of inner frame 3 of upper part 1 of the concentration bowl, close to the border of upper part 1 of the concentration bowl and lower part 2 of the concentration bowl as shown in FIGS. 1-8, 14, 16, 18, 20, 22, 24, 26-30, 32, 34, 35, 37, 39, 41, 43 and 50. This embodiment of the design of the claimed invention makes it possible to significantly increase the service lifetime of the claimed invention and its reliability since it is at this site that the greatest abrasive wear of the concentration bowl occurs.

As one of the possible embodiments for implementing the modular concentration bowl, inserts 7 made of wear-resistant material used to form ledges 5 can be fixed to end surfaces 11 of all ribs 4 of inner frame 3 of upper part 1 of the concentration bowl as shown in FIGS. 2, 5, 14, 16, 18, 20, 22, 24, 26, 29, 30, 33, 35, 37 and 39. Such a design embodiment of the claimed invention makes it possible to significantly increase its service lifetime as well as the reliability of the claimed device.

Figure 30:
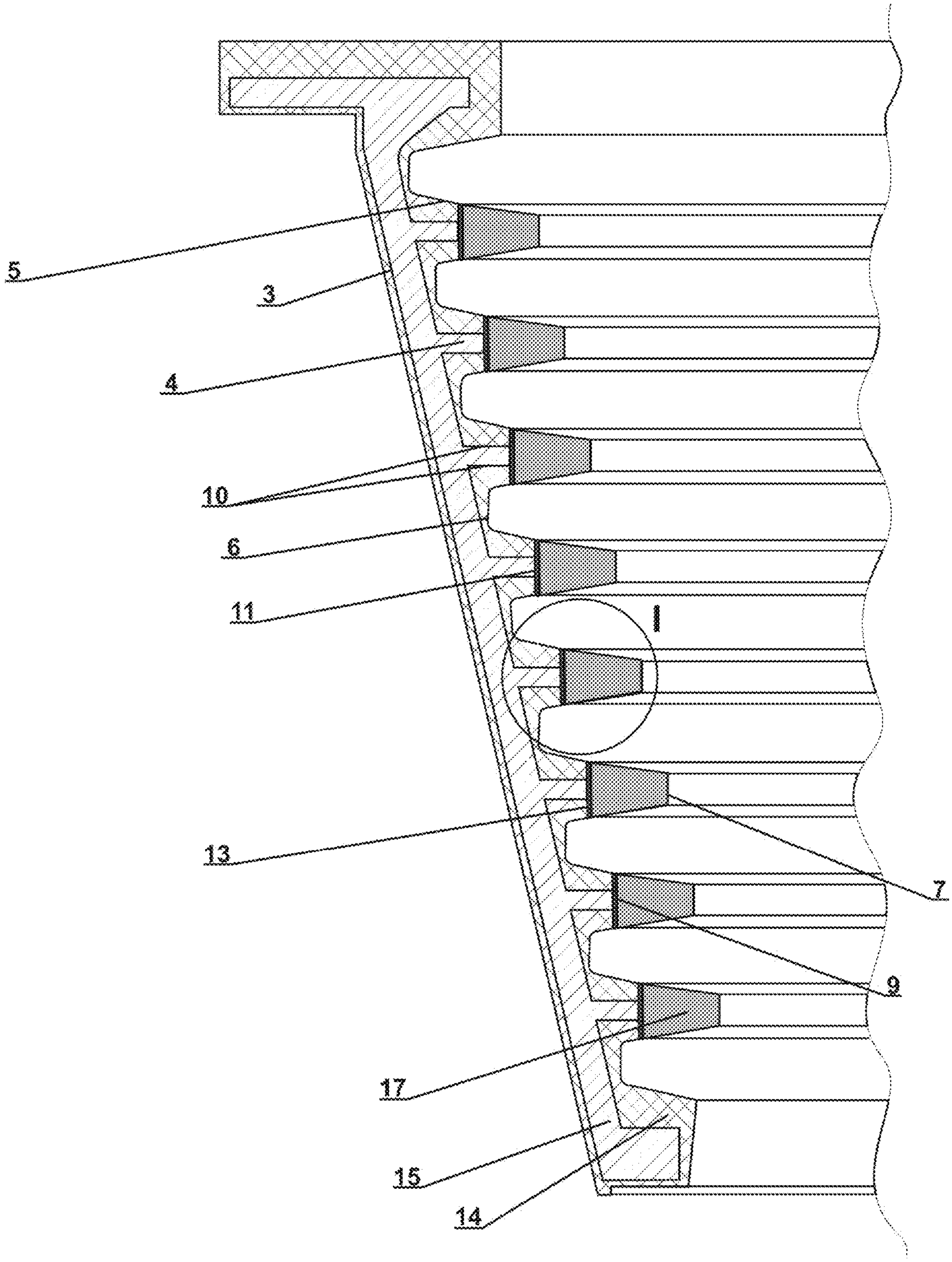
FIG. 30 illustrates a schematic diagram of upper part 1 of the concentration bowl, to end surfaces 11 of ribs 4 of inner frame 3 of which, with the help of connecting layer 13, inserts 7 of wear-resistant material made of epoxy compound 17 are attached, side view.
Figure 31:
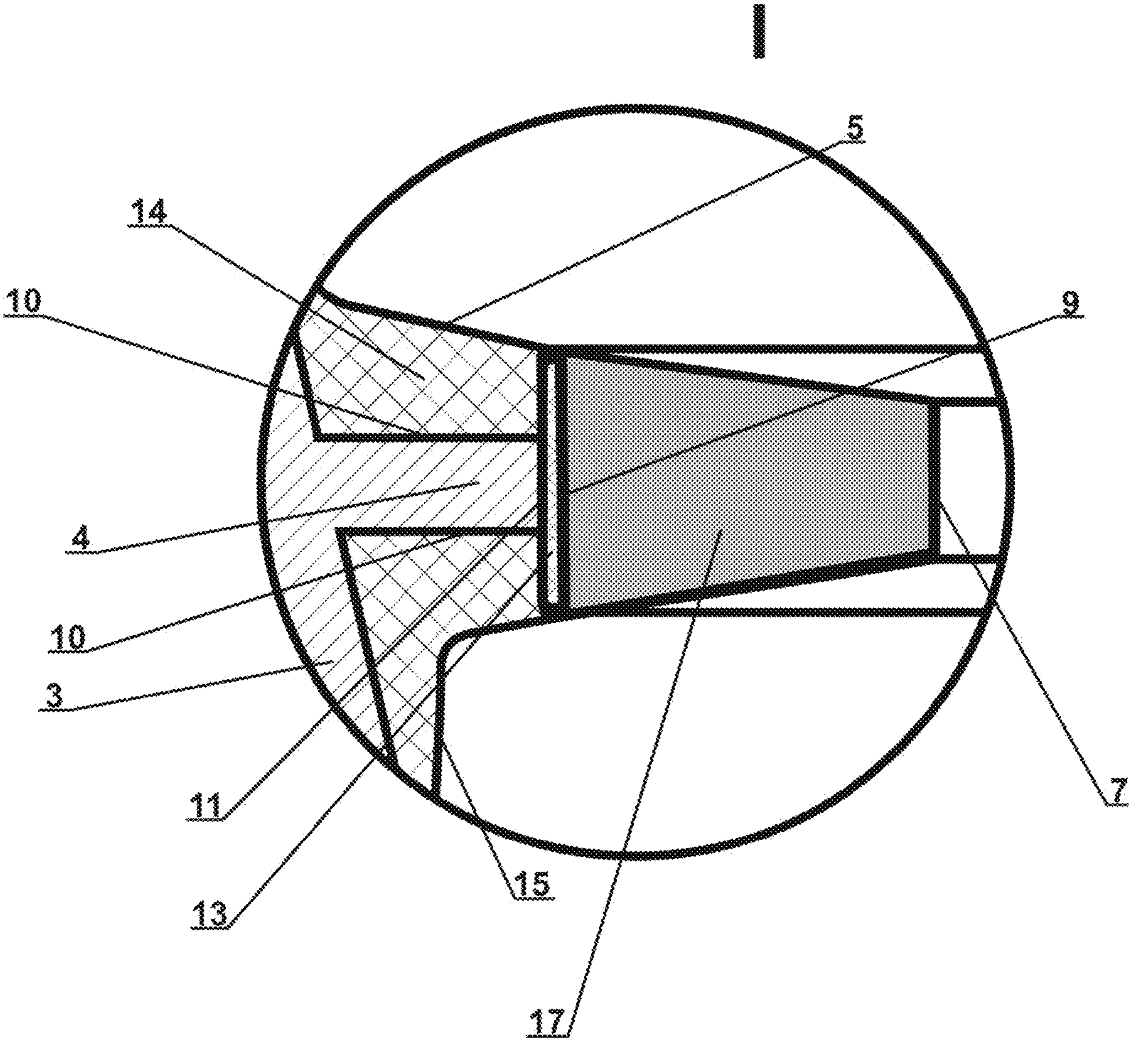
FIG. 31 shows the area I illustrating the relative position of ledge 5, inserts 7 made of wear-resistant material, ribs 4 of inner frame 3, connecting layer 13 and material 14.

As one of the possible embodiments for implementing the modular concentration bowl, at least one insert 7 made of wear-resistant material used to form at least one ledge 5 can be made of epoxy compound 17 with the filler, as which, for example, any known ceramics, aluminum oxide, zirconium oxide, titanium nitride as well as metal and nonmetal carbides, for example, silicon carbide or tungsten carbide, or technical diamond can be used. In this case, at least one insert 7 made of wear-resistant material used to form at least one ledge 5 can be attached to end surface 11 of at least one rib 4 of inner frame 3 of upper part 1 of the concentration bowl in the case of supplying the side wall of inner frame 3 of upper part 1 of the concentration bowl, at least one rib 4 of inner frame 3 of upper part 1 of the concentration bowl, as shown in FIG. 30-33 which ensures the maintainability of the claimed invention. Furthermore, in order to ensure the maintainability of the modular concentration bowl, at least one insert 7 made of wear-resistant material used to form at least one ledge 5, and made of epoxy compound 17 with the filler, can additionally be fixed on end surface 11, of at least one rib 4 of inner frame 3 of upper part 1 of the concentration bowl by means of connecting layer 13 as shown in FIG. 30-33. In this case, if base 9 of at least one insert 7 made of wear-resistant material is performed more than end surface 11 of at least one rib 4 of inner frame 3 of upper part 1 of the concentration bowl, base 9 of at least one insert 7 made of wear-resistant material can be attached simultaneously to the end surface 11, of at least one rib 4 of inner frame 3 of upper part 1 of the concentration bowl, and to material 14 of working surface 15, for example, by means of connecting layer 13 as shown in FIG. 30 and FIG. 31.

Figure 32:
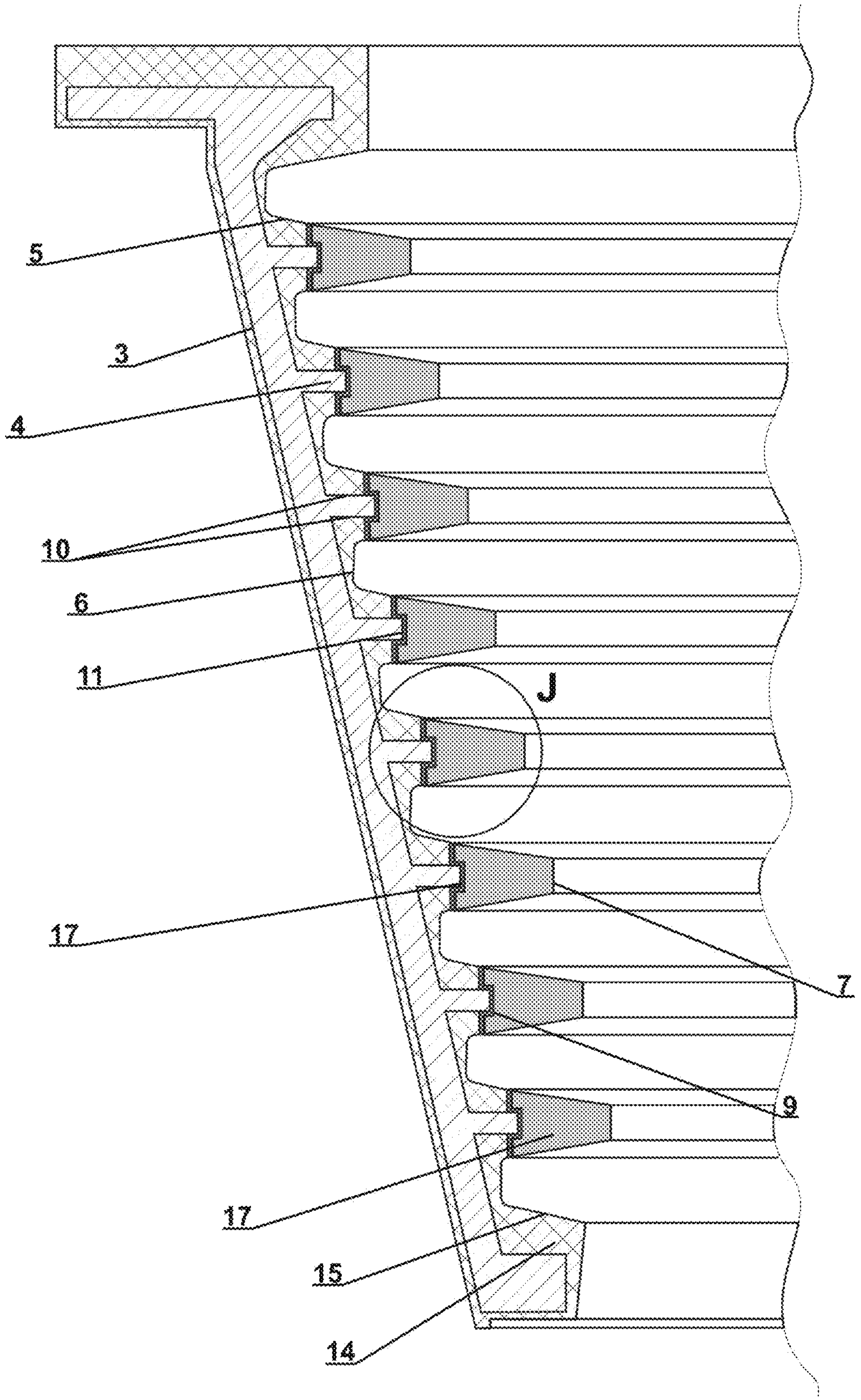
FIG. 32 illustrates a schematic diagram of upper part 1 of the concentration bowl, to end surfaces 11 of ribs 4 of inner frame 3 of which, with the help of connecting layer 13, inserts 7 of wear-resistant material made of epoxy compound 17 are attached, and bases 9 of inserts 7 of wear-resistant material are made in the form of a groove, side view.
Figure 33:
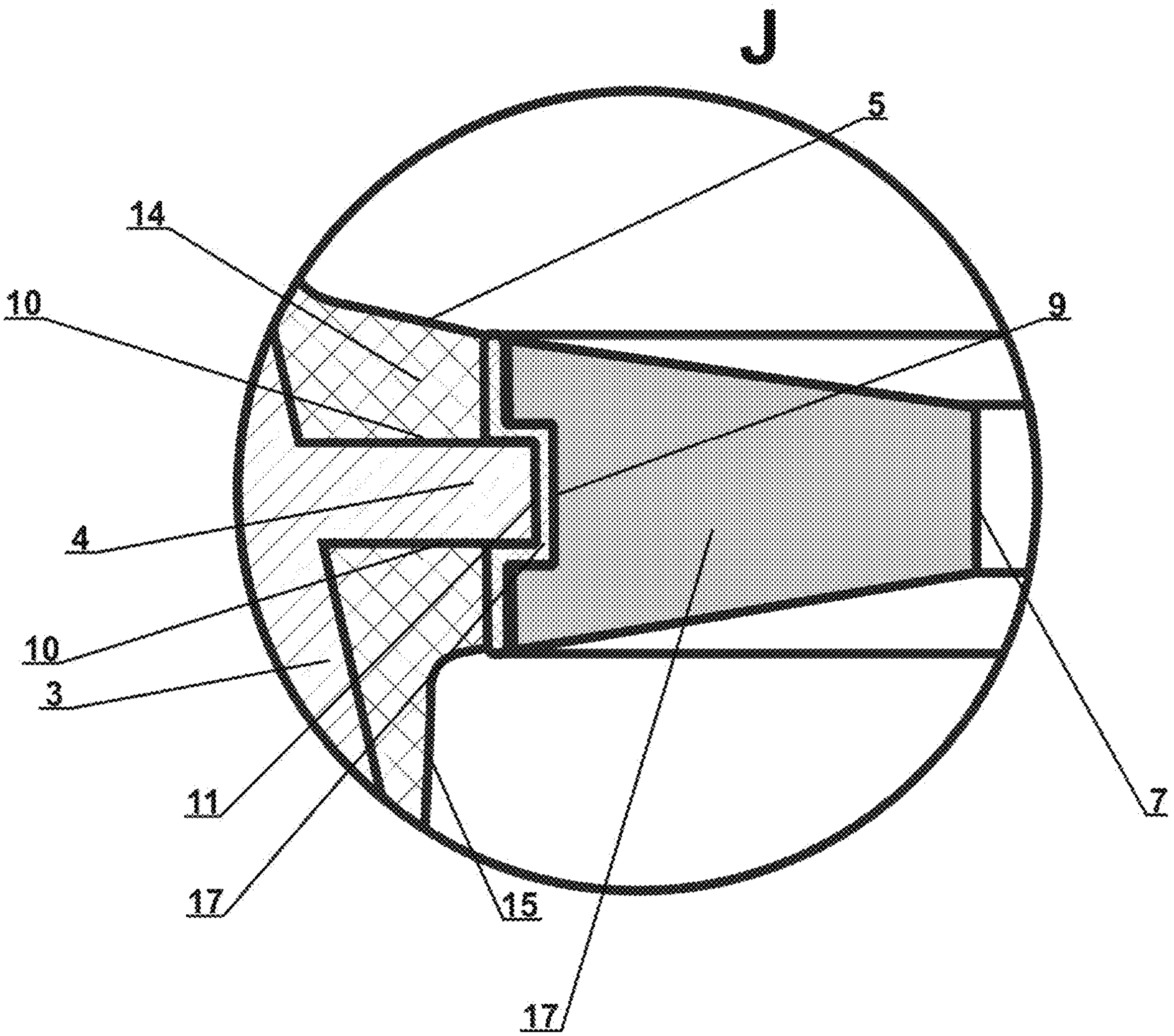
FIG. 33 shows the area J illustrating the relative position of ledge 5, inserts 7 made of wear-resistant material, base 9 of which is made in the form of a groove, rib 4 of inner frame 3, connecting layer 13 and material 14.

In addition, at least one insert 7 made of wear-resistant material used to form at least one ledge 5, and made of epoxy compound 17 with the filler, can be additionally fixed on end surface 11 and on the sections of side surfaces 8 that are close to end surface 11, of at least one rib 4 of inner frame 3 of upper part 1 of the concentration bowl using connecting layer 13 or using a layer of epoxy compound 17 with the filler as shown in FIG. 32 and FIG. 33. In this case, base 9, at least one insert 7 of a wear-resistant material, is made essentially in the form of a groove and is made with the possibility of articulation with at least one rib 4 of inner frame 3 of upper part 1 of the concentration bowl according to the “mortise and tenon” principle. In this case, base 9 of at least one insert 7 made of wear-resistant material can be attached simultaneously to end surface 11 of at least one rib 4 of inner frame 3 of upper part 1 of the concentration bowl, and to material 14 of working surface 15, for example, using connecting layer 13 as shown in FIG. 32 and FIG. 33.

The inner surface of the side wall of inner frame 3 of upper part 1 of the claimed concentration bowl can be covered with material 14.

In the case of at least one ledge 5 and at least one insert 7 made of wear-resistant material used to form at least one ledge 5, respectively, with the possibility of independent replacement, the inner surface of the side wall of inner frame 3 of upper part 1 of the claimed concentration bowl can be covered with material 14 with the formation of cavities 6 of working surface 15 between the attachment points of ledges 5.

Also, as one of the possible embodiments for the implementation of the claimed modular concentration bowl with the formation of the inner surface of the side wall of inner frame 3 of upper part 1 of the claimed concentration bowl can be covered with material 14 of working surface 15, including ledges 5 and cavities 6, located between ledges 5.

Figure 34:
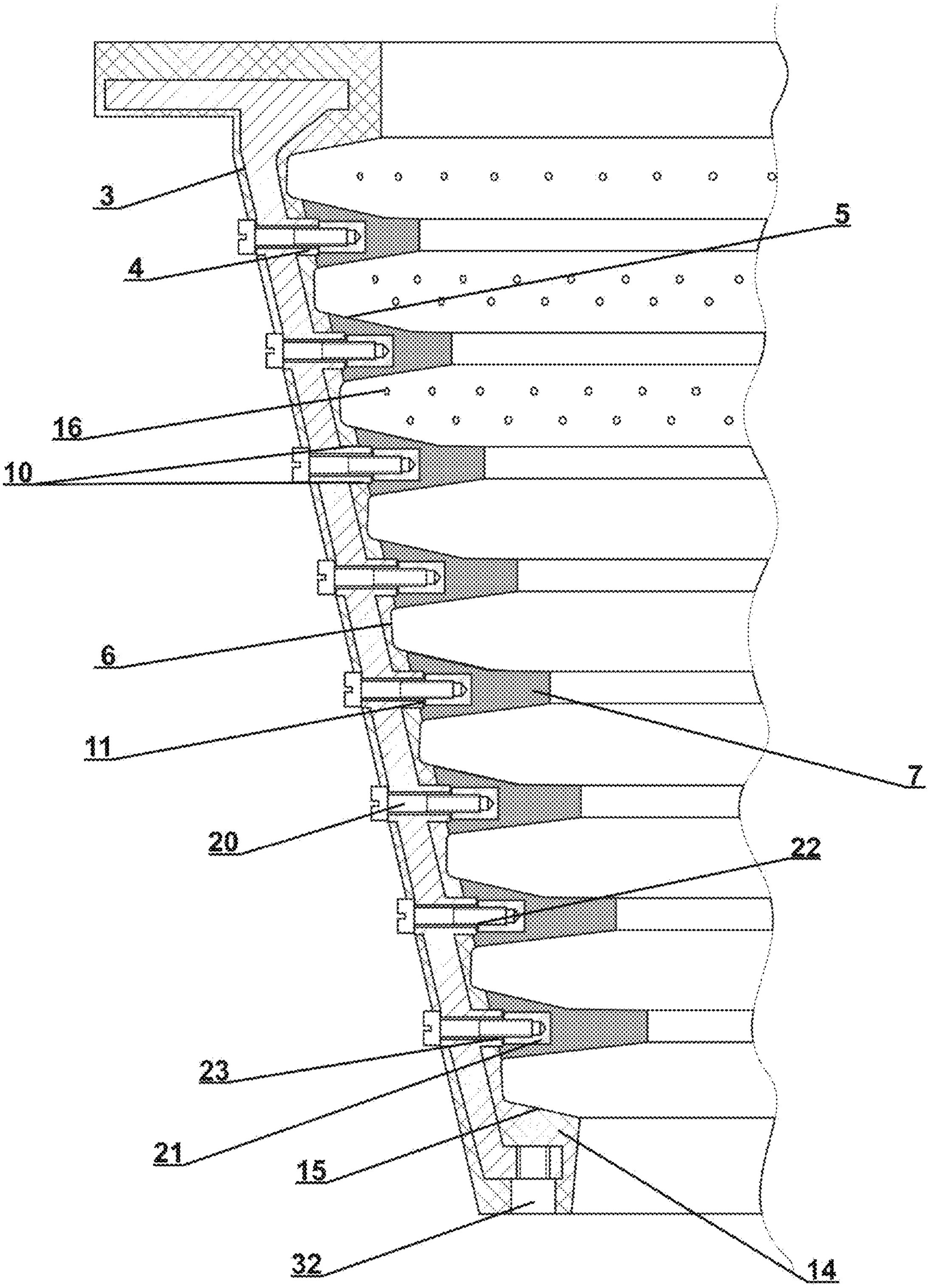
FIG. 34 illustrates a schematic diagram of upper part 1 of the concentration bowl, ledges 5 of which are made with a thickness deviation in the direction from top to bottom, side view.
Figure 35:
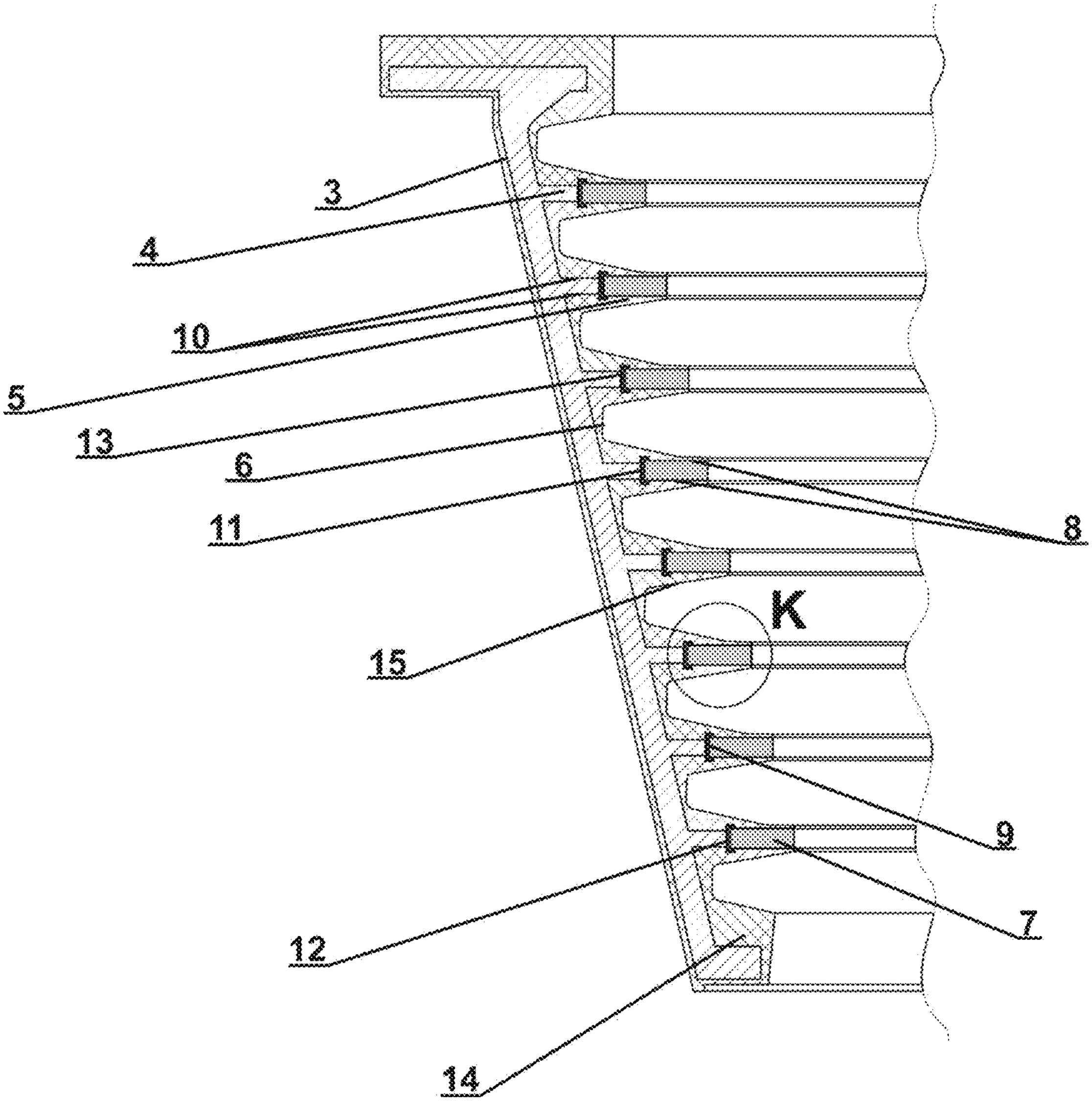
FIG. 35 shows a schematic diagram of upper part 1 of the concentration bowl, to end surfaces 11 of ribs 4 of inner frame 3 of which, with the help of connecting layer 13, inserts 7 of wear-resistant material are attached, fixed at least on both sides with epoxy compound 17, side view.

In turn, the angle of inclination of working surface 15 of material 14 can be from 15° to 90° to the horizontal surface. As an example of such a design of working surface 15, the thickness of ledges 5 can increase in the direction from top to bottom towards the bottom part 2 of the concentration bowl as shown in FIG. 34.

As an example, at least one ledge 5 in this case can be made with the possibility of independent replacement. At the same time, for the formation of at least one ledge 5, at least one insert 7 made of wear-resistant material can be used, additionally equipped with reinforcing insert 21 for attachment to at least one rib 4 of inner frame 3 of upper part 1 of the claimed concentration bowl using fastener 20.

In any of the possible embodiments of the claimed invention, working surface 15 can be made in such a way that at least one insert 7 made of wear-resistant material used to form at least one ledge 5 can be additionally fixed with material 14 of working surface 15, at least on both sides, as shown in FIGS. 1-10, 15, 17, 25, 35, 36, 43 and 50. This possible arrangement of inserts 7 made of wear-resistant material leads to additional fixation of these inserts 7 made of wear-resistant material with the entire thickness of the layer of material 14 of which working surface 15 of the claimed concentration bowl is made. This design makes it possible to ensure the maintainability of the claimed invention.

As an example, at least one insert 7 made of wear-resistant material used to form at least one ledge 5 can be fixed with material 14 of working surface 15 by fixing at least two side faces 8 of inserts 7 made of wear-resistant material, as shown in FIGS. 1-10, 15, 17, 25, 35, 36, 43 and 50. This design makes it possible to significantly increase the service lifetime of the modular concentration bowl and its reliability due to the reliable fixation of inserts 7 made of wear-resistant material.

Also, as an example, at least one insert 7 made of wear-resistant material used to form at least one ledge 5 can be fixed with material 14 of working surface 15 by fixing at least two side faces 8 of inserts 7 made of wear-resistant material. Moreover, material 14 can be made in the form of a combination of an elastic material and epoxy compound 17 with a filler for which can be used, for example, any known ceramics, aluminum oxide, zirconium oxide, titanium nitride as well as metal and nonmetal carbides, for example, silicon carbide or tungsten carbide, or technical diamond. Moreover, in this case, as shown in FIG. 36, fixation in the area of at least two side faces 8 of inserts 7 made of wear-resistant material can be carried out using epoxy compound 17 with the filler which ensures the maintainability of the claimed invention.

In the case of supplying end surface 11 with at least one rib 4 of inner frame 3 of upper part 1 of the concentration bowl with shell 12, in addition to supplying the inner surface of shell 12 with connecting layer 13 for attaching insert 7 used to form at least one ledge 5, from the side of its base 9, side surfaces 8 of any of inserts 7 used to form at least one ledge 5 can also be provided with additional connecting layer 13 designed to improve the connection of side surfaces

Figure 1:
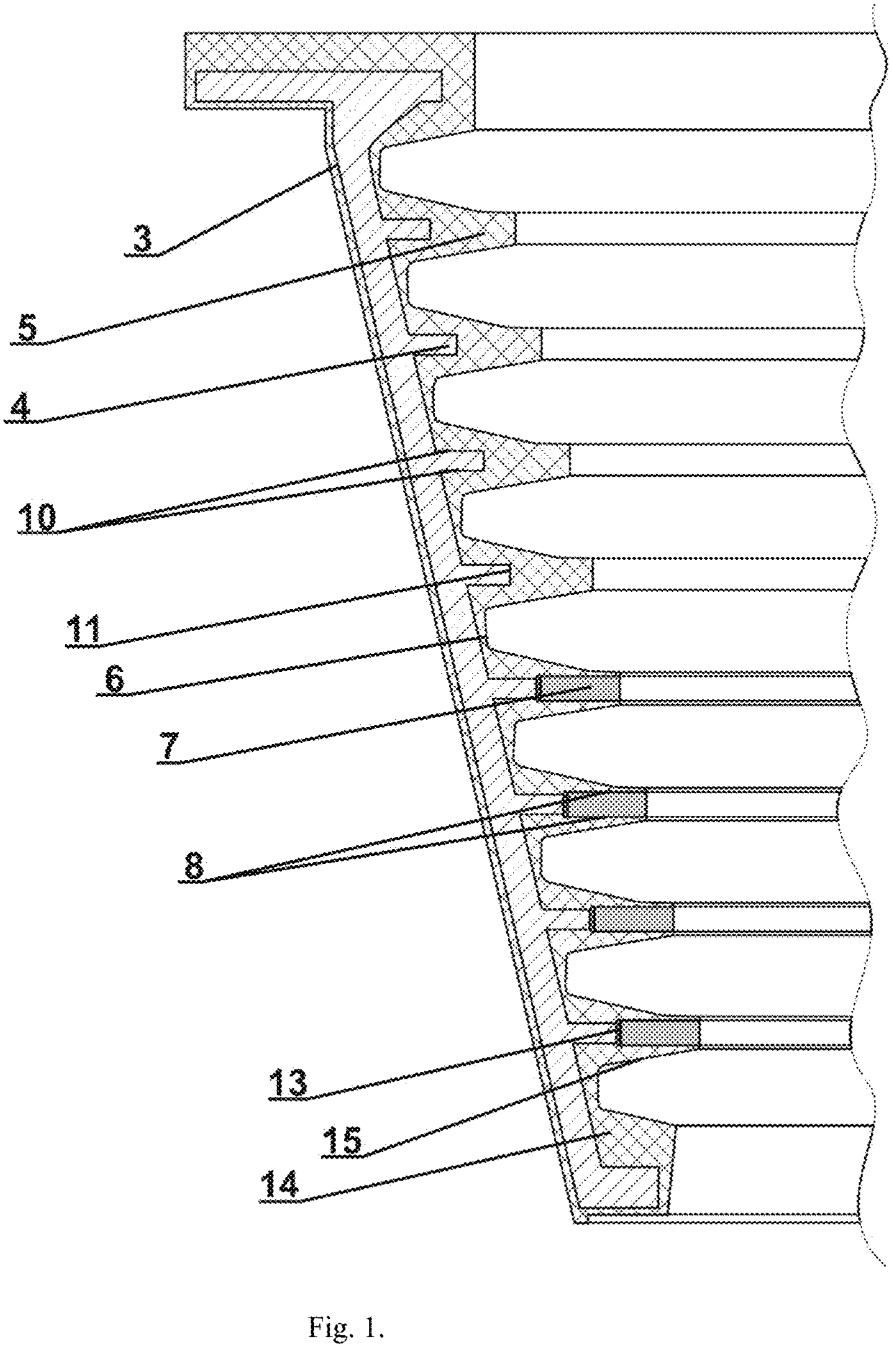
FIG. 1 shows a schematic diagram of upper part 1 of the concentration bowl, end surface 11 of at least one rib 4 of inner frame 3 of which is provided with insert 7 of wear-resistant material, side view.
Figure 2:
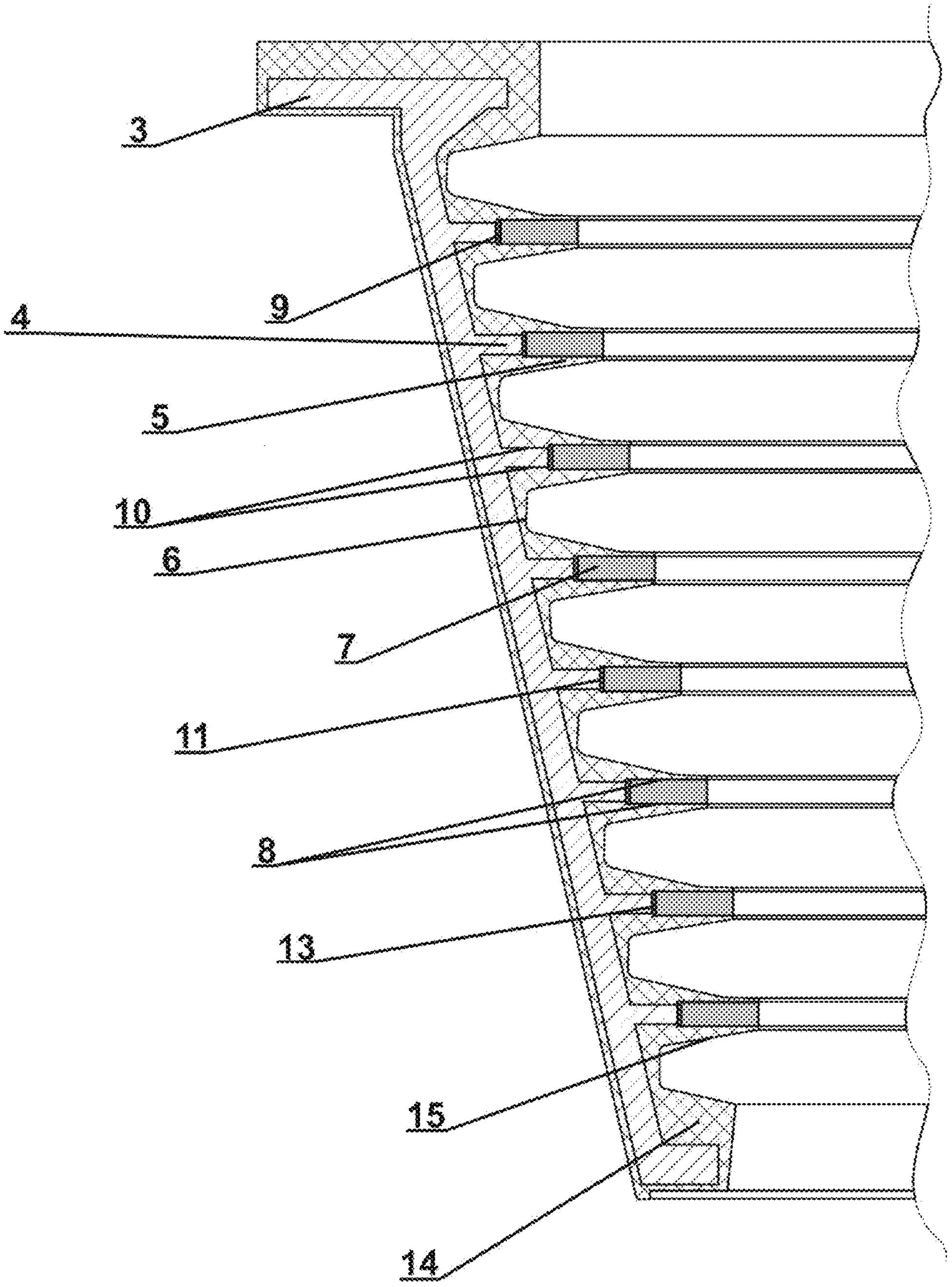
FIG. 2 shows a schematic diagram of upper part 1 of the concentration bowl, end surfaces 11 of all ribs 4 of inner frame 3 of which are provided with inserts 7 of wear-resistant material, side view.
Figure 3:
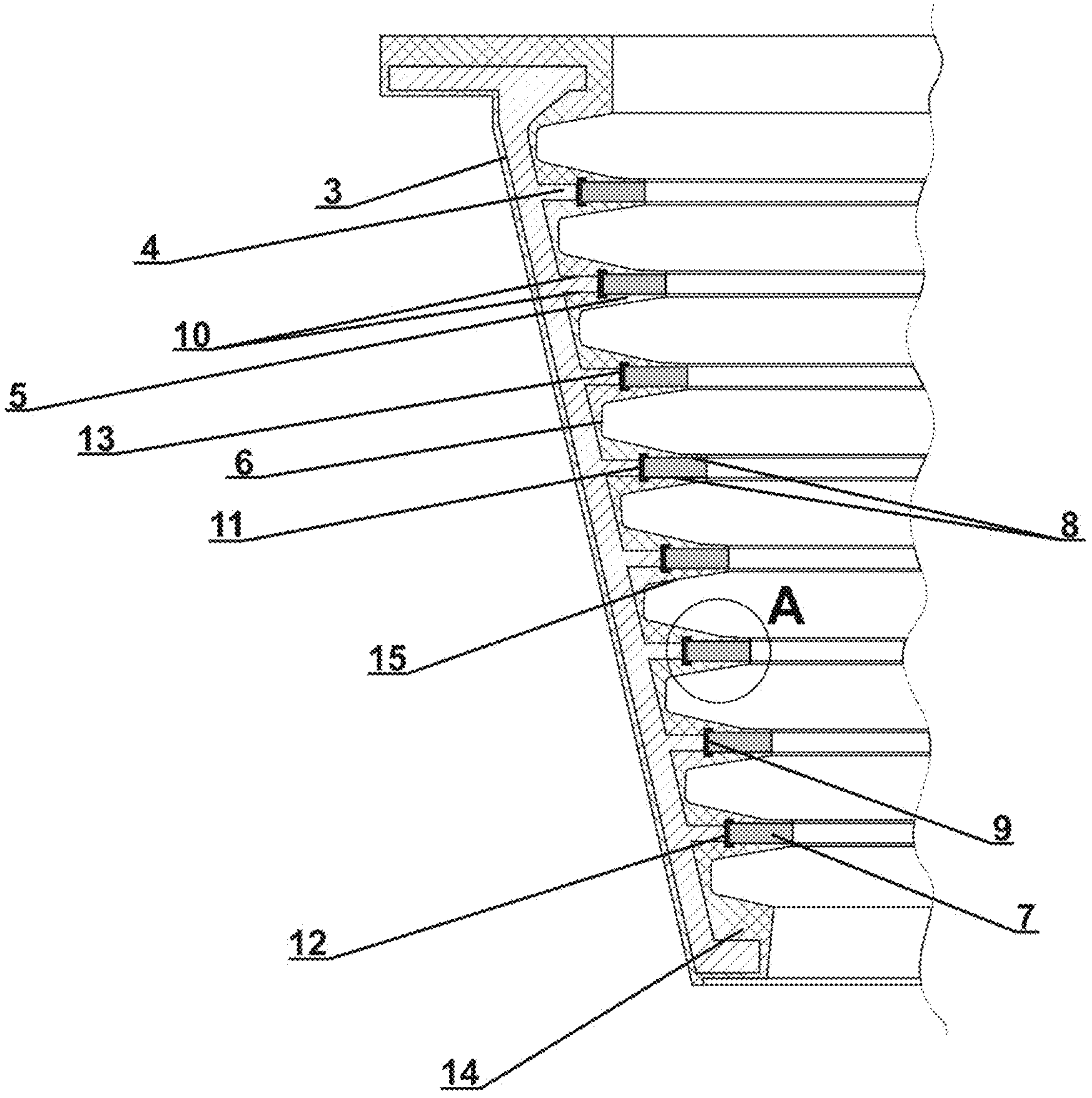
FIG. 3 shows the embodiment of implementing the modular concentration bowl with mounting inserts 7 of wear-resistant material on end surface 11 of ribs 4 of inner frame 3 using retaining shells 12, side view.
Figure 4:
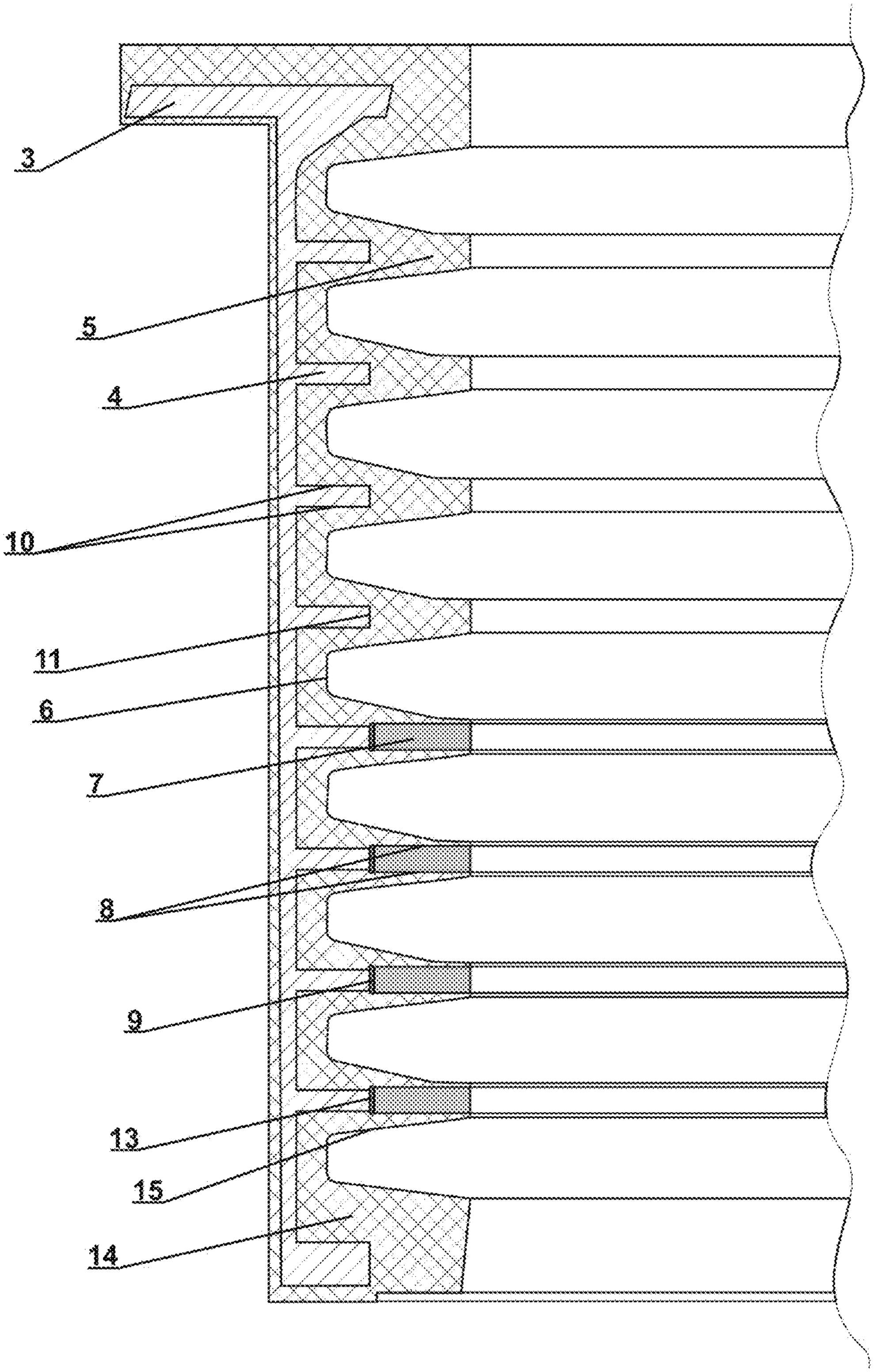
FIG. 4 shows a schematic diagram of upper part 1 of the concentration bowl, end surface 11 of at least one rib 4 of inner frame 3 of which is provided with insert 7 of wear-resistant material, and the side wall of inner frame 3 is made at the angle of 90° to the horizontal surface, side view.
Figure 5:
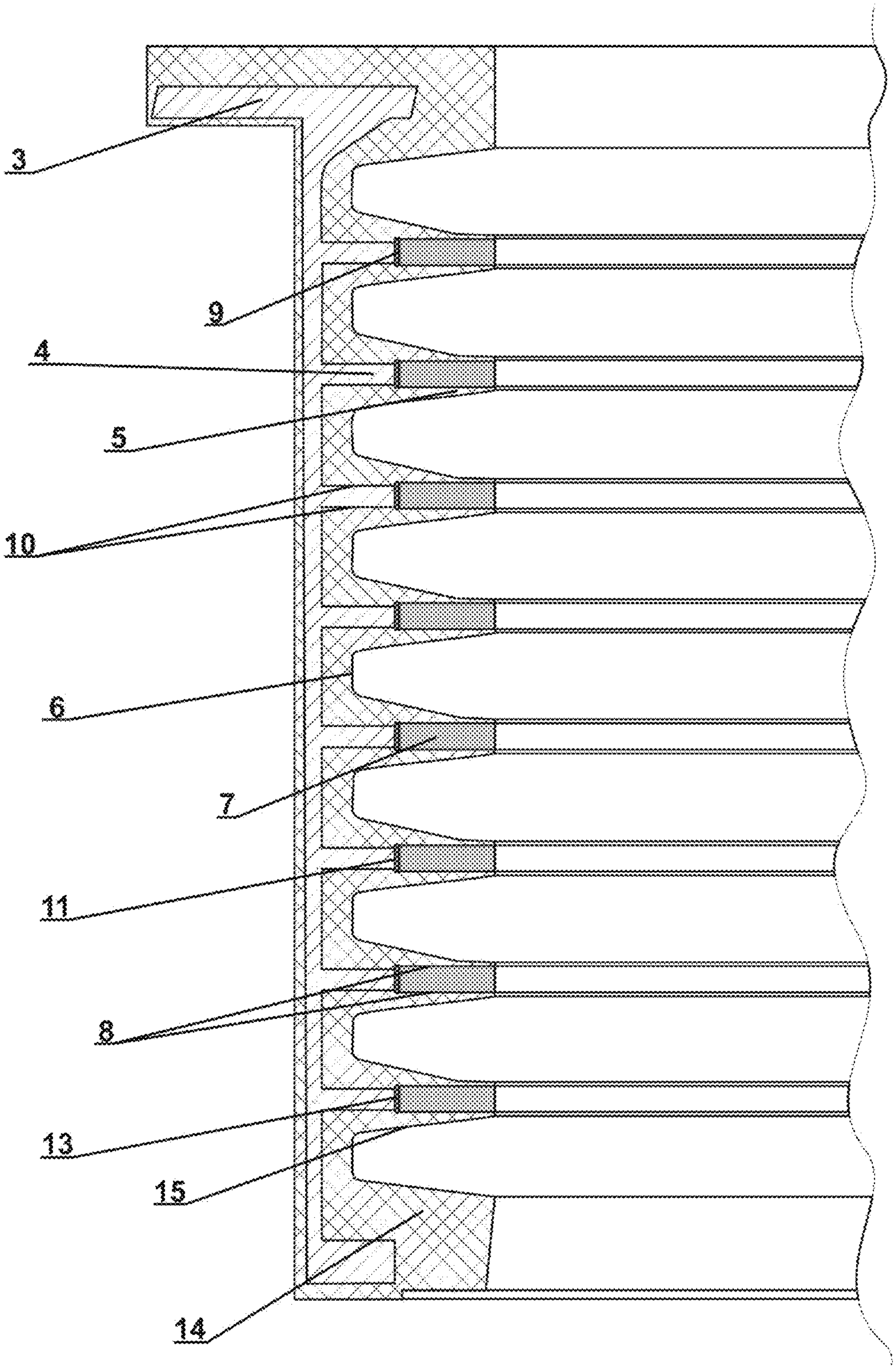
FIG. 5 shows a schematic diagram of upper part 1 of the concentration bowl, end surfaces 11 of all ribs 4 of inner frame 3 of which are provided with inserts 7 of wear-resistant material, and the side wall of inner frame 3 is made at the angle of 90° to the horizontal surface, side view.
Figure 6:
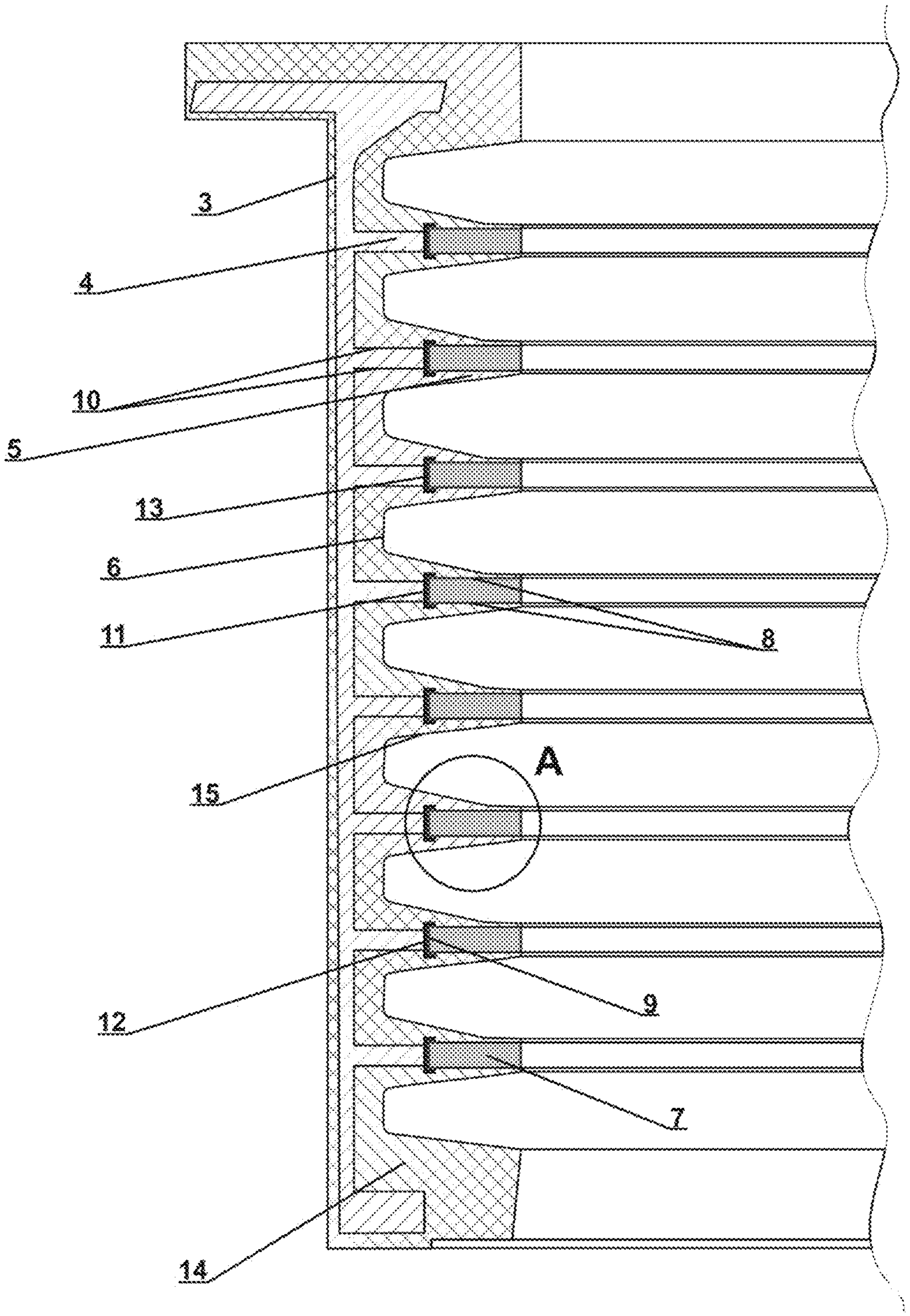
FIG. 6 shows the embodiment of the implementation of a modular concentration bowl with inserts 7 made of wear-resistant material, on end surface 11 of ribs 4 of inner frame 3 using retaining shells 12 and the side wall of inner frame 3, made at the angle of 90° to the horizontal surface, side view.
Figure 7:
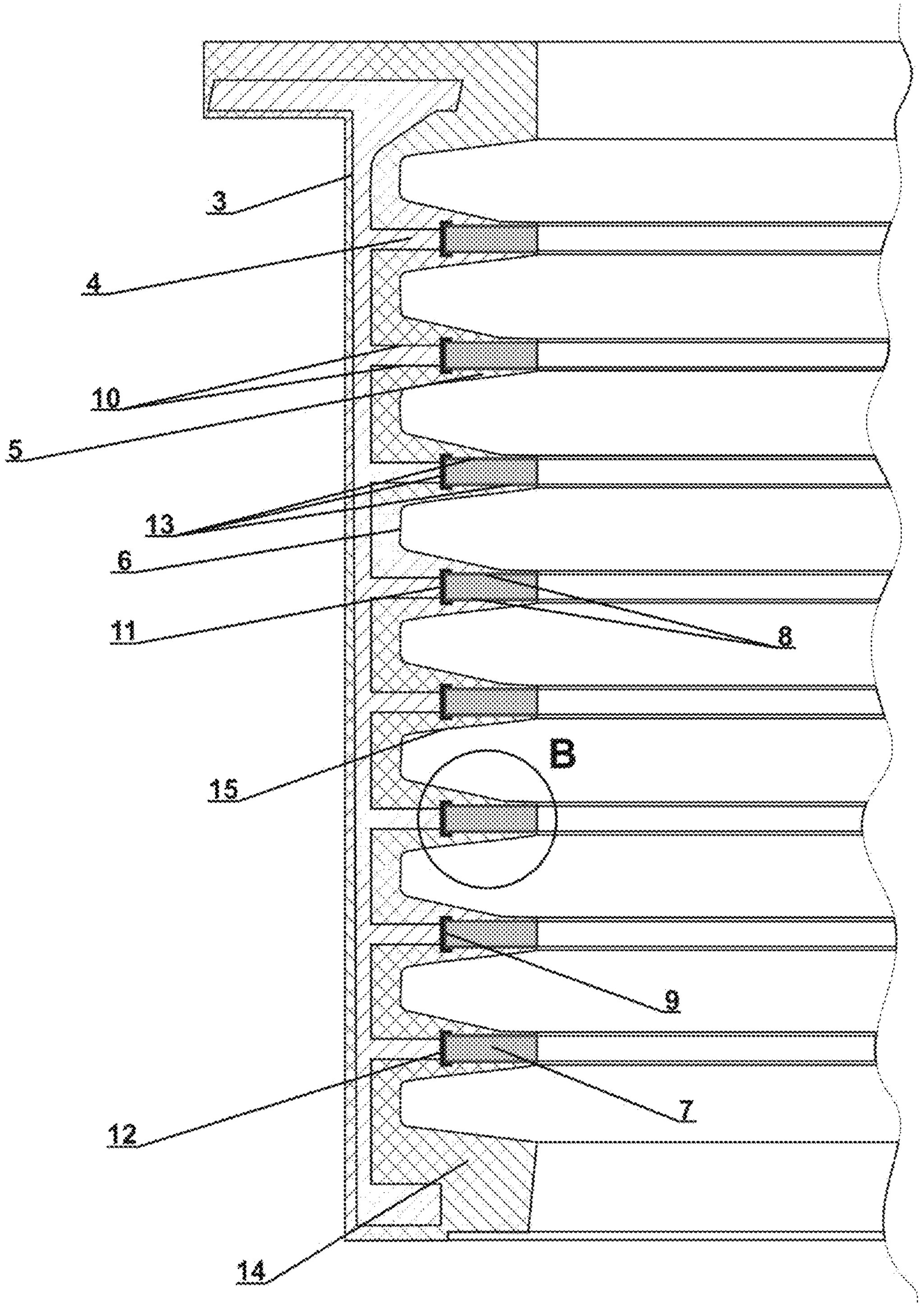
FIG. 7 shows the embodiment of the implementation of the modular concentration bowl with inserts 7 made of wear-resistant material attached to end surface 11 of ribs 4 of inner frame 3 using retaining shells 12, and the side wall of inner frame 3 of the modular concentration bowl, made at the angle of 90° to the horizontal surface, side view. Moreover, side surfaces 8 of inserts 7 are provided with additional connecting layer 13.

8 of inserts 7 with material 14 of working surface 15 as shown in FIG. 7 and FIG. 10. Such a supply of side surfaces 8 of inserts 7 with additional connecting layer 13 makes it possible to improve the fixation of inserts 7 with material 14 of working surface 15 which means to increase the service lifetime of the claimed invention and its reliability as well as to ensure its maintainability.

Besides, within the framework of the implementation of the claimed invention, the entire surface of inserts 7 made of wear-resistant material used to form at least one ledge 5 can be covered with material 14 from which working surface 15 of the claimed concentration bowl is made. Thus, at least one insert 7 of wear-resistant material used to form at least one ledge 5 can be attached to end surface 11 of at least one rib of inner frame 3 of upper part 1 of the concentration bowl from the side of base 9 of insert 7 made of wear-resistant material and additionally fixed from three sides using material 14 of working surface 15. The implementation of such a design makes it possible to significantly increase the service lifetime of the modular concentration bowl and its reliability due to the reliable fixation of inserts 7 made of wear-resistant material and ensure the maintainability of the claimed invention.

Besides, a part of the surface of inserts 7 made of wear-resistant material used to form ledges 5 can be located above the level of working surface 15. As an example, the surface of insert 7 made of wear-resistant material and facing towards the free volume of the claimed concentration bowl can be made protruding from the level of working surface 15. Such a constructive solution ensures an increase in the service lifetime of the claimed concentration bowl and its reliability.

Within the framework of the implementation of the claimed invention, working surface 15 of upper part 1 of the concentration bowl can be made with the possibility of independent replacement.

Figure 37:
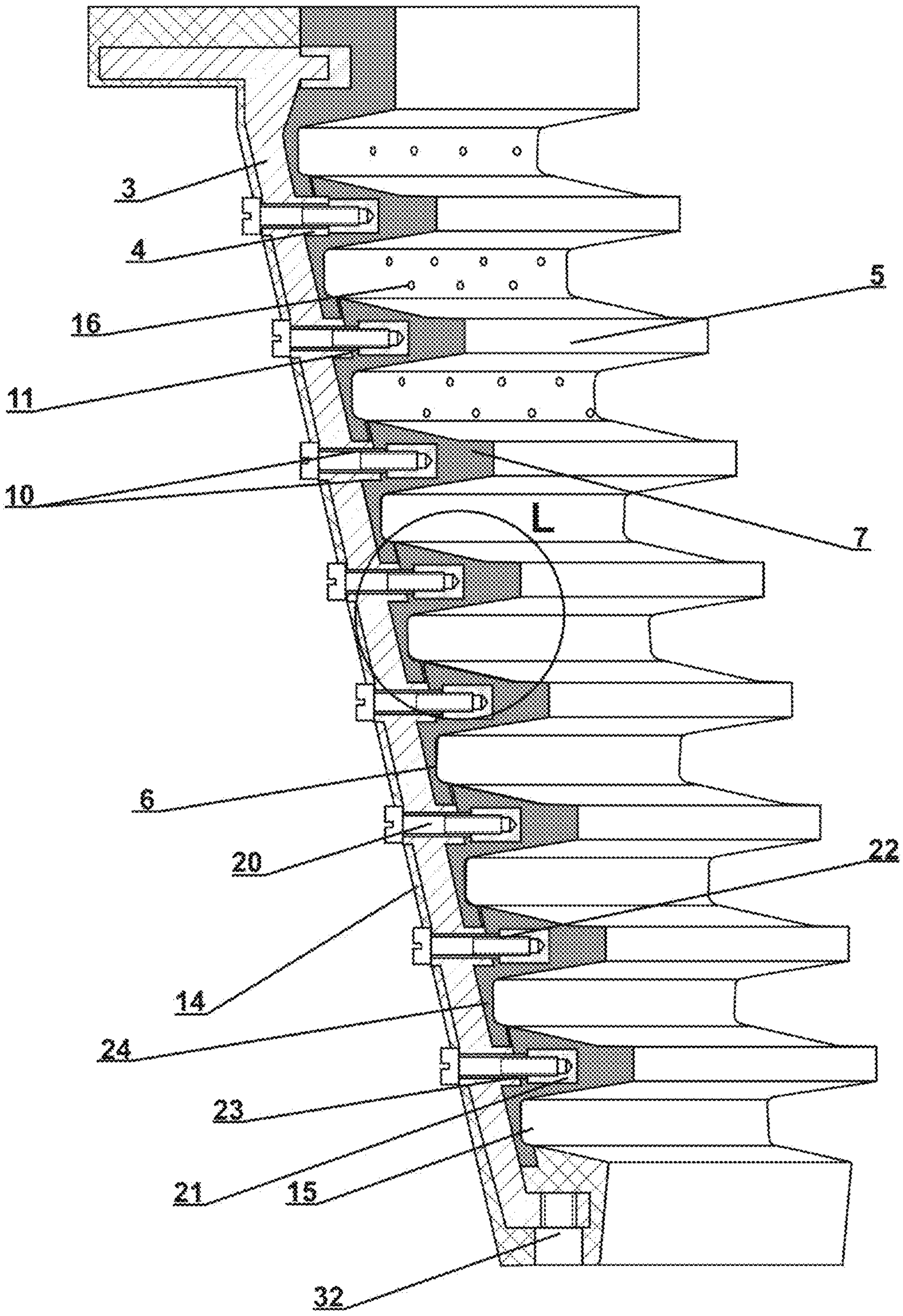
FIG. 37 shows the embodiment of performing upper part 1 of the concentration bowl, working surface 15 of which is made with the possibility of independent replacement and at least one ledge 5 of working surface 15, made with the possibility of independent replacement, is provided with plate 24, side view.
Figure 38:
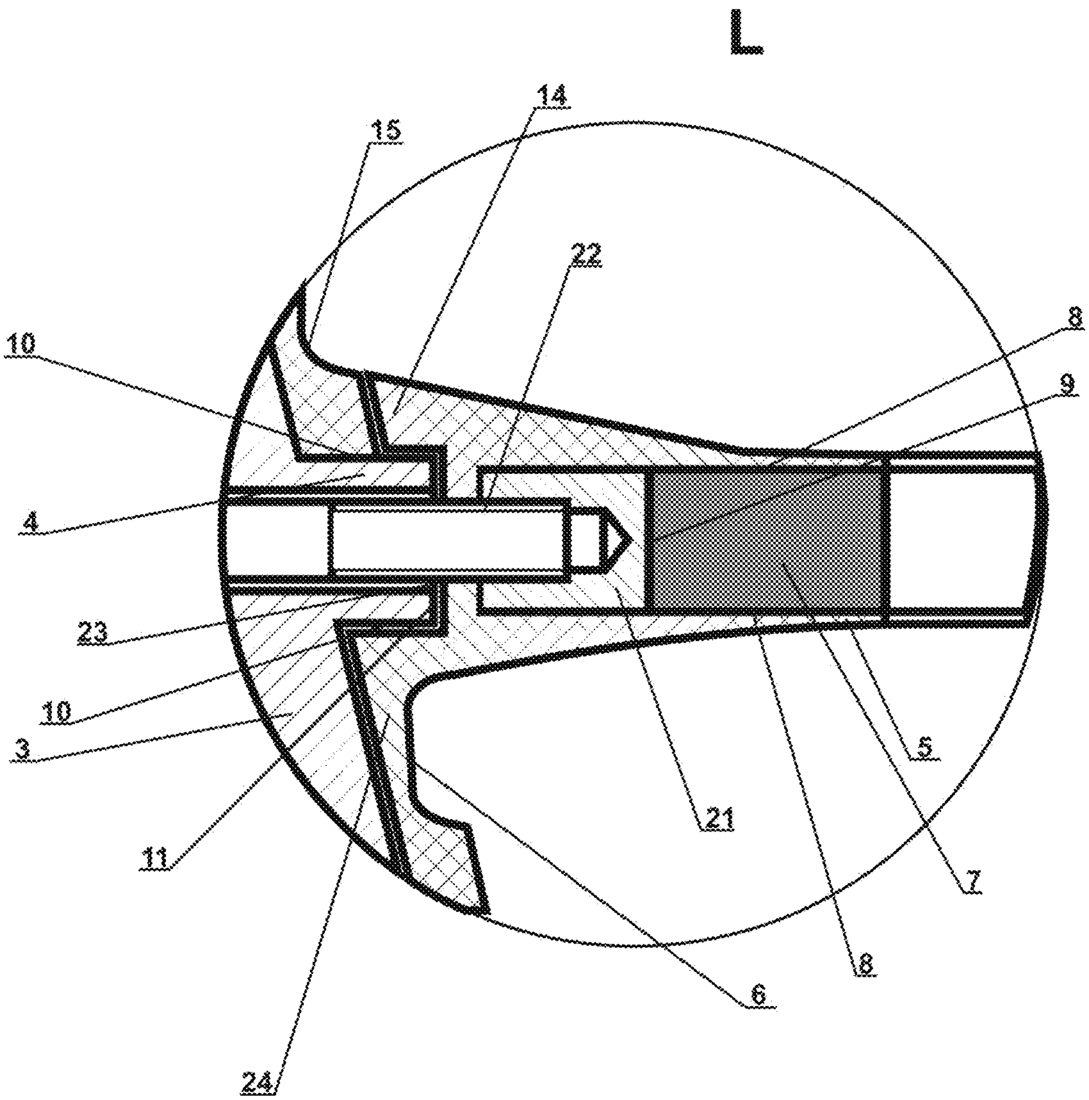
FIG. 38 shows the area L illustrating the relative position of ledge 5, plate 24, inserts 7 made of wear-resistant material, reinforcing insert 21, ribs 4 of inner frame 3 and fastener 20.
Figure 39:
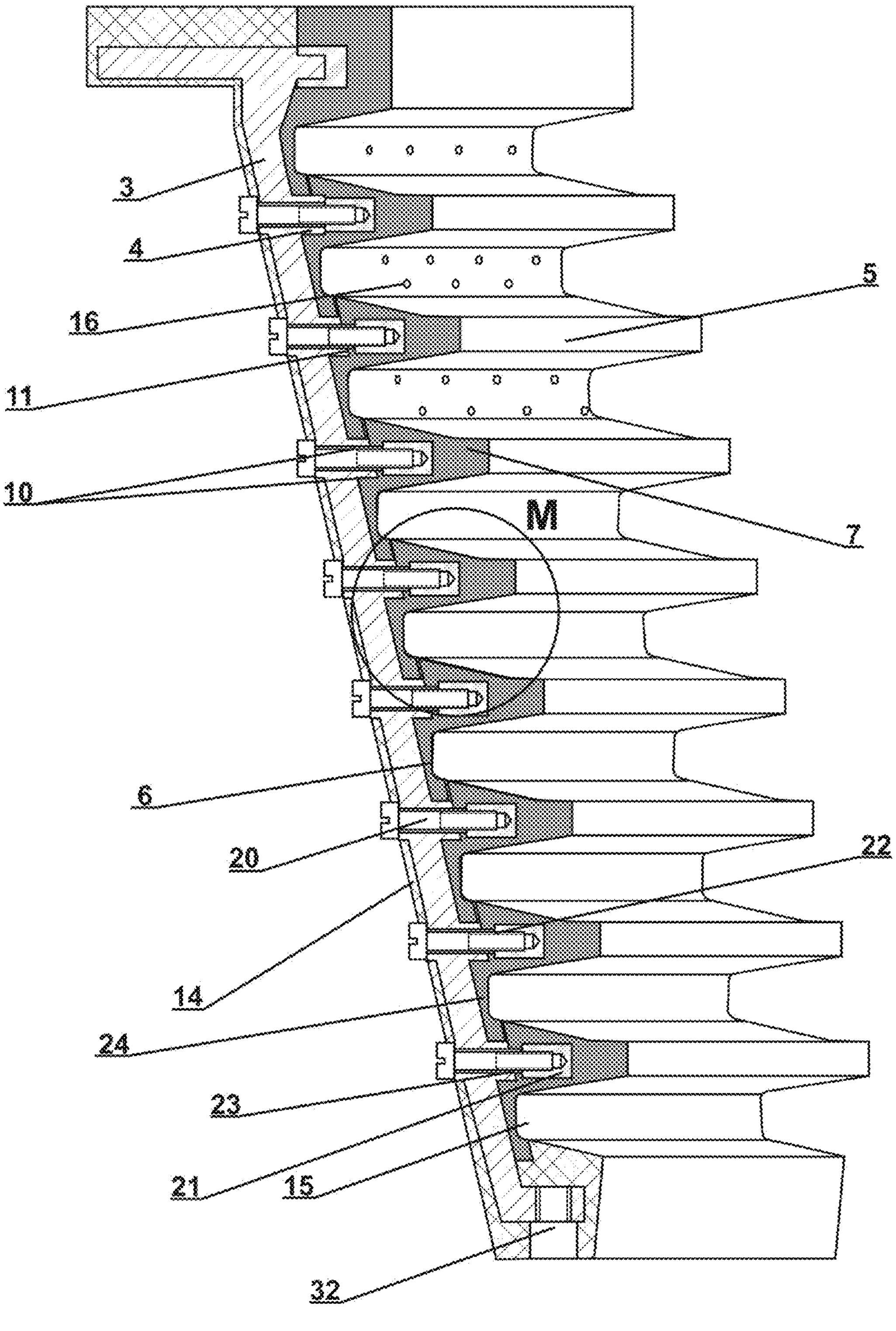
FIG. 39 shows the embodiment of performing upper part 1 of the concentration bowl, working surface 15 of which is made with the possibility of independent replacement and at least one ledge 5 of working surface 15, made with the possibility of independent replacement, is provided with plate 24 with additional core 25, side view.
Figure 40:
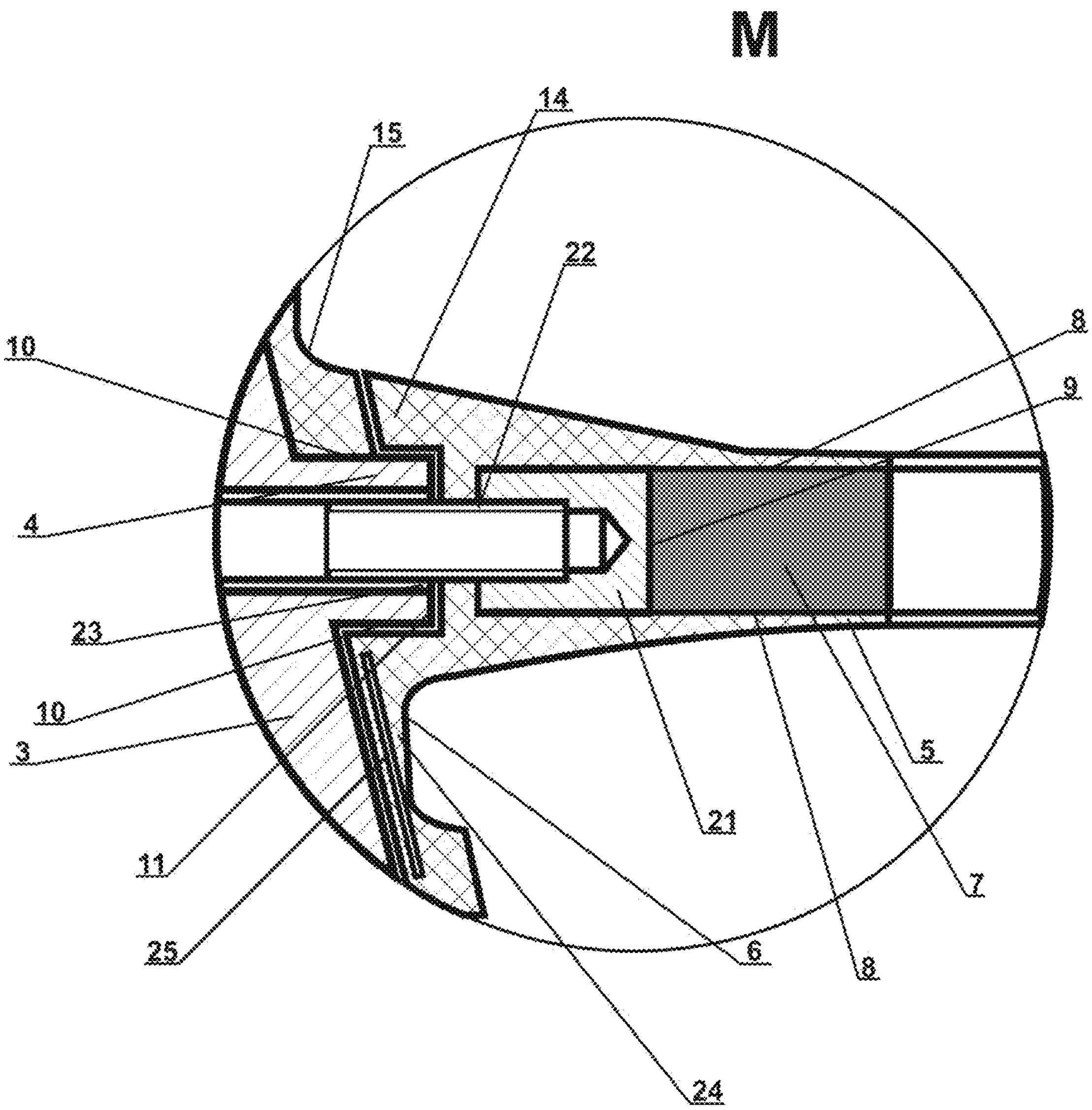
FIG. 40 shows the area M illustrating the relative position of ledge 5, plate 24, core 25, inserts 7 made of wear-resistant material, reinforcing insert 21, ribs 4 of inner frame 3 and fastener 20.
Figure 41:
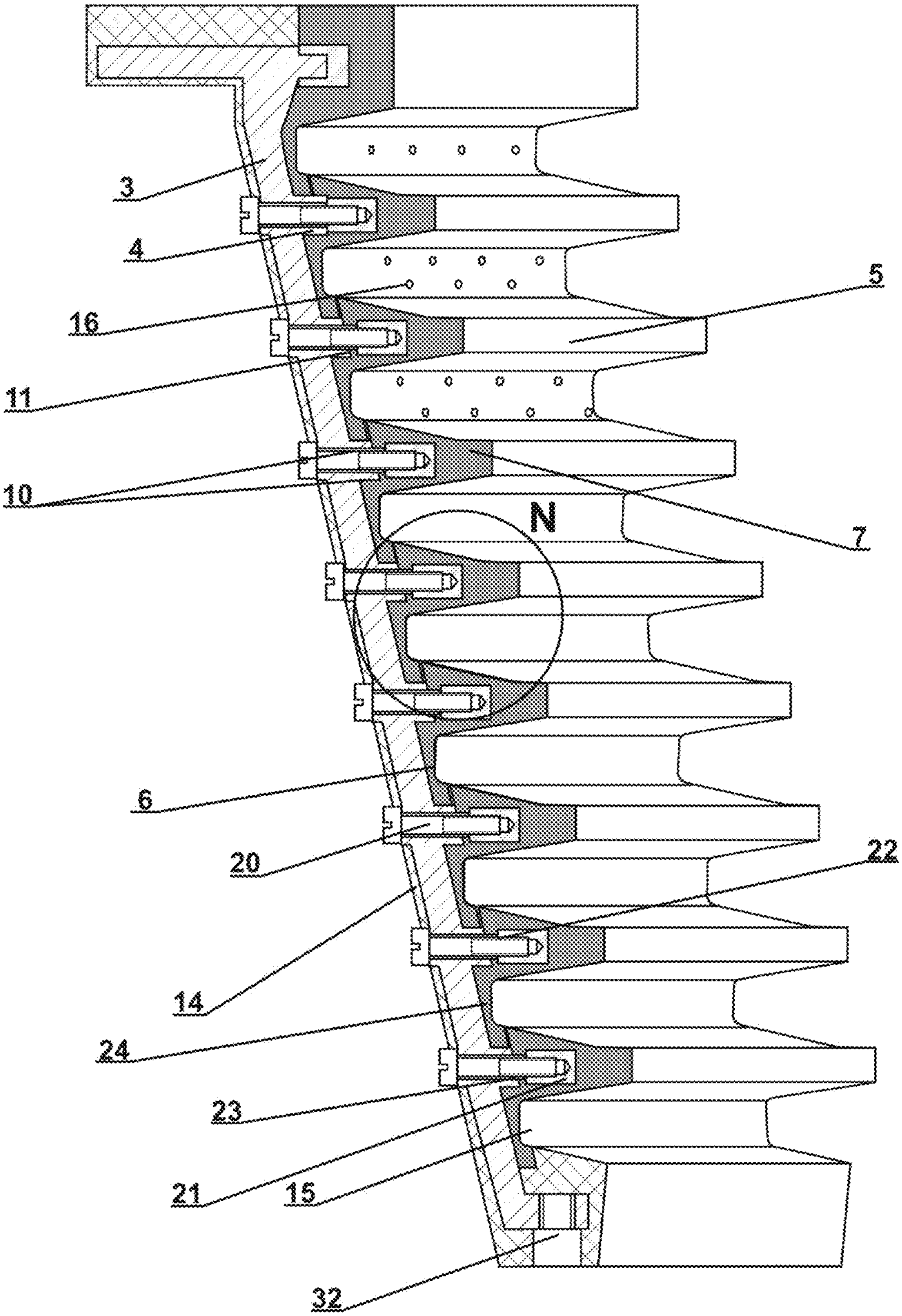
FIG. 41 shows the embodiment of performing upper part 1 of the concentration bowl, working surface 15 of which is made with the possibility of independent replacement and at least one ledge 5 of working surface 15, made with the possibility of independent replacement, is provided with plate 24 with additional core 25 connected to reinforcing insert 21, side view.

As shown in FIG. 37-42, in this case, at least one ledge 5, made with the possibility of independent replacement, can additionally be provided on one side with plate 24 made of material 14 which ensures the maintainability of the claimed invention. At the same time, at least one insert 7 of wear-resistant material is used to form at least one ledge 5, additionally equipped with reinforcing insert 21 for attaching at least one insert 7 of wear-resistant material to the side wall of inner frame 3 of upper part 1 of the concentration bowl using fastener 20. In the case of such an implementation of the claimed invention, ledges 5, additionally equipped with plates 24, can be installed on the inner surface (not shown in the drawings) of the side wall of inner frame 3 of upper part 1 of the concentration bowl so that plate 24 of one of ledges 5 is fixed by another ledge 5, equipped with plate 24, for the purpose of reliable fixation ledges 5, equipped with plates 24, and tight fit of ledges 5 and plates 24 to the side wall of inner frame 3 of upper part 1 of the concentration bowl. Thus, in the area of plates 24 of ledges 5 and fixed by ledges 5, cavities 6 of working surface 15 are located. In turn, plates 24 of ledges 5 can be additionally equipped with nozzles 16 for injecting a fluidizing liquid as shown in FIG. 37, FIG. 39 and FIG. 41.

Figure 42:
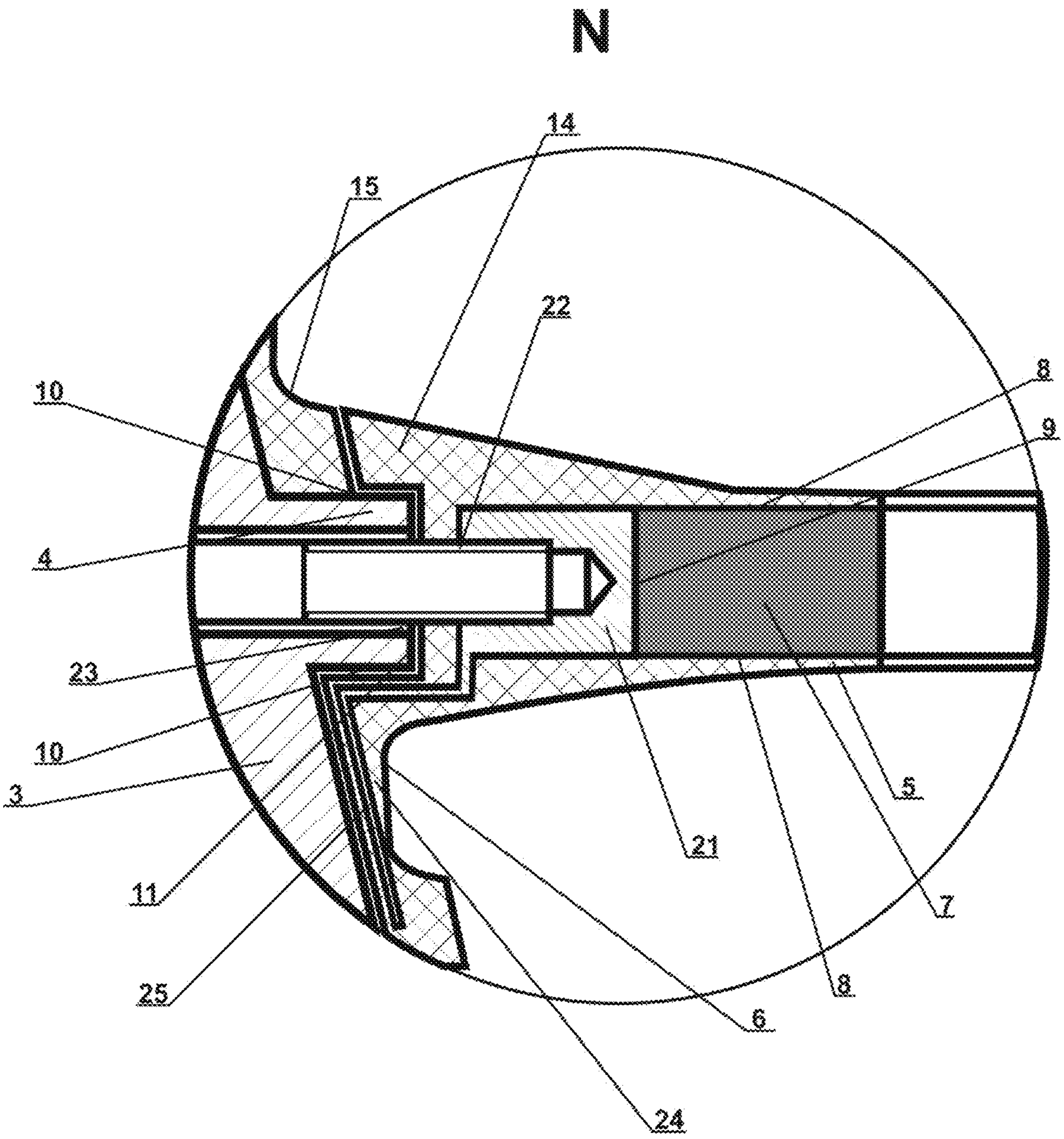
FIG. 42 shows the area N illustrating the relative position of ledge 5, plate 24, inserts 7 made of wear-resistant material, reinforcing insert 21, connected to core 25 of plate 24, ribs 4 of inner frame 3 and fastener 20.
Figure 43:
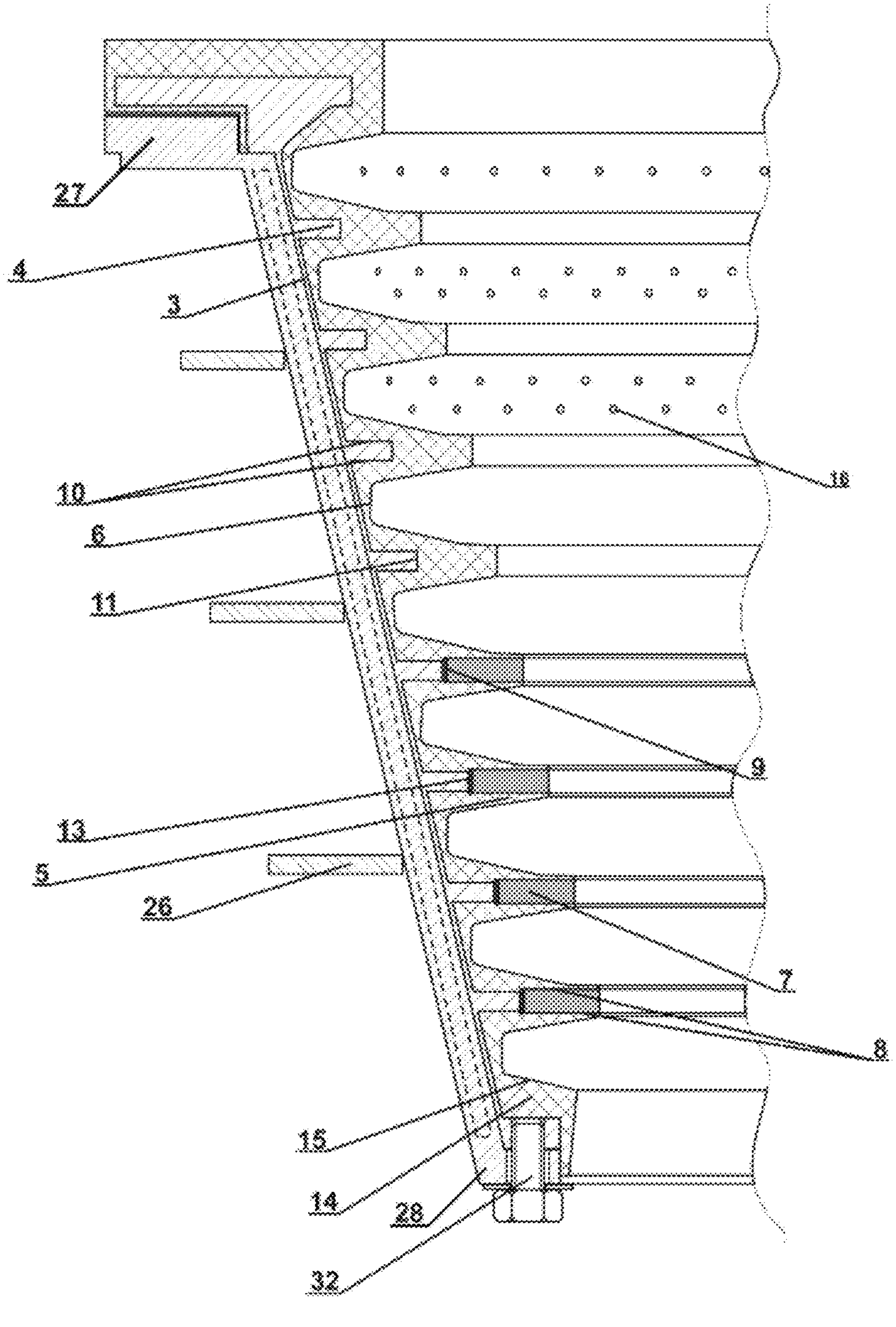
FIG. 43 shows a schematic diagram of upper part 1 of the concentration bowl equipped with outer frame 26 with upper flange 27, lower flange 28 and guides 29 as well as flange mounting 32, side view.
Figure 44:
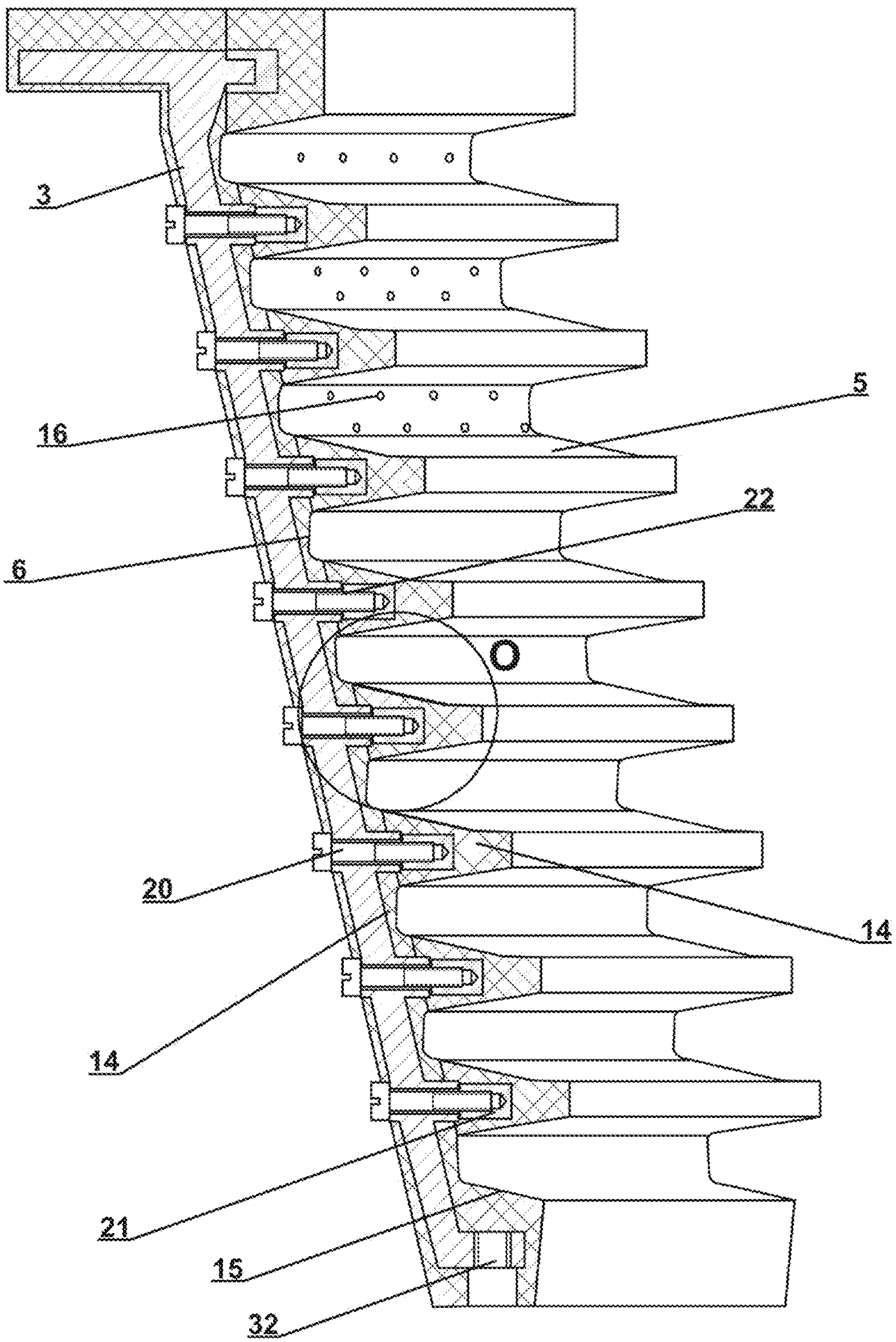
FIG. 44 shows the embodiment of performing upper part 1 of the concentration bowl, equipped with at least one ledge 5, made with the possibility of independent replacement, side view. Moreover, at least one ledge 5 is additionally provided with reinforcing insert 21 to attach at least one ledge 5 to the side wall of inner frame 3 of upper part 1 of the concentration bowl provided with a layer of material 14 using fastener 20.
Figure 45:
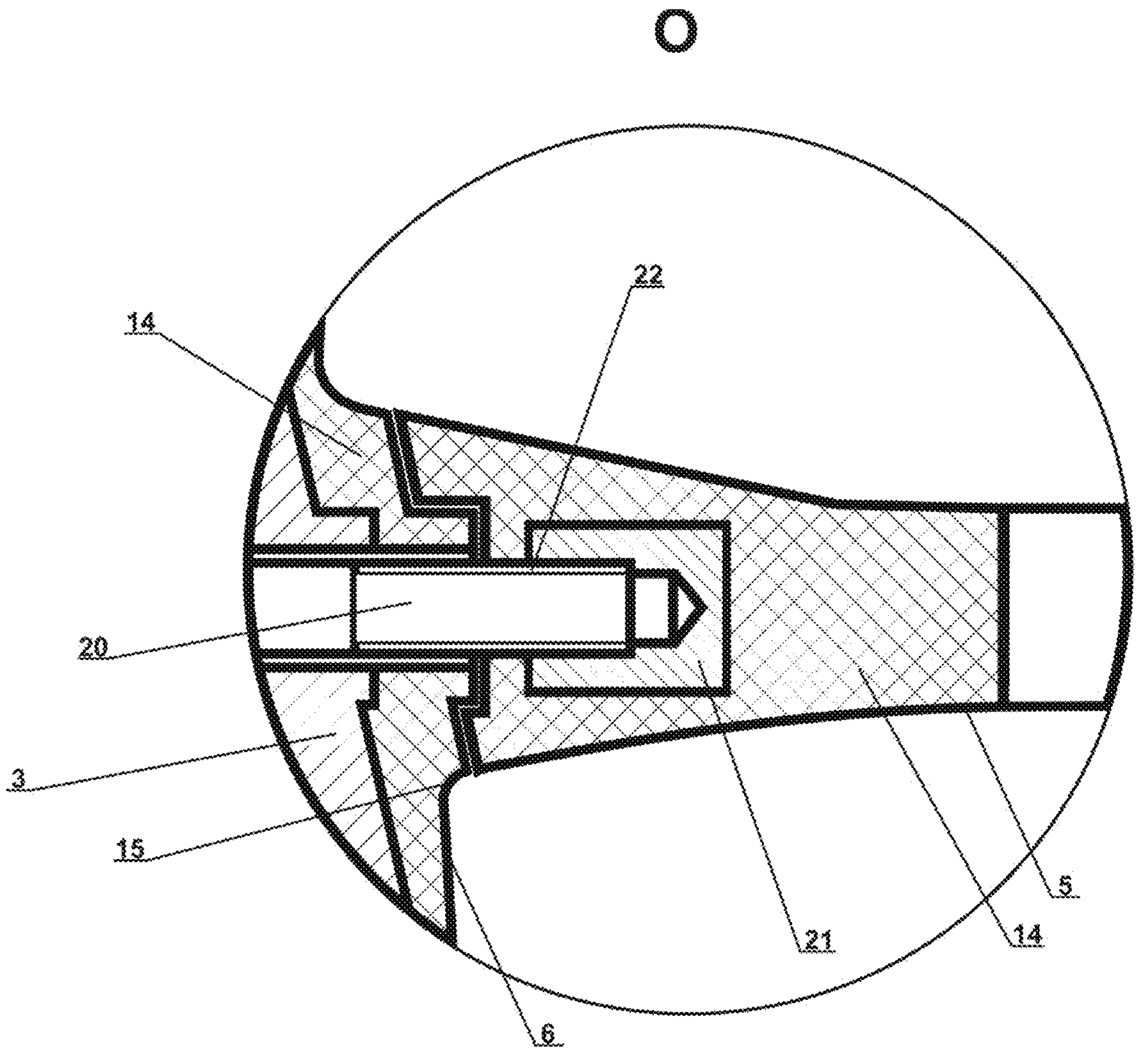
FIG. 45 shows the area O illustrating the relative position of ledge 5, reinforcing insert 21 of ledge 5, the side wall of inner frame 3 provided with a layer of material 14, and fastener 20.

At the same time, as shown in FIG. 40 and FIG. 42, plate 24 of at least one ledge 5 can additionally be provided with core 25 which ensures the reliability of the claimed invention and its maintainability. Any known metal of high strength can be used as a material for making core 25 of plate 24, at least one ledge 5, for example, steel of the appropriate grades, composite material with a suitable set of properties or polymers with a suitable set of properties which is necessary to ensure the reliability of the claimed device, increase its service lifetime, ease of manufacture of the claimed invention, as well as to ensure its maintainability. Within the framework of the implementation of the claimed invention as shown in FIG. 42, core 25 of plate 24 of at least one ledge 5 can be additionally connected to reinforcing insert 21 of at least one insert 7 of wear-resistant material used to form at least one ledge 5. Such a technical solution ensures the reliability of the claimed device, an increase in its service lifetime, ease of manufacture of the claimed invention as well as ensuring its maintainability.

Within the framework of the implementation of the claimed invention, attachment by means of fastener 20 of reinforcing insert 21 and at least one insert 7 made of wear-resistant material to the side wall of inner frame 3 of upper part 1 of the concentration bowl can be carried out both from the outside of upper part 1 of the concentration bowl as shown in FIGS. 16, 17 and 20-23, and from the side of the free volume inside upper part 1 of the concentration bowl (not shown in the drawings) or as a combination of attachment from the outside of inner frame 3 of upper part 1 of the concentration bowl and attachment from the side of the free volume inside upper part 1 of the concentration bowl (not shown in the drawings).

At the same time, if at least one insert 7 made of wear-resistant material is attached using fastener 20 to the side wall of inner frame 3 of upper part 1 of the concentration bowl from the side of the free volume inside upper part 1 of concentration bowl, hole in insert 7 above fastener 20 can be additionally filled with wear-resistant material, for example, epoxy compound 17 with the filler.

Figure 46:
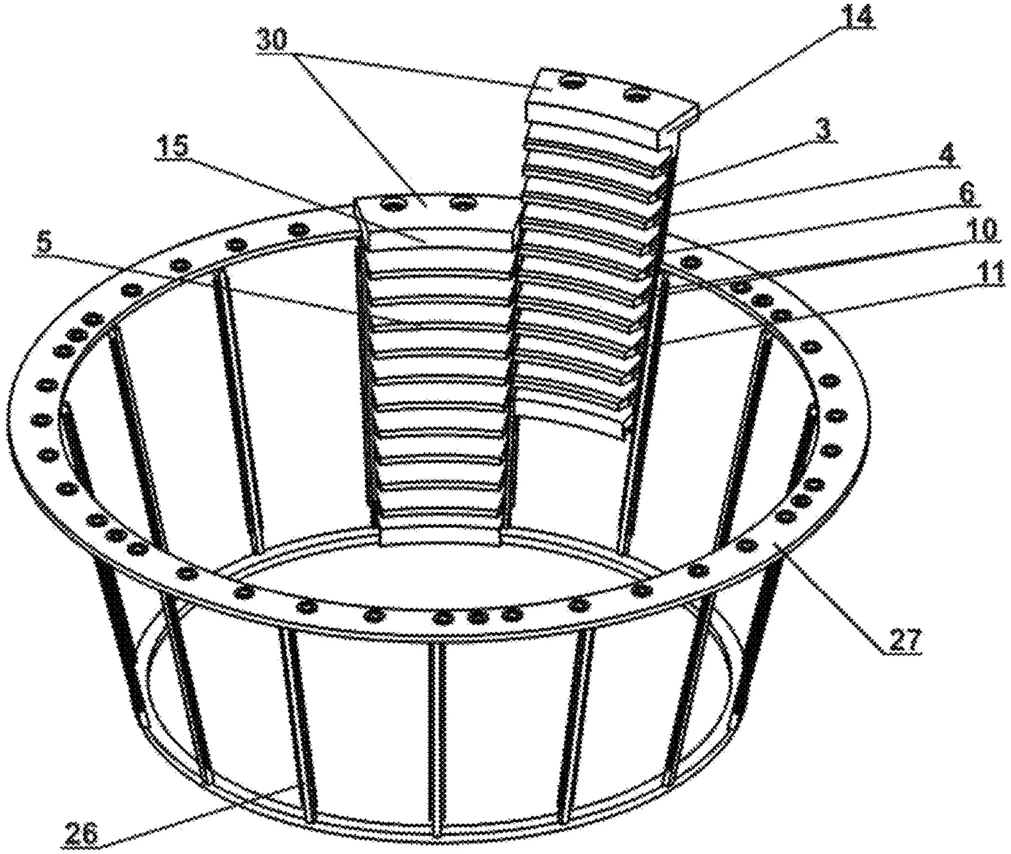
FIG. 46 shows a schematic diagram of the embodiment of the mutual arrangement of segments 30 of upper part 1 of the concentration bowl and its outer frame 26.

As one of the possible embodiments of the claimed invention, upper part 1 of the concentration bowl can be made vertically divided into at least two segments 27, made with the possibility of independent replacement and additionally equipped with external frame 26 of upper part 1 of the concentration bowl as shown in FIG. 46 which ensures the maintainability of the claimed invention. In this case, segments 27 can be attached to upper part 1 of the concentration bowl can be attached to outer frame 26 of upper part 1 of the concentration bowl by means of flange attachment 32 as shown in FIG. 8.

Besides, within the framework of the implementation of the claimed invention, at least one ledge 5 can be made with the possibility of independent replacement. In this case, ledge 5 can be made equipped with reinforcing insert 21 located inside ledge 5 and designed to attach at least one ledge 5, made with the possibility of independent replacement, to the side wall of inner frame 3 of upper part 1 of the concentration bowl, or to end surface 11 of at least one rib 4 of inner frame 3 of upper part 1 of the concentration bowl using fastener 20 which ensures the maintainability of the claimed invention. In this case, reinforcing insert 21 of at least one ledge 5 can be provided with hole 22 for attaching reinforcing insert 21 of at least one ledge 5 by means of fastener 20 to the side wall of inner frame 3 of upper part 1 of the concentration bowl, or to end surface 11 of at least one rib 4 of inner frame 3, upper part 1 of the concentration bowl. In turn, in the case of supplying the side wall of inner frame 3 of upper part 1 of the concentration bowl with at least one rib 4, end surface 11 of at least one rib 4 of inner frame 3 can be additionally provided with opening 23 which also ensures the maintainability of the claimed invention.

Within the framework of the implementation of the claimed invention, reinforcing insert 21 of at least one ledge 5 can be made of any known design. As an example, reinforcing insert 21 can be made wedge-shaped or rectangular in cross-section. Also, reinforcing insert 21 can be made annular or arc-shaped in plan which ensures the maintainability of the claimed invention.

As an example of the implementation of the claimed invention, inserts 7 made of wear-resistant material used to form at least one ledge 5 can be made in the form of a set of elements 18 of inserts 7 made of wear-resistant material of various shapes in plan as shown in FIGS. 12, 13, 28 and 29. In this case, inserts 7 of wear-resistant material used to form at least one ledge 5 can be made in the form of a set of elements 18 of inserts 7 of wear-resistant material of rectangular shape in plan (FIG. 12), and hence in longitudinal section. Also, inserts 7 made of wear-resistant material used to form at least one ledge 5 can be made in the form of a set of elements 18 of inserts 7 made of wear-resistant arc-shaped material in plan, and hence in longitudinal section, as shown in FIGS. 13, 28 and 29. Also, as an example, inserts 7 made of wear-resistant material can be made in the form of a set of elements 18 of inserts 7 made of wear-resistant material of polygonal shape in plan, and hence in longitudinal section. At the same time, each set of elements 18 of inserts 7 made of wear-resistant material can contain from two or more elements 18 of inserts 7 made of wear-resistant material which makes it easy to replace elements 18 of inserts 7 made of wear-resistant material worn out during operation which means to ensure an increase in the service lifetime of the claimed invention, the reliability of the device and ease of its manufacture. The described embodiments of inserts 7 made of wear-resistant material having any of the listed forms in the plan, provide an increase in the maintainability of the claimed invention, the reliability of the device and the simplicity of its manufacture.

In the case of at least one ledge 5 with the possibility of independent replacement, and at least one insert 7 made of wear-resistant material used to form at least one ledge 5, additionally equipped with reinforcing insert 21 and made in the form of a set of elements 18, inserts 7 made of wear-resistant material rectangular in plan, elements 18 of insert 7 made of wear-resistant material can be provided with holes 31 and attached by means of reinforcing insert 21 to the side wall of inner frame 3 of upper part 1 of the concentration bowl (not shown in the drawings), or at least one rib 4 of inner frame 3 of upper part 1 of the concentration bowl using fasteners 20 located in holes 31 of elements 18 which ensures the maintainability of the claimed invention. In this case, gaps 19 are formed between two adjacent elements 18 of inserts 7 made of wear-resistant material.

In the case of at least one ledge 5 with the possibility of independent replacement, and at least one insert 7 made of wear-resistant material used to form at least one ledge 5, additionally equipped with reinforcing insert 21 and made in the form of a set of elements 18 of insert 7 made of wear-resistant material of an arc shape in plan, fasteners 20 for attaching reinforcing insert 21 and at least one insert 7 to the side wall of inner frame 3 of upper part 1 of the concentration bowl or at least one rib 4 of inner frame 3 of upper part 1 of the concentration bowl as shown in FIG. 28, are located in gaps 19 between two adjacent elements 18 of inserts 7 made of wear-resistant material which ensures the maintainability of the claimed invention. As shown in FIG. 28, fasteners 20 for attaching reinforcing insert 21 and at least one insert 7 to the side wall of inner frame 3 of upper part 1 of the concentration bowl or at least one rib 4 of inner frame 3 of upper part 1 of the concentration bowl in the case of fastening elements 18 of inserts 7 with by means of fasteners 20 from the side of the inner volume of upper part 1 of the concentration bowl, elements 18 of inserts 7 made of wear-resistant material can be additionally provided with holes 31 of elements 18, and fasteners 20, in turn, can be located in holes 31 of elements 18 of inserts 7 made of wear-resistant material which ensures the maintainability of the claimed invention.

As one of the possible implementation embodiments, at least one element 18 of insert 7 made of wear-resistant material can be connected to at least two reinforcing inserts 21 which also ensures the maintainability of the claimed invention.

Thus, the claimed concentration bowl has internal frame 3, and may also additionally have outer frame 26. Each of these technical solutions makes it easy to replace upper part 1 and lower part 2 of the concentration bowl independently of each other which significantly increases the usability of the claimed invention and its maintainability.

Figure 47:
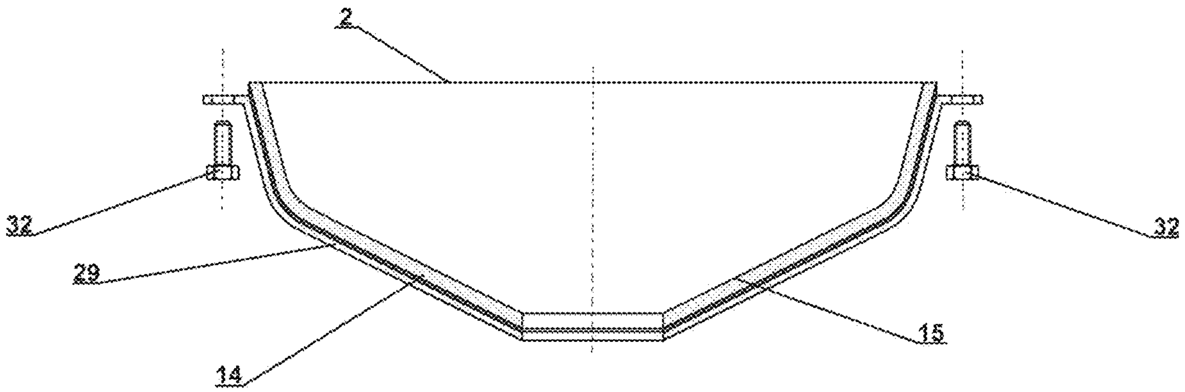
FIG. 47 shows a schematic diagram of lower part 2 of the concentration bowl, side view.
Figure 48:
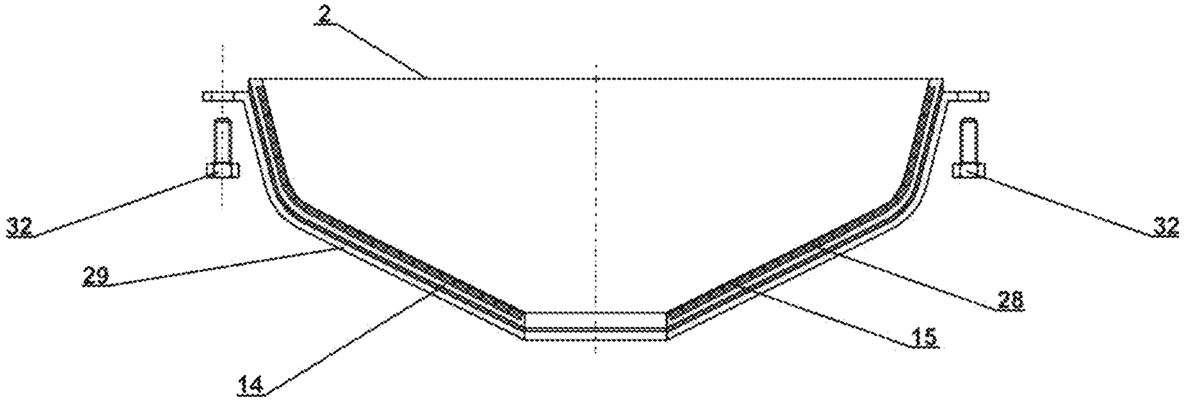
FIG. 48 shows a schematic diagram of lower part 2 of the concentration bowl, the working surface of which is additionally provided with lining 28 of wear-resistant material, side view.

Lower part 2 of the concentration bowl within the framework of the implementation of the claimed invention can be made in the form of a truncated cone facing its wide part upwards, that is, of a cone shape as shown in FIG. 47 and FIG. 48, if upper part 1 of the concentration bowl is made conical, that is, the angle of inclination of the side wall of inner frame 3 of upper part 1 of the concentration bowl is at least 15° but less than 90° to the horizontal surface. In this case, the diameter of the wide part of lower part 2 of the concentration bowl corresponds to the diameter of the narrow part of upper part 1 of the concentration bowl which is necessary for reliable bonding of lower part 2 and upper part 1 of the concentration bowl with each other which ensures the reliability and maintainability of the claimed invention as well as an increase in its service lifetime.

If upper part 1 of the concentration bowl is cylindrical, that is, the angle of inclination of the side wall of inner frame 3 of upper part 1 of the concentration bowl is 90° to the horizontal surface, lower part 2 of the concentration bowl within the framework of the implementation of the claimed invention can be made both cylindrical in shape and in the form of a truncated cone facing its wide part upwards, that is, of a cone shape as shown in FIG. 47 and FIG. 48. At the same time, the diameters of lower part 2 and upper part 1 at their junction are selected in such a way as to ensure reliable fastening of lower part 2 and upper part 1 of the concentration bowl with each other which ensures the reliability of the claimed invention and an increase in its service lifetime.

Inner surface of base 29 of lower part 2 of the concentration bowl is also covered with material 14 to form working surface 15 as shown in FIG. 47 which ensures the reliability and maintainability of the claimed invention as well as an increase in its service lifetime.

As one of the possible approaches in the implementation of the claimed invention, working surface 15 of lower part 2 of the concentration bowl can be additionally provided with lining 28 of wear-resistant material as shown in FIG. 48. As a wear-resistant material for lining 28 of lower part 2 of the concentration bowl, any material resistant to abrasive action can be used. At the same time, it is desirable to use materials resistant to abrasion, with a relatively low density. As an example of such a material, any known ceramics, aluminum oxide, zirconium oxide, titanium nitride, technical diamond, composite materials, or any other similar material can be used. Also, materials containing metal carbides, for example, tungsten carbide, or nonmetal carbides, for example, silicon carbide or any other known metal carbides or nonmetal carbides, can be used as a wear-resistant material for making lining 28 of lower part 2 of the concentration bowl. Also, high-chromium steels or high-manganese steels can be used as a wear-resistant material for lining 28 of lower part 2 of the concentration bowl. Besides, any combination of the listed materials resistant to abrasion, or any other known materials resistant to abrasion and having a low density, can be used as a wear-resistant material for the implementation of lining 28 of lower part 2 of the concentration bowl. The choice of the listed materials as a wear-resistant material when performing lining 28 of lower part 2 of the concentration bowl made of wear-resistant material ensures the maintainability of the claimed device as well as an increase in its service lifetime.

The device works as follows.

The source material is fed into the concentration bowl. Gold-bearing sand from placer deposits, fine-dispersed material from weathering crusts located in the oxidation zones of copper-molybdenum-porphyry deposits, fine-dispersed sand as well as copper-nickel ore material can be used as the starting material. In general, any mixture of solid particles with different densities can be used as a material. After that, the modular concentration bowl is set in motion. At the same time, a fluidizing liquid is fed into the concentration bowl through the nozzles for injecting the fluidizing liquid located in the cavities of upper part 1 of the concentration bowl. At the same time, any Newtonian liquid, for example, water, can be used as a fluidizing liquid. As a result, during the rotation of the concentration bowl under the action of centrifugal force, the initial material is divided into components according to density, and heavier solid particles accumulate in the cavities. The fluidizing liquid supplied through the nozzles ensures the creation of a fluidised bed during the operation of the claimed centrifugal concentrator near the working surface inside the cavities which facilitates the process of separating the source material into components during gravitational separation. After that, the rotation of the concentration bowl is stopped and heavy solid particles accumulated in the cavities are removed from the concentration bowl. The remaining mass of waste material is also removed separately from the concentration bowl.

The options for implementing the device described in the text of this application are not the only possible ones and are given for the purpose of the most visual disclosure of the essence of the invention.

A Detailed Description of the Invention in Terms of Options for Implementing a Method for Manufacturing the Modular Concentration Bowl.

The claimed modular concentration bowl is made as follows. First, the side wall of inner frame 3 of upper part 1 of the concentration bowl is made which ensures the reliability of the claimed device, an increase in its service lifetime as well as ease of manufacture and maintainability of the claimed invention.

Then, at least one insert 7 made of wear-resistant material is attached to inner frame 3 of upper part 1 of the concentration bowl which is used to form at least one ledge 5.

As an example, at least one insert 7 made of wear-resistant material can be attached to the side wall of inner frame 3 of upper part 1 of the concentration bowl. At least one insert 7 made of wear-resistant material can be attached to the side wall of inner frame 3 of upper part 1 of the concentration bowl via any known way. As an example, at least one insert 7 made of wear-resistant material can be attached to the side wall of inner frame 3 by means of a screw connection, bolt connection, rivet connection, can be attached by spraying ceramics on the surface of the side wall of inner frame 3 of upper part 1 of the concentration bowl, or attached via any other known method. At the same time, inserts 7 made of wear-resistant material can be attached to the side wall of inner frame 3 of upper part 1 of the concentration bowl from base 9 of each insert 7 made of wear-resistant material which ensures reliable fastening of inserts 7 made of wear-resistant material on the surface of the side wall of inner frame 3 of upper part 1 of the concentration bowl, and, accordingly, allows you to increase the service lifetime of the claimed invention as well as to ensure its reliability and maintainability.

In the case of the implementation of the claimed invention, provided with a side wall of inner frame 3 of upper part 1 of the concentration bowl with at least one insert 7 of wear-resistant material fixed to it, at least one insert 7 of wear-resistant material, at least one insert 7 made of wear-resistant material used to form at least one ledge 5 can be performed with the possibility of independent replacement which ensures the maintainability of the claimed invention. In this case, at least one insert 7 made of wear-resistant material can be fixed to the side wall of inner frame 3 of upper part 1 of the concentration bowl by means of a screw connection, bolt connection, rivet connection or can be attached via any other known method.

As another example, at least one insert 7 made of wear-resistant material used to form at least one ledge 5 can be attached to the inner surface of the side wall of inner frame 3 of upper part 1 of the concentration bowl using a fastener 20, for example, a bolt, stud, screw or self-tapping screw, as shown in FIGS. 14-28, 34 and 37-42. In the case of this type of connection, at least one insert 7 made of wear-resistant material can additionally be provided with reinforcing insert 21 designed to attach insert 7 made of wear-resistant material to the inner surface of the side wall of inner frame 3 of upper part 1 of the concentration bowl which ensures the maintainability of the claimed invention. In turn, in the case of the design of claimed upper part 1 of the concentration bowl, at least one insert 7 of wear-resistant material with the possibility of independent replacement, respectively, at least one ledge 5, for the formation of which at least one insert 7 of wear-resistant material was used, can also be performed with the possibility of independent replacement, as shown in FIGS. 14-28, 34 and 37-42, which, in turn, ensures the maintainability of the claimed invention. At the same time, reinforcing insert 21 and at least one insert 7 made of wear-resistant material can be attached using fastener 20 to the side wall of inner frame 3 of upper part 1 of the concentration bowl both from the outside of inner frame 3 of upper part 1 of the concentration bowl as shown in FIGS. 16, 17 and 20-23, and from the side of the free volume inside upper part 1 of the concentration bowl (not shown in the drawings), or as a combination of attachment from the outside of inner frame 3 of upper part 1 of the concentration bowl and attachment from the side of the free volume inside upper part 1 of the concentration bowl (not shown in the drawings).

If at least one insert 7 made of wear-resistant material is attached to the side wall of inner frame 3 of upper part 1 of the concentration bowl from the side of the free volume inside upper part 1 of the concentration bowl using fastener 20, the hole in insert 7 above fastener 20 can additionally be filled with the wear-resistant material, for example, epoxy compound 17 with the filler.

If necessary, at least one rib 4 of inner frame 3 of upper part 1 of the concentration bowl can additionally be attached to the side wall of inner frame 3 of upper part 1 of the concentration bowl.

Ribs 4 of inner frame 3 of upper part 1 of the concentration bowl can be attached to the side wall of inner frame 3 of upper part 1 of the concentration bowl via any known way. As an example, ribs 4 of inner frame 3 of upper part 1 of the concentration bowl can be attached to the side wall of inner frame 3 of upper part 1 of the concentration bowl by screw connection, bolt connection, rivet connection, welded connection, glued to the side wall of frame 3 of upper part 1 of the concentration bowl, can be soldered to the side wall of inner frame 3 of upper part 1 of the concentration bowl, or can be connected to the side wall of inner frame 3 of upper part 1 of the concentration bowl according to the "mortise and tenon" principle using the appropriate additional fasteners (not shown in the drawings).

After that, end surface 11 of at least one rib 4 of inner frame 3 of upper part 1 of the concentration bowl can be provided with at least one insert 7 made of wear-resistant material used to form at least one ledge 5 which ensures a long service lifetime, ease of manufacture of the device, its maintainability and reliability.

End surface 11 of at least one rib 4 of inner frame 3 of upper part 1 of the concentration bowl can be provided with at least one insert 7 made of wear-resistant material used to form at least one ledge 5 via any known method. As an example, insert 7 made of a wear-resistant material used to form at least one ledge 5 can be attached to end surface 11 of at least one rib 4 of inner frame 3 of upper part 1 of the concentration bowl using a screw connection, can be attached by spraying ceramics on end surfaces 11 of the ribs 4 of inner frame 3 of upper part 1 of the concentration bowl or via any other known method. At the same time, at least one insert 7 made of wear-resistant material can be attached to end surface 11 of ribs 4 of inner frame 3 of upper part 1 of the concentration bowl from the side of base 9 of insert 7 made of wear-resistant material. This attachment of inserts 7 made of wear-resistant material ensures a long service lifetime, ease of manufacture of the device and its reliability, and maintainability.

As an example, insert 7 made of a wear-resistant material used to form at least one ledge 5 can be attached to end surface 11 of at least one rib 4 of inner frame 3 of upper part 1 of the concentration bowl using connecting layer 13 as shown in FIGS. 1, 2, 4, 5, 8-10, 30-33, 36, 43 and 50. As connecting layer 13, the layer of any connecting material can be used. As an example of such connecting layer 13, an adhesive layer or a solder layer can be used as well as a layer of polyurethane, silicone, polyethylene, thermoplastic, raw rubber and their derivatives, or any other similar known materials. This implementation of connecting layer 13 ensures a long service lifetime, ease of manufacture of the device and its reliability as well as the maintainability of the claimed device.

Besides, in order to improve the fixation of inserts 7 made of wear-resistant material used to form ledges 5 on end surfaces 11 of ribs 4 of inner frame 3 of upper part 1 of the concentration bowl, end surfaces 11 of at least one rib 4 of inner frame 3 of upper part 1 of the concentration bowl can additionally be provided with retaining shell 12. In this case, insert 7 made of wear-resistant material is attached to retaining shell 12. Such a supply of end surfaces 11 of at least one rib 4 of inner frame 3 of upper part 1 of the concentration bowl with retaining shell 12 ensures a long service lifetime, ease of manufacture of the device and its reliability as well as its maintainability. Inserts 7 made of wear-resistant material used to form ledges 5 can be attached to retaining shells 12 using any known method of connection, for example, with glue. At the same time, inserts 7 made of wear-resistant material used to form ledges 5 are attached to retaining shells 12 from the side of base 9 of inserts 7. As an example, inserts 7 made of wear-resistant material used to form ledges 5 can be attached to end surfaces 11 of at least one rib 4 of inner frame 3 of upper part 1 of the concentration bowl from the side of base 9 of inserts 7 using connecting layer 13 as shown in FIGS. 9, 10, 30, 31 and 36. The described attachment of inserts 7 made of wear-resistant material, used to form ledges 5, to retaining shells 12 ensures a long service lifetime, ease of manufacture of the device and its reliability. As connecting layer 13, the layer of any connecting material can be used. As an example of such connecting layer 13, an adhesive layer or a solder layer can be used as well as a layer of polyurethane, silicone, polyethylene, thermoplastic, raw rubber and their derivatives, or any other similar known materials. This implementation of connecting layer 13 provides a long service lifetime, ease of manufacture of the device and its reliability, and maintainability.

Besides providing the inner surface of retaining shell 12 with connecting layer 13 for attaching insert 7 from its base 9, side surfaces 8 of any of inserts 7 used to form ledges 5 can also be provided with additional connecting layer 13 designed to improve the connection of side surfaces 8 of inserts 7 with material 14 of working surface 15, as shown in FIG. 7 and FIG. 10. Such a supply of side surfaces 8 of inserts 7 with additional connecting layer 13 makes it possible to improve the fixation of inserts 7 with material 14 of working surface 15 which means to increase the service lifetime of the claimed invention and its reliability.

In turn, retaining shells 12 can be fixed to end surfaces 11 of at least one rib 4 of inner frame 3 of upper part 1 of the concentration bowl via any known method. As an example, retaining shell 12 can be fixed to end surface 11 of at least one rib 4 of inner frame 3 of upper part 1 of the concentration bowl by means of a welded joint, screw joint, bolt joint, rivet joint, glue, can be connected by soldering or can be fixed via any other known method. Such fixing of retaining shells 12 on end surface 11 of at least one rib 4 of inner frame 3 of upper part 1 of the concentration bowl ensures a long service lifetime, ease of manufacture of the device, its reliability and maintainability.

As one of the possible embodiments of the claimed method, end surface 11 of at least one rib 4 of inner frame 3 of upper part 1 of the concentration bowl or retaining shell 12 is provided with at least one insert 7 made of wear-resistant material used to form at least one ledge 5 performed in the form of a monolithic ring, as shown in FIG. 11. Thus, in this embodiment, inserts 7 made of wear-resistant material used to form ledges 5 performed of an annular shape in longitudinal section can be used. Such an embodiment of inserts 7 made of wear-resistant material used to form ledges 5 within the framework of the implementation of the claimed invention ensures the reliability of the claimed invention, an increase in its service lifetime as well as the simplicity of manufacturing the claimed device.

As another example of the implementation of the claimed method, end surface 11 of at least one rib 4 of inner frame 3 of upper part 1 of the concentration bowl or retaining shell 12 is provided with at least one insert 7 made of wear-resistant material used to form at least one ledge 5 made in the form of a set of elements 18 of inserts 7 made of wear-resistant material of various shapes in plan as shown in FIGS. 12, 13, 28 and 29. In this case, inserts 7 of wear-resistant material used to form ledges 5 can be made in the form of a set of elements 18 of inserts 7 made of wear-resistant material of rectangular shape in plan (FIG. 12), and hence in longitudinal section. Also, inserts 7 made of wear-resistant material used to form ledges 5 can be made in the form of a set of elements 18 of inserts 7 made of wear-resistant arc-shaped material in plan, and hence in longitudinal section, as shown in FIGS. 13, 28 and 29. Also, as an example, inserts 7 made of wear-resistant material used to form ledges 5 can be made in the form of a set of elements 18 of inserts 7 made of wear-resistant material of polygonal shape in plan, and hence in longitudinal section. The described embodiments of inserts 7 made of wear-resistant material used to form ledges 5, having any of the listed forms in the plan, provide an increase in the service lifetime of the claimed invention, the reliability of the device and the simplicity of its manufacture.

At the same time, in the case of inserts 7 made of wear-resistant material used to form ledges 5, in the form of a set of elements 18 of inserts 7 made of wear-resistant material of rectangular, polygonal or arc shape in plan, elements 18 of inserts 7 made of wear-resistant material can be attached to end surface 11 of at least one rib 4 of inner frame 3 of upper part 1 of the concentration bowl or to retaining shell 12 from the side of base 9 of inserts 7 made of wear-resistant material with the formation of gap 19 between two adjacent elements 18 of inserts 7 made of wear-resistant material as shown in FIGS. 12, 13, 28 and 29 which ensures the reliability of the claimed invention, increasing its service lifetime as well as ease of manufacture.

As an example, elements 18 of inserts 7 made of wear-resistant material can be attached to end surface 11 of at least one rib 4 of inner frame 3 of upper part 1 of the concentration bowl from the side of base 9 of insert 7 using connecting layer 13 as shown in FIGS. 12, 13, 28 and 29. As connecting layer 13, the layer of any connecting material can be used. As an example of such connecting layer 13, an adhesive layer or a solder layer can be used as well as a layer of polyurethane, silicone, polyethylene, thermoplastic, raw rubber and their derivatives, or any other similar known materials. This implementation of connecting layer 13 provides a long service lifetime, ease of manufacture of the device and its reliability.

Besides, in the case of at least one ledge 5 with the possibility of independent replacement and use for the formation of this ledge 5, at least one insert 7 made of wear-resistant material, at least one insert 7 made of wear-resistant material can additionally be provided with reinforcing insert 21 from the side of base 9 of insert 7 made of wear-resistant material. At the same time, at least one insert 7 made of wear-resistant material can be attached to reinforcing insert 21 from the side of base 9 of insert 7 made of wear-resistant material, and retaining shell 12, in turn, can be attached to reinforcing insert 21. If at least one insert 7 made of wear-resistant material used to form at least one ledge 5, made with the possibility of independent replacement, is performed in the form of a set of elements 18 of insert 7 made of wear-resistant material, can be attached to reinforcing insert 21 from the side of base 9, and retaining shell 12 itself can be attached to reinforcing insert 21.

Within the framework of the implementation of the claimed method, retaining shell 12 can be attached to reinforcing insert 21 via any known method. As an example, each retaining shell 12 can be attached to reinforcing insert 21 by means of a welded joint, screw joint, bolt joint, rivet joint, glue, can be soldered or attached via any other known method. The supply of reinforcing insert 21 with retaining shell 12 ensures reliable fastening of each insert 7 made of wear-resistant material used to form at least one ledge 5 and, accordingly, allows to increase the service lifetime of the claimed invention, to ensure its reliability as well as its maintainability. At the same time, the supply of the inner surface of retaining shell 12 with connecting layer 13 also ensures the maintainability of the claimed device.

In turn, the inner surface of retaining shell 12 can be provided with connecting layer 13 designed to attach insert 7 made of wear-resistant material to the surface of retaining shell 12. As connecting layer 13, the layer of any connecting material can be used. As an example of such connecting layer 13, an adhesive layer or a solder layer can be used as well as a layer of polyurethane, silicone, polyethylene, thermoplastic, raw rubber and their derivatives, or any other similar known materials.

Then, the inner surface of upper part 1 of the concentration bowl is covered with material 14 to form working surface 15 of the concentration bowl with additional fixation of inserts 7 made of wear-resistant material used to form ledges 5, material 14 of working surface 15 which ensures a long service lifetime, ease of manufacture of the device and its reliability, and maintainability. As an example of such a process of applying material 14 to the inner surface of the concentration bowl, the known extrusion method can be used. Besides, the process of applying material 14 to the inner surface of upper part 1 of the concentration bowl can be carried out using a special injection molding machine designed for thermoplastic injection.

As a material 14, any known elastic material, wear-resistant material or a combination of them can be used to perform working surface 15 of the concentration bowl. As an example of an elastic material when performing material 14, polyurethane, silicone, polyethylene, thermoplastic, raw rubber, rubber and their derivatives, including polyurethane, silicone, polyethylene, thermoplastic, raw rubber or rubber, as well as any other similar known materials, can be used. Any known ceramics, aluminum oxide, zirconium oxide, titanium nitride, technical diamond, composite materials, or any other similar material can be used as a wear-resistant material when performing material 14. Also, materials containing metal carbides, for example, tungsten carbide, or nonmetal carbides, for example, silicon carbide or any other known metal carbides or nonmetal carbides, can be used as a wear-resistant material when performing material 14. High-chromium steels or high-manganese steels can also be used as a wear-resistant material when performing material 14. Besides, epoxy compound 17 with the filler can be used as a wear-resistant material when performing material 14, which can be used, for example, any known ceramics, aluminum oxide, zirconium oxide, titanium nitride as well as metal and nonmetal carbides, for example, silicon carbide or tungsten carbide, or technical diamond. Such a choice of material 14 for performing working surface 15 of the concentration bowl within the framework of the implementation of the claimed invention provides an increase in the service lifetime of the modular concentration bowl, the reliability of the claimed device as well as the simplicity of its manufacture.

In this case, if material 14 of working surface 15 is elastic, working surface 15 can be made entirely of one elastic material 14. Besides, material 14 made elastic and used to perform cavities 6, and material 14 made elastic and used to perform at least one ledge 5, can perform different from each other.

Moreover, inserts 7 made of wear-resistant material used to form ledges 5 can additionally be fixed with the help of material 14 of working surface 15, at least from two sides, for example, as shown in FIGS. 1-10, 15, 17, 25, 35, 36, 43 and 50. This arrangement of inserts 7 made of wear-resistant material leads to additional fixation of these inserts 7 made of wear-resistant material with the entire thickness of the layer of material 14 of which working surface 15 of upper part 1 of the claimed concentration bowl is made. As an example, inserts 7 made of wear-resistant material can additionally be fixed with material 14 of working surface 15 by fixing at least two side faces 8 of inserts 7 made of wear-resistant material. The implementation of such a design makes it possible to significantly increase the service lifetime of the modular concentration bowl and its reliability due to the reliable fixation of inserts 7 made of wear-resistant material and ensure the maintainability of the claimed invention. Besides, within the framework of the implementation of the claimed method of manufacturing the modular concentration bowl, the entire surface of inserts 7 made of wear-resistant material can be covered with material 14 of which working surface 15 of the claimed concentration bowl is made. Thus, at least one insert 7 made of wear-resistant material used to form at least one ledge 5 can be additionally fixed on three sides using material 14 of working surface 15. The implementation of such a design also makes it possible to significantly increase the service lifetime of the modular concentration bowl and its reliability due to the reliable fixation of inserts 7 made of wear-resistant material.

Also, as an example, at least one insert 7 made of wear-resistant material used to form at least one ledge 5 can be fixed with material 14 of working surface 15 by fixing at least two side faces 8 of inserts 7 made of wear-resistant material. Moreover, material 14 can be made in the form of a combination of an elastic material and epoxy compound 17 with a filler which can be used, for example, any known ceramics, aluminum oxide, zirconium oxide, titanium nitride as well as metal and nonmetal carbides, for example, silicon carbide or tungsten carbide, or technical diamond. Moreover, in this case, as shown in FIG. 36, fixation in the area of at least two side faces 8 of inserts 7 made of wear-resistant material can be carried out using epoxy compound 17 with the filler which ensures the maintainability of the claimed invention.

As one of the possible options for implementing the method of manufacturing the modular concentration bowl, at least one insert 7 made of wear-resistant material used to form at least one ledge 5 can be made of epoxy compound 17 with the filler, as which, for example, any known ceramics, aluminum oxide, zirconium oxide, titanium nitride as well as metal and nonmetal carbides, for example, silicon carbide or tungsten carbide, or technical diamond can be used. In this case, at least one insert 7 of wear-resistant material used to form at least one ledge 5, and ledge 5, respectively, including this insert 7 of wear-resistant material, can be attached to end surface 11, of at least one rib 4 of inner frame 3 of upper part 1 of the concentration bowl in the case of supplying the side wall of inner frame 3 of upper part 1 of the concentration bowl with at least one rib 4 of inner frame 3 of upper part 1 of the concentration bowl as shown in FIG. 30-33 which ensures the maintainability of the resulting device. Furthermore, in order to ensure the maintainability of the modular concentration bowl, at least one insert 7 made of wear-resistant material used to form at least one ledge 5, and made of epoxy compound 17 with the filler, can additionally be fixed on end surface 11, of at least one rib 4 of inner frame 3 of upper part 1 of the concentration bowl by means of connecting layer 13 as shown in FIG. 30-33. In this case, if base 9 of at least one insert 7 made of wear-resistant material is performed more than end surface 11 of at least one rib 4 of inner frame 3 of upper part 1 of the concentration bowl, base 9 of at least one insert 7 made of wear-resistant material can be attached simultaneously to the end surface 11, of at least one rib 4 of inner frame 3 of upper part 1 of the concentration bowl, and to material 14 of working surface 15, for example, by means of connecting layer 13 as shown in FIG. 30 and FIG. 31.

In addition, at least one insert 7 made of wear-resistant material used to form at least one ledge 5, and made of epoxy compound 17 with the filler, and ledge 5, respectively, including this insert 7 made of wear-resistant material, can additionally be fixed on end surface 11 and on the sections of side surfaces 8, close to end surface 11, of at least one rib 4 of inner frame 3 of upper part 1 of the concentration bowl by means of connecting layer 13 as shown in FIG. 32 and FIG. 33. In this case, base 9, at least one insert 7 of a wear-resistant material, is made essentially in the form of a groove and is made with the possibility of articulation with at least one rib 4 of inner frame 3 of upper part 1 of the concentration bowl according to the "mortise and tenon" principle. In this case, base 9 of at least one insert 7 made of wear-resistant material can be attached simultaneously to end surface 11 of at least one rib 4 of inner frame 3 of upper part 1 of the concentration bowl, and to material 14 of working surface 15, for example, using connecting layer 13 as shown in FIG. 32 and FIG. 33.

As one of the possible options for implementing the claimed method, at least one insert 7 made of wear-resistant material used to form at least one ledge 5 can be made of epoxy compound 17 with the filler, as which, for example, any known ceramics, aluminum oxide, zirconium oxide, titanium nitride as well as metal and nonmetal carbides, for example, silicon carbide or tungsten carbide, or technical diamond can be used. In this case, epoxy compound 17 can be applied in a liquid state to end surface 11 of at least one rib 4 of inner frame 3 of upper part 1 of the concentration bowl in the case of supplying the side wall of inner frame 3 of upper part 1 of the concentration bowl with at least one rib 4 of inner frame 3 of upper part 1 of the concentration bowl, followed by the formation of at least one insert 7 made of wear-resistant material as shown in FIG. 30-33 which ensures the maintainability of the resulting device. At the same time, at least one insert 7 made of wear-resistant material performed from epoxy compound 17 with the filler, obtained in this way, is used to form at least one ledge 5 which ensures the maintainability of the claimed invention.

Furthermore, in order to ensure the maintainability of the modular concentration bowl, at least one insert 7 made of wear-resistant material used to form at least one ledge 5, and made of epoxy compound 17 with the filler, in the case of base 9, at least one insert 7 made of wear-resistant material larger than end surface 11 of at least one rib 4 of inner frame 3 of upper part 1 of the concentration bowl can be performed by applying epoxy compound 17 with the filler simultaneously on end surface 11, of at least one rib 4 of inner frame 3 of upper part 1 of the concentration bowl, and on material 14 of working surface 15. At the same time, epoxy compound 17 with the filler also performs the function of connecting layer 13 connecting base 9 of at least one insert 7 made of wear-resistant material with material 14 of working surface 15 and end surface 11 of at least one rib 4 of inner frame 3 of upper part 1 of the concentration bowl.

Besides, epoxy compound 17 with the filler can be applied in a liquid state to end surface 11 and to the sections of side surfaces 8 closest to end surface 11 of at least one rib 4 of inner frame 3 of upper part 1 of the concentration bowl and to material 14 of working surface 15 followed by the formation of at least one insert 7 made of wear-resistant material used to form at least one ledge 5 as shown in FIG. 32 and FIG. 33. In this case, base 9 of at least one insert 7 made of wear-resistant material is performed essentially in the form of a groove and connected to at least one rib 4 of inner frame 3 of upper part 1 of the concentration bowl according to the "mortise and tenon" principle which ensures the maintainability of the claimed invention. At the same time, epoxy compound 17 with the filler also performs the function of connecting layer 13 connecting the base 9 of at least one insert 7 of wear-resistant material with material 14 of working surface 15, end surface 11 and sections of side surfaces 8, close to end surface 11, of at least one rib 4 of inner frame 3 of upper part 1 of the concentration bowl.

As an example, at least one ledge 5 of upper part 1 of the concentration bowl equipped with at least one insert 7 of wear-resistant material made with the possibility of independent replacement can be implemented as follows. At least one ledge 5 can be made including at least one insert 7 made of wear-resistant material, additionally equipped with a reinforcing insert 21 on the side of base 9 of insert 7 made of wear-resistant material and additionally fixed on at least two sides with material 14 of working surface 15, for example, as shown in FIG. 15 and FIG. 17, as viewed from side surfaces 8, inserts 7 are made of wear-resistant material which increases the service life of at least one ledge 5, made with the possibility of independent replacement. This means that it ensures the maintainability of at least one ledge 5, and the claimed concentration bowl as a whole.

In addition, reinforcing insert 21 can additionally be fixed relative to insert 7 of a wear-resistant material used to form at least one ledge 5 by fixing reinforcing insert 21 with material 14 of working surface 15 on three sides as shown in FIGS. 19, 23, 38, 40 and 42. Thus, the reliability of the connection of reinforcing insert 21 with base 9 of insert 7 made of wear-resistant material is ensured, and, therefore, the maintainability of the claimed invention.

As one of the possible options for implementing the claimed method of manufacturing the modular concentration bowl, at least one 7 made of wear-resistant material used to form at least one ledge 5 additionally equipped with reinforcing insert 21 located inside at least one insert 7 made of wear-resistant material, as shown in FIG. 21, can be attached to the side wall of inner frame 3 of upper part 1 of the concentration bowl. In this case, at least one insert 7 made of wear-resistant material can be used to form at least one entire ledge 5, made with the possibility of independent replacement which also ensures ease of implementation and maintainability of the claimed invention. At the same time, reinforcing insert 21 is also provided with hole 22 designed to attach reinforcing insert 21 and insert 7 made of wear-resistant material, respectively, to the side wall of inner frame 3 of upper part 1 of the concentration bowl using fastener 20.

In the case of supplying the side wall of inner frame 3 of worn upper part 1 of the concentration bowl with at least one rib 4 of inner frame 3 of upper part 1 of the concentration bowl, end surface 11 of at least one rib 4 of inner frame 3 of upper part 1 of the concentration bowl can be additionally provided with opening 23 of end surface 11 of at least one rib 4 of inner frame 3 of upper part 1 of the concentration bowl for attaching to it at least one insert 7 of wear-resistant material using fastener 20. As shown in FIG. 15, 19, 24-26, 32, 35-40, hole 23 can be positioned perpendicular to end surface 11 of at least one rib 4 of inner frame 3 of upper part 1 of the concentration bowl. In addition, at least one insert 7 made of wear-resistant material can be attached to end surface 11 of at least one rib 4 of inner frame 3 of upper part 1 of the concentration bowl using fastener 20 as on the outside of inner frame 3 of upper part 1 of the concentration bowl, as shown in FIGS. 14, 15, 18, 19, 24, 25, 27, 29, 34 and 37-42, and from the side of the free volume inside upper part 1 of the concentration bowl, as shown in FIG. 26 and FIG. 28, or as a combination of attachment from the outside of inner frame 3 of upper part 1 of the concentration bowl and attachment from the side of the free volume inside upper part 1 of the concentration bowl which ensures the maintainability of the resulting device.

If at least one insert 7 made of wear-resistant material is attached to to end surface 11 of at least one rib 4 of inner frame 3 of upper part 1 of the concentration bowl from the side of the free volume inside upper part 1 of the concentration bowl using fastener 20, the hole in insert 7 above fastener 20 can additionally be filled with the wear-resistant material, for example, epoxy compound 17 with the filler.

In addition, as shown in FIGS. 17, 21 and 23, in the area of attachment of at least one insert 7 of wear-resistant material to the side wall of inner frame 3 of upper part 1 of the concentration bowl, the side wall of inner frame 3 of upper part 1 of the concentration bowl can additionally be provided with a layer of material 14 of working surface 15 which ensures the maintainability of the claimed invention.

As one of the possible options for implementing the claimed method, at least one insert 7 of a wear-resistant material used to form at least one ledge 5, as shown in FIGS. 19, 23, 38, 40 and 42, can additionally be provided with reinforcing insert 21 by attaching it to at least one insert 7 made of wear-resistant material using material 14 of working surface 15 from side surfaces 8 of insert 7 made of wear-resistant material and on the side of hole 22 for attaching reinforcing insert 21 to the side wall of inner frame 3 of upper part 1 of the concentration bowl with the help of fastener 20, that is, reinforcing insert 21 can be fixed with material 14 of working surface 15 on three sides. In turn, at least one insert 7 made of wear-resistant material, additionally equipped with a reinforcing insert 21, fixed by material 14 of working surface 15 on three sides, can be attached to end surface 11 of at least one rib 4 of inner frame 3 of upper part 1 of the concentration bowl using reinforcing insert 21 and fastening element 20, as shown in FIG. 19.

In this case, if reinforcing insert 21 is made arc-shaped in plan, at least one ledge 5, made with the possibility of independent replacement, for the formation of which at least one insert 7 of wear-resistant material was used, additionally equipped with such reinforcing insert 21, can be performed vertically divided into at least two parts, and at least one of the parts of at least one ledge 5 is of such a length that it coincides with the length of reinforcing insert 21 used to form at least one ledge 5 which ensures the maintainability of the claimed invention.

In the case of at least one insert 7 made of wear-resistant material used to form at least one ledge 5, with the possibility of independent replacement, additionally equipped with reinforcing insert 21 and made in the form of a set of elements 18 of inserts 7 made of wear-resistant material of rectangular shape in plan, elements 18 are provided with holes 31, and reinforcing insert 21 is attached to the side wall of inner frame 3 of upper part 1 of the concentration bowl or at least one rib 4 of inner frame 3 of upper part 1 of the concentration bowl using fasteners 20 located in holes 31 of elements 18 as shown in FIG. 12 which ensures the maintainability of the claimed invention.

In the case of at least one insert 7 made of wear-resistant material used to form at least one ledge 5, with the possibility of independent replacement, additionally equipped with reinforcing insert 21 and made in the form of a set of elements 18 of insert 7 made of wear-resistant arc-shaped material in plan, reinforcing insert 21 is attached to the side wall of inner frame 3 of upper part 1 of the concentration bowl or at least one rib 4 of inner frame 3 of upper part 1 of the concentration bowl using fasteners 20, as shown in FIGS. 13, 28 and 29 which ensures the maintainability of the claimed invention. Moreover, at least one element 18 of insert 7 made of wear-resistant material can be connected to at least two reinforcing inserts 21 which also ensures the maintainability of the claimed invention.

Figure 49:
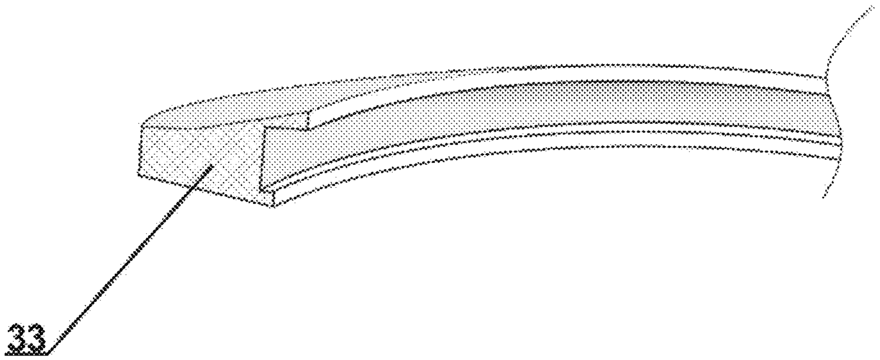
FIG. 49 shows the appearance of repair profile 33.

Besides, in this embodiment of the claimed method, the coating of the inner surface of upper part 1 of the concentration bowl with material 14 can be carried out by attaching at least one repair profile 33, shown in FIG. 49. In the case of supplying the side wall of inner frame 3 of upper part 1 of the concentration bowl with at least one rib 4 of inner frame 3 of upper part 1 of the concentration bowl, at least one repair profile 33, shown in FIG. 49, can be attached using connecting layer 13 to both material 14 and end surface 11 of at least one rib 4 of inner frame 3 of upper part 1 of the concentration bowl with the formation of at least one ledge 5, as shown in FIG. 49. As an example, repair profile 33 can be made of material 14.

Figure 50:
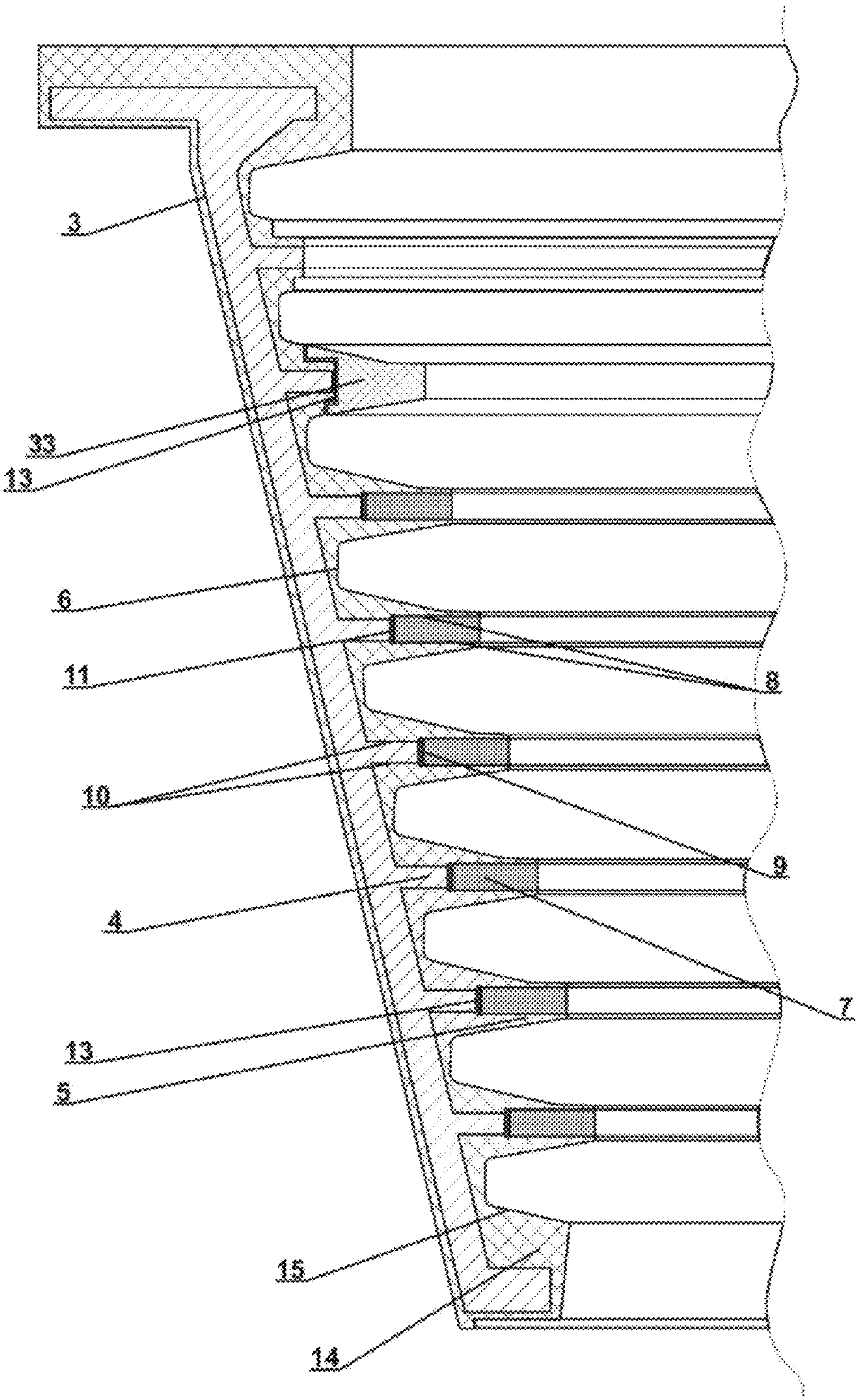
FIG. 50 shows a schematic diagram of the placement of repair profile 33 on treated surface 36 and the attachment of repair profile 33 to treated surface 36 using connecting layer 13.

Within the framework of the implementation of the claimed method, repair profile 33 can be performed of any known design. As an example, repair profile 33 may have a V-shaped cross-section, as shown in FIG. 49 and FIG. 50, a U-shaped or trapezoidal shape. At the same time, in the case of the implementation of repair profile 33 of trapezoidal cross-section, the angle of inclination of the side faces of repair profile 33 can range from 0° to 135°. In turn, repair profile 33 can be made of any shape in the plan, for example, an arc-shaped or annular shape in the plan, which ensures the maintainability of the claimed invention.

At the same time, in working surface 15 in the area of ribs 4 of inner frame 3 of upper part 1 of the concentration bowl, ledges 5 and cavities 6 located between ledges 5 can be performed which is necessary to ensure the reliability of the claimed invention and its maintainability. The implementation of ledges 5 and cavities 6 within the framework of the implementation of the claimed method of manufacturing a modular concentration bowl can be carried out via any known method. As an example, the implementation of ledges 5 and cavities 6 within the framework of the implementation of the claimed method of manufacturing a modular concentration bowl can be carried out using a special injection mold which can be made radial or arc-shaped that provides ease of manufacture of the claimed invention.

Within the framework of the implementation of the claimed method of manufacturing the modular concentration bowl, working surface 15 of upper part 1 of the concentration bowl can be made with the possibility of independent replacement.

As shown in FIG. 37-42, in this case, at least one ledge 5, made with the possibility of independent replacement, can additionally be provided on one side with plate 24 made of material 14 which ensures the maintainability of the claimed invention. At the same time, at least one insert 7 of wear-resistant material is used to form at least one ledge 5, equipped with reinforcing insert 21 for attaching at least one insert 7 of wear-resistant material to the side wall of inner frame 3 of upper part 1 of the concentration bowl using fastener 20. In the case of such an implementation of the claimed invention, ledges 5, additionally equipped with plates 24, can be installed in such a way on the inner surface (not shown in the drawings) of the side wall of inner frame 3 of upper part 1 of the concentration bowl, so that plate 24 of at least one of ledges 5 is fixed by another ledge 5, equipped with plate 24, in order to securely fix ledges 5, equipped with plates 24, and tight fit of ledges 5 and plates 24 to the side wall of inner frame 3 of upper part 1 of the concentration bowl. Thus, in the area of plates 24 of ledges 5 and fixed by ledges 5, cavities 6 of working surface 15 are located.

At the same time, as shown in FIG. 40 and FIG. 42, plate 24 of at least one ledge 5 can additionally be provided with core 25 which ensures the reliability of the resulting device and its maintainability. Any known metal of high strength can be used as a material for making core 25 of plate 24, at least one ledge 5, for example, steel of the appropriate grades, composite material with a suitable set of properties or polymers with a suitable set of properties which is necessary to ensure the reliability of the resulting device, increase its service lifetime, ease of manufacture of the claimed invention, as well as to ensure its maintainability. Within the framework of the implementation of the claimed method, core 25 of plate 24 of at least one ledge 5 can additionally be connected to reinforcing insert 21 which is provided with at least one insert 7 of wear-resistant material used to form at least one ledge 5. Such a technical solution ensures the reliability of the claimed device, an increase in its service lifetime, ease of manufacture of the claimed invention as well as ensuring its maintainability.

In this case, the stage of attaching at least one insert 7 of the wear-resistant material used to form at least ledge 5 is carried out using reinforcing insert 21 and fastening element 20 to inner frame 3 of upper part 1 of the concentration bowl, and the subsequent coating with material 14 of working surface 15 of the inner surface of the side wall of inner frame 3 of upper part 1 of the concentration bowl is carried out by fixing plate 24 with at least one ledge 5 with another ledge 5 equipped with plate 24.

After that, the side wall of inner frame 3 of upper part 1 of the concentration bowl in the area of cavities 6 and working surface 15 of the concentration bowl in the area of cavities 6 are supplied with nozzles 16 for the injection of a fluidizing liquid. Within the framework of the implementation of the claimed invention, nozzles 16 for the injection of a fluidizing liquid can be made in the form of round holes as shown in FIGS. 14, 16, 18, 20, 22, 27, 34, 37, 39, 41, 43 and 44 which ensures the reliability of the claimed invention.

Next, lower part 2 of the concentration bowl is attached to upper part 1 of the concentration bowl.

At the same time, upper part 1 of the concentration bowl and lower part 2 of the concentration bowl are replaceable, independently of each other which ensures an increase in the service lifetime of the claimed centrifugal concentrator and its reliability.

The described method makes it easy to create the modular concentration bowl with reliability, maintainability and a long service lifetime.

As one of the possible options for implementing the claimed method of manufacturing the modular concentration bowl, insert 7 made of wear-resistant material used to form ledge 5 is fixed on end surface 11 of at least one rib 4 of inner frame 3 of upper part 1 of the concentration bowl, close to the border of upper part 1 of the concentration bowl and lower part 2 of the concentration bowl which ensures the reliability of the claimed invention and an increase in its service lifetime.

Also, as one of the possible options for implementing the claimed method, all end surfaces 11 of ribs 4 of inner frame 3 of upper part 1 of the concentration bowl are provided with inserts 7 of wear-resistant material used to form ledges 5 which ensures the reliability of the claimed invention and an increase in its service lifetime, its maintainability as well as ease of implementation of the manufacturing method of the claimed invention.

Within the framework of the implementation of the claimed method of manufacturing the modular concentration bowl, the angle of inclination of working surface 15 of upper part 1 of the concentration bowl made of material 14 can be performed in the range from 15° to 90° to the horizontal surface. As an example of the implementation of such an angle of inclination of working surface 15, ledges 5 of working surface 15 can be performed with an increase in the thickness of ledges 5 in the direction from top to bottom, towards bottom 2 of the concentration bowl, as shown in FIG. 34.

As Another Implementation Option, the Method of Manufacturing the Concentration Bowl can be Implemented as Follows As a starting point within the framework of the implementation of this option, the method of manufacturing the concentration bowl uses upper part 1 of the modular concentration bowl, worn out during operation which allows extending its service lifetime.

First, worn-out upper part 1 of the modular concentration bowl is machined during which elastic material 14 of working surface 15 is removed from the inner surface of upper part 1 of the concentration bowl which is necessary to ensure the reliability of the resulting device and increase its service lifetime. As an example, during machining, only annular ledges 5 of working surface 15 of upper part 1 of the concentration bowl can be removed to the level of end surface 11 of annular ribs 4 of frame 3 which is necessary to ensure the reliability of the resulting device and increase its service lifetime. Also, during mechanical processing, only elastic material 14 of working surface 15 of upper part 1 of the concentration bowl can be removed in the area of annular cavities 6 to the level of the side wall of frame 3. Or, during mechanical processing, all elastic material 14 of working surface 15 located inside upper part 1 of the concentration bowl can be removed, including from the inside of the side wall of frame 3 and from the surface of annular ribs 4 of frame 3.

Thus, as a result of mechanical processing of worn upper part 1 of the modular concentration bowl, a mechanically treated surface (not shown in the drawings) of upper part 1 of the modular concentration bowl is obtained. In turn, as a mechanically processed surface, when implementing the option of the claimed method, they can act in various combinations: mechanically processed elastic material 14, side faces 10 of annular ribs 4 of frame 3, end surfaces 11 of annular ribs 4 of frame 3 of upper part 1 of the concentration bowl and the inner surface (not shown in the drawings) of the side wall of frame 3 of upper part 1 of the concentration bowl.

After that, the mechanically treated surface of upper part 1 of the concentration bowl is subjected to chemical etching.

If the machining was carried out with the removal of only annular ledges 5 of working surface 15 of upper part 1 of the concentration bowl to the level of end surface 11 of annular ribs 4 of frame 3, then chemical etching of the mechanically treated surface is carried out (not shown in the drawings) of upper part 1 of the modular concentration bowl, namely, end surface 11 of the annular ribs of frame 3 and elastic material 14.

If the mechanical treatment was carried out with the removal of only elastic material 14 of working surface 15 of upper part 1 of the concentration bowl in the area of annular cavities 6 to the level of the side wall of frame 3, then chemical etching of the mechanically treated surface is carried out (not shown in the drawings) of upper part 1 of the modular concentration bowl, namely, side faces 10 of annular ribs 4 of frame 3, the inner surface (not shown in the drawings) of the side wall of frame 3 and elastic material 14 of working surface 15 in the area of annular ledges 5.

If the mechanical treatment of the surface was carried out with the removal of all elastic material 14 of working surface 15 located inside upper part 1 of the concentration bowl, then chemical etching of the mechanically treated surface (not shown in the drawings) of upper part 1 of the modular concentration bowl is carried out, namely, side faces 10 of annular ribs 4 of frame 3, end surface 11 of annular ribs 4 of frame 3 of upper part 1 of the concentration bowl and the inner surface (not shown in the drawings) of the side wall of frame 3.

Then the restoration of the inner surface of upper part 1 of the concentration bowl is carried out. If necessary, the following elements of the inner surface of upper part 1 of the concentration bowl are restored, namely, side faces 10 of annular ribs 4 of frame 3, end surface 11 of annular ribs 4 of frame 3 of upper part 1 of the concentration bowl and the inner surface (not shown in the drawings) of the side wall of frame 3 which is necessary to ensure reliability of the resulting device and increase its service lifetime. Restoration of the inner surface of upper part 1 of the concentration bowl can be carried out by restoring the surfaces of any combination of the listed elements of the claimed device. In this case, the restoration of the surface of side faces 10 of annular ribs 4 of frame 3 is carried out to the specified parameters of the angle of inclination of side faces 10 of annular ribs 4 of frame 3 so that annular ribs 4 of frame 3 have a wedge shape or rectangular shape in cross-section, as shown in FIG. 1-9.

In this case, chemical etching is carried out in order to achieve the best subsequent fusion of the surface of side faces 10 of annular ribs 4 of frame 3, end surfaces 11 of annular ribs 4 of frame 3 of upper part 1 of the concentration bowl or the inner surface (not shown in the drawings) of the side wall of frame 3, as well as mechanically processed elastic material 14 with elastic material 14, which, after supplying end surface 11 with at least one annular rib 4 of frame 3 with insert 7 of wear-resistant material, cover the inner surface of upper part 1 of the concentration bowl, to form working surface 15. This is necessary to increase the service lifetime of working surface 15, and hence the modular concentration bowl as a whole as well as to ensure its reliability.

After that, end surface 11 of at least one annular rib 4 of frame 3 can be provided with insert 7 made of wear-resistant material which is necessary to ensure the reliability of the resulting device and increase its service lifetime.

The end surface 11 of at least one annular rib 4 of frame 3 can be provided with insert 7 made of wear-resistant material via any known way. As an example, insert 7 can be attached to end surface 11 of at least one annular rib 4 of frame 3 by means of a screw connection, can be attached by spraying ceramics on end surface 11 of at least one annular rib 4 of frame 3 or via any other known method. In this case, insert 7 made of wear-resistant material is attached to end surface 11 of at least one annular rib 4 of frame 3 from the side of base 9 of insert 7, which is necessary to ensure the reliability of the resulting device and increase its service lifetime.

As an example, insert 7 made of wear-resistant material can be attached to end surface 11 of at least one annular rib 4 of frame 3 using connecting layer 13 as shown in 1, 2, 4 and 5. As connecting layer 13, the layer of any connecting material can be used. The described attachment of inserts 7 made of wear-resistant material to retaining shells 12 ensures a long service lifetime, ease of manufacture of the device and its reliability. As an example of such connecting layer 13, an adhesive layer or a solder layer can be used as well as a layer of polyurethane, silicone, polyethylene, thermoplastic, raw rubber and their derivatives, or any other similar known materials. This implementation of connecting layer 13 provides a long service lifetime, ease of manufacture of the device and its reliability.

Besides, in order to improve the fixation of inserts 7 made of wear-resistant material on end surfaces 11 of annular ribs 4 of frame 3, end surface 11 of at least one annular rib 4 of frame 3 can additionally be provided with retaining shell 12. In this case, inserts 7 made of wear-resistant material are attached to retaining shells 12. Such fixing of retaining shells 12 on end surface 11 of at least one annular rib 4 of frame 3 ensures a long service lifetime, ease of manufacture of the device and its reliability.

Inserts 7 made of wear-resistant material can be attached to retaining shells 12 using any known method of connection, for example, with glue. In this case, inserts 7 made of wear-resistant material are attached to retaining shells 12 from the side of the base 9 of inserts 7. The described attachment of inserts 7 made of wear-resistant material to retaining shells 12 ensures a long service lifetime, ease of manufacture of the device and its reliability. As an example, insert 7 made of wear-resistant material can be attached to end surface 11 of at least one annular rib 4 of frame 3 from the side of base 9 of insert 7 using connecting layer 13 as shown in FIGS. 8 and 9. In addition to providing the inner surface of shell 12 with connecting layer 13 for attaching insert 7 from its base 9, side surfaces 8 of any of inserts 7 can also be provided with additional connecting layer 13 designed to improve the connection of side surfaces 8 of inserts 7 with elastic material 14 of working surface 15 as shown in FIG. 7 and FIG. 9. Such a supply of side surfaces 8 of inserts 7 with additional connecting layer 13 makes it possible to improve the fixation of inserts 7 with elastic material 14 of working surface 15 which means to increase the service lifetime of the claimed invention and its reliability.

In turn, retaining shell 12 can be fixed to end surface 11 of at least one annular rib 4 of frame 3 via any known way. As an example, retaining shells 12 can be fixed to end surface 11 of at least one annular rib 4 of frame 3 by means of a welded joint, screw connection, glue, can be connected by soldering or can be fixed via any other known method.

As one of the possible options for implementing the claimed method, end surface 11 of at least one annular rib 4 of frame 3 or retaining shell 12 is provided with insert 7 made of wear-resistant material, made in the form of a monolithic ring as shown in FIG. 11. Thus, in this embodiment, inserts 7 made of wear-resistant material performed in the annular shape in longitudinal section can be used. Such an embodiment of inserts 7 made of wear-resistant material within the framework of the implementation of the claimed invention ensures the reliability of the claimed invention, an increase in its service lifetime as well as the simplicity of manufacturing the claimed device.

The claimed modular concentration bowl can also be manufactured as follows. First, the side wall of inner frame 3 of upper part 1 of the concentration bowl is made which ensures the reliability of the claimed device, an increase in its service lifetime as well as ease of manufacture and maintainability of the claimed invention.

If necessary, at least one rib 4 of inner frame 3 of upper part 1 of the concentration bowl can additionally be attached to the side wall of inner frame 3 of upper part 1 of the concentration bowl.

Ribs 4 of inner frame 3 of upper part 1 of the concentration bowl can be attached to the side wall of inner frame 3 of upper part 1 of the concentration bowl via any known way. As an example, ribs 4 of inner frame 3 of upper part 1 of the concentration bowl can be attached to the side wall of inner frame 3 of upper part 1 of the concentration bowl by screw connection, bolt connection, rivet connection, welded connection, glued to the side wall of frame 3 of upper part 1 of the concentration bowl, can be soldered to the side wall of inner frame 3 of upper part 1 of the concentration bowl, or can be connected to the side wall of inner frame 3 of upper part 1 of the concentration bowl according to the "mortise and tenon" principle using the appropriate additional fasteners (not shown in the drawings).

Then the inner surface of upper part 1 of the concentration bowl is covered with material 14 to form working surface 15 of the concentration bowl which ensures a long service lifetime, ease of manufacture of the device and its reliability, and maintainability. As an example of such a process of applying material 14 to the inner surface of the concentration bowl, the known extrusion method can be used. Besides, the process of applying material 14 to the inner surface of upper part 1 of the concentration bowl can be carried out using a special injection molding machine designed for thermoplastic injection.

Moreover, inserts 7 made of wear-resistant material used to form ledges 5, made with the possibility of independent replacement, can additionally be fixed with the help of material 14 of working surface 15, at least on both sides as shown in FIGS. 1-10, 35, 36, 43 and 50. This arrangement of inserts 7 made of wear-resistant material used to form ledges 5, made with the possibility of independent replacement, leads to additional fixation of these inserts 7 made of wear-resistant material with the entire thickness of material layer 14 which ensures the reliability of the claimed device, an increase in its service lifetime as well as ease of manufacture of the claimed invention and its maintainability. As an example, inserts 7 made of wear-resistant material used to form ledges 5 can additionally be fixed with material 14 by fixing at least two side faces 8 of inserts 7 made of wear-resistant material used to form ledges 5, made with the possibility of independent replacement. Besides, within the framework of the implementation of the claimed method of manufacturing the modular concentration bowl, the entire surface of inserts 7 made of wear-resistant material used to form ledges 5, made with the possibility of independent replacement, can be covered with material 14. Thus, at least one insert 7 made of wear-resistant material used to form at least one ledge 5, made with the possibility of independent replacement, can be additionally fixed on three sides using material 14. This design makes it possible to significantly increase the service lifetime of the modular concentration bowl, its reliability and maintainability due to the reliable fixation of inserts 7 made of wear-resistant material used to form ledges 5, made with the possibility of independent replacement.

Also, as an example, at least one insert 7 made of wear-resistant material used to form at least one ledge 5, made with the possibility of independent replacement, can be fixed with material 14 by fixing at least two side faces 8 of inserts 7 made of wear-resistant material. In this case, material 14 can be made in the form of a combination of an elastic material and epoxy compound 17 with the filler which can be used, for example, any known ceramics, aluminum oxide, zirconium oxide, titanium nitride as well as metal and nonmetal carbides, for example, silicon carbide or tungsten carbide, or technical diamond. Moreover, in this case, as shown in FIG. 36, fixation in the area of at least two side faces 8 of inserts 7 made of wear-resistant material can be carried out using epoxy compound 17 with filler which ensures the maintainability of the claimed invention.

Within the framework of any of the possible options for the implementation of the claimed method of manufacturing the modular concentration bowl, if reinforcing insert 21 is made arc-shaped in plan, at least one ledge 5, made with the possibility of independent replacement, for the formation of which at least one insert 7 made of wear-resistant material was used, equipped with such reinforcing insert 21, can be performed vertically divided into at least two parts, and at least one of the parts of at least one ledge 5 is of such a length that it coincides with the length of reinforcing insert 21 used to form at least one ledge 5 which ensures the maintainability of the claimed invention.

As a material 14, any known elastic material, wear-resistant material or a combination of them can be used to perform working surface 15 of the concentration bowl. As an example of an elastic material when performing material 14, polyurethane, silicone, polyethylene, thermoplastic, raw rubber, rubber and their derivatives, including polyurethane, silicone, polyethylene, thermoplastic, raw rubber or rubber, as well as any other similar known materials, can be used. Any known ceramics, aluminum oxide, zirconium oxide, titanium nitride, technical diamond, composite materials, or any other similar material can be used as a wear-resistant material when performing material 14. Also, materials containing metal carbides, for example, tungsten carbide, or nonmetal carbides, for example, silicon carbide or any other known metal carbides or nonmetal carbides, can be used as a wear-resistant material when performing material 14. High-chromium steels or high-manganese steels can also be used as a wear-resistant material when performing material 14. Besides, epoxy compound 17 with the filler can be used as a wear-resistant material when performing material 14, which can be used, for example, any known ceramics, aluminum oxide, zirconium oxide, titanium nitride as well as metal and nonmetal carbides, for example, silicon carbide or tungsten carbide, or technical diamond. Such a choice of material 14 for performing working surface 15 of the concentration bowl within the framework of the implementation of the claimed invention provides an increase in the service lifetime of the modular concentration bowl, the reliability of the claimed device as well as the simplicity of its manufacture.

In this case, if material 14 of working surface 15 is elastic, working surface 15 can be made entirely of one elastic material 14. Besides, material 14 made elastic and used to perform cavities 6, and material 14 made elastic and used to perform at least one ledge 5, can perform different from each other.

If the side wall of inner frame 3 of upper part 1 of the concentration bowl is provided with at least one rib, material 14 of working surface 15 can be applied to the inner surface of the side wall of inner frame 3 of upper part 1 of the concentration bowl up to the level of end surface 11 of at least one rib 4 of inner frame 3 of upper part 1 of the concentration bowl, thereby covering the inner surface of the side wall of inner frame 3 of upper part 1 of the concentration bowl and side faces 10 of at least one rib 4 of inner frame 3 of upper part 1 of the concentration bowl. As another example, the application of material 14 of working surface 15 to inner surface of the side wall of inner frame 3 of upper part 1 of the concentration bowl can be carried out above the level of end surface 11 of at least one rib 4 of inner frame 3 of upper part 1 of the concentration bowl. In both cases, such an option for applying material 14 ensures the simplicity of this implementation of the claimed method of manufacturing a modular concentration bowl as well as the reliability, maintainability of the resulting device with a long service lifetime. At the same time, in working surface 15, in the area of ribs 4 of inner frame 3 of upper part 1 of the concentration bowl, cavities 6 located between ribs 4 of inner frame 3 of upper part 1 of the concentration bowl can be performed which is necessary to ensure the reliability of the claimed invention and its maintainability. The implementation of cavities 6 within the framework of the implementation of the claimed method of manufacturing a modular concentration bowl can be carried out via any known method. As an example, the implementation of cavities 6 within the framework of the implementation of the claimed method of manufacturing a modular concentration bowl can be carried out using a special injection mold which can be made radial or arc-shaped that provides ease of manufacture of the claimed invention.

After that, at least one ledge 5 is fixed to inner frame 3 of upper part 1 of the concentration bowl, for the formation of which at least one insert 7 made of wear-resistant material or at least one reinforcing insert 21 or a combination thereof was used. In all cases, such a solution ensures the simplicity of manufacturing a modular concentration bowl, its maintainability, reliability and long service lifetime. At the same time, at least one ledge 5, for the formation of which at least one insert 7 made of wear-resistant material was used, or at least one reinforcing insert 21, or a combination of them, is performed with the possibility of independent replacement which also ensures the ease of manufacturing a modular concentration bowl, its maintainability, reliability and long service lifetime.

As an example, at least one ledge 5 of upper part 1 of the concentration bowl equipped with at least one insert 7 of wear-resistant material made with the possibility of independent replacement can be implemented as follows. At least one ledge 5 can be made including at least one insert 7 made of wear-resistant material, additionally equipped with a reinforcing insert 21 on the side of base 9 of insert 7 made of wear-resistant material and additionally fixed on at least two sides with material 14 of working surface 15, for example, as shown in FIG. 15 and FIG. 17, as viewed from side surfaces 8, inserts 7 are made of wear-resistant material which increases the service life of at least one ledge 5, made with the possibility of independent replacement. This means that it ensures the maintainability of at least one ledge 5, and the claimed concentration bowl as a whole.

In the case of the implementation of the claimed invention, provided with a side wall of inner frame 3 of upper part 1 of the concentration bowl with at least one insert 7 of wear-resistant material fixed to it, at least one insert 7 of wear-resistant material, at least one insert 7 made of wear-resistant material used to form at least one ledge 5 can be performed with the possibility of independent replacement which ensures the maintainability of the claimed invention. In this case, at least one insert 7 made of wear-resistant material can be fixed to the side wall of inner frame 3 of upper part 1 of the concentration bowl by means of a screw connection, bolt connection, rivet connection or can be attached via any other known method.

As another example, at least one insert 7 made of wear-resistant material used to form at least one ledge 5 can be attached to the inner surface of the side wall of inner frame 3 of upper part 1 of the concentration bowl using a fastener 20, for example, a bolt, stud, screw or self-tapping screw, as shown in FIGS. 14-28, 34 and 37-42. In the case of this type of connection, at least one insert 7 made of wear-resistant material can additionally be provided with reinforcing insert 21 designed to attach insert 7 made of wear-resistant material to the inner surface of the side wall of inner frame 3 of upper part 1 of the concentration bowl which ensures the maintainability of the claimed invention. In turn, in the case of the design of claimed upper part 1 of the concentration bowl, at least one insert 7 made of wear-resistant material with the possibility of independent replacement, respectively, at least one protrusion 5, for the formation of which at least one insert 7 made of wear-resistant material was used, can also be performed with the possibility of independent replacement, as shown in FIGS. 14-27, 34 and 37-42, which, in turn, ensures the maintainability of the claimed invention. At the same time, at least one insert 7 made of wear-resistant material can be attached using fastener 20 of reinforcing insert 21 to the side wall of inner frame 3 of upper part 1 of the concentration bowl can be carried out both from the outside of inner frame 3 of upper part 1 of the concentration bowl, as shown in FIGS. 16, 17 and 20-23, and from the side of the free volume inside upper part 1 of the concentration bowl (not shown in the drawings), or in the form of a combination of attachment from the outside of inner frame 3 of upper part 1 of the concentration bowl and attachment from the side of the free volume inside upper part 1 of the concentration bowl (not shown in the drawings).

If at least one insert 7 made of wear-resistant material is attached to the side wall of inner frame 3 of upper part 1 of the concentration bowl from the side of the free volume inside upper part 1 of the concentration bowl using fastener 20, the hole in insert 7 above fastener 20 can additionally be filled with the wear-resistant material, for example, epoxy compound 17 with the filler.

As one of the embodiments for implementing the claimed method of manufacturing the modular concentration bowl, at least one insert 7 made of wear-resistant material used to form at least one ledge 5 equipped with reinforcing insert 21 located inside at least one insert 7 made of wear-resistant material, as shown in FIG. 21, can be attached to the side wall of inner frame 3 of upper part 1 of the concentration bowl. In this case, at least one insert 7 made of wear-resistant material can be used to form at least one entire ledge 5, made with the possibility of independent replacement which also ensures ease of implementation and maintainability of the claimed invention. In this case, reinforcing insert 21 is also provided with opening 22 designed to attach reinforcing insert 21 to the side wall of inner frame 3 of upper part 1 of the concentration bowl using fastener 20.

In the case of supplying the side wall of inner frame 3 of worn upper part 1 of the concentration bowl with at least one rib 4 of inner frame 3 of upper part 1 of the concentration bowl, end surface 11 of at least one rib 4 of inner frame 3 of upper part 1 of the concentration bowl can be additionally provided with opening 23 of end surface 11 of at least one rib 4 of inner frame 3 of upper part 1 of the concentration bowl for attaching to it at least one insert 7 of wear-resistant material using fastener 20. As shown in FIGS. 15, 19, 24-26, 32 and 35-40, hole 23 can be positioned perpendicular to end surface 11 of at least one rib 4 of inner frame 3 of upper part 1 of the concentration bowl. In addition, at least one insert 7 made of wear-resistant material can be attached to end surface 11 of at least one rib 4 of inner frame 3 of upper part 1 of the concentration bowl using fastener 20 as on the outside of inner frame 3 of upper part 1 of the concentration bowl, as shown in FIGS. 14, 15, 18, 19, 24, 25, 27, 29, 34 and 37-42, and from the side of the free volume inside upper part 1 of the concentration bowl, as shown in FIG. 26 and FIG. 28, or as a combination of attachment from the outside of inner frame 3 of upper part 1 of the concentration bowl and attachment from the side of the free volume inside upper part 1 of the concentration bowl which ensures the maintainability of the resulting device.

In addition, reinforcing insert 21 can additionally be fixed relative to insert 7 of a wear-resistant material used to form at least one ledge 5 by fixing reinforcing insert 21 with material 14 of working surface 15 on three sides as shown in FIGS. 19, 23, 38, 40 and 42. Thus, the reliability of the connection of reinforcing insert 21 with base 9 of insert 7 made of wear-resistant material is ensured, and, therefore, the maintainability of the claimed invention.

In the case of supplying the side wall of inner frame 3 of upper part 1 of the concentration bowl with at least one rib 4 of inner frame 3 of upper part 1 of the concentration bowl, end surface 11 of at least one rib 4 of inner frame 3 of upper part 1 of the concentration bowl can be additionally provided with opening 23 of end surface 11 of at least one rib 4 of inner frame 3 of upper part 1 of the concentration bowl for attaching to it at least one insert 7 made of wear-resistant material using fastener 20. As shown in FIGS. 15, 19, 24-26, 32 and 35-40, hole 23 can be positioned perpendicular to end surface 11 of at least one rib 4 of inner frame 3 of upper part 1 of the concentration bowl. In addition, at least one insert 7 made of wear-resistant material can be attached to end surface 11 of at least one rib 4 of inner frame 3 of upper part 1 of the concentration bowl using fastener 20 as on the outside of inner frame 3 of upper part 1 of the concentration bowl, as shown in FIGS. 14, 15, 18, 19, 24, 25, 27, 29, 34 and 37-42, and from the side of the free volume inside upper part 1 of the concentration bowl, as shown in FIG. 26 and FIG. 28, or as a combination of attachment from the outside of inner frame 3 of upper part 1 of the concentration bowl and attachment from the side of the free volume inside upper part 1 of the concentration bowl which ensures the maintainability of the resulting device.

If at least one insert 7 made of wear-resistant material is attached to to end surface 11 of at least one rib 4 of inner frame 3 of upper part 1 of the concentration bowl from the side of the free volume inside upper part 1 of the concentration bowl using fastener 20, the hole in insert 7 above fastener 20 can additionally be filled with the wear-resistant material, for example, epoxy compound 17 with the filler.

In addition, as shown in FIGS. 17, 21 and 23, in the area of attachment of at least one insert 7 of wear-resistant material to the side wall of inner frame 3 of upper part 1 of the concentration bowl, the side wall of inner frame 3 of upper part 1 of the concentration bowl can additionally be provided with a layer of material 14 of working surface 15 which ensures the maintainability of the claimed invention.

As one of the possible options for implementing the claimed method, at least one insert 7 of a wear-resistant material used to form at least one ledge 5, as shown in FIGS. 19, 23, 38, 40 and 42, can additionally be provided with reinforcing insert 21 by attaching it to at least one insert 7 made of wear-resistant material using material 14 of working surface 15 from side surfaces 8 of insert 7 made of wear-resistant material and on the side of hole 22 for attaching reinforcing insert 21 to the side wall of inner frame 3 of upper part 1 of the concentration bowl with the help of fastener 20, that is, reinforcing insert 21 can be fixed with material 14 of working surface 15 on three sides. In turn, at least one insert 7 made of wear-resistant material, additionally equipped with a reinforcing insert 21, fixed by material 14 of working surface 15 on three sides, can be attached to end surface 11 of at least one rib 4 of inner frame 3 of upper part 1 of the concentration bowl using reinforcing insert 21 and fastening element 20, as shown in FIG. 19.

In this case, if reinforcing insert 21 is made arc-shaped in plan, at least one ledge 5, made with the possibility of independent replacement, for the formation of which at least one insert 7 made of wear-resistant material was used, additionally equipped with such reinforcing insert 21, can be performed vertically divided into at least two parts, and at least one of the parts of at least one ledge 5 is of such a length that it coincides with the length of reinforcing insert 21 used to form at least one ledge 5 which ensures the maintainability of the claimed invention.

As a possible example of the implementation of the claimed method, end surface 11 of at least one rib 4 of inner frame 3 of upper part 1 of the concentration bowl or retaining shell 12 is provided with at least one insert 7 made of wear-resistant material used to form at least one ledge 5 made with the possibility of independent replacement, made in the form of a set of elements 18 of inserts 7 made of wear-resistant material of various shapes in plan as shown in FIGS. 12, 13, 28 and 29. In this case, inserts 7 made of wear-resistant material used to form ledges 5, made with the possibility of independent replacement, can be made in the form of a set of elements 18 of inserts 7 of wear-resistant material of rectangular shape in plan (FIG. 12), and hence in longitudinal section. Also, inserts 7 made of wear-resistant material used to form ledges 5 can be made in the form of a set of elements 18 of inserts 7 made of wear-resistant arc-shaped material in plan, and hence in longitudinal section, as shown in FIGS. 13, 28 and 29. Also, as an example, inserts 7 made of wear-resistant material used to form ledges 5 can be made in the form of a set of elements 18 of inserts 7 made of wear-resistant material of polygonal shape in plan, and hence in longitudinal section. The described embodiments of inserts 7 made of wear-resistant material used to form ledges 5, having any of the listed forms in the plan, provide an increase in the service lifetime of the claimed invention, the reliability of the device and the simplicity of its manufacture.

In the case of at least one insert 7 made of wear-resistant material used to form at least one ledge 5, with the possibility of independent replacement, additionally equipped with reinforcing insert 21 and made in the form of a set of elements 18 of inserts 7 made of wear-resistant material of rectangular shape in plan, elements 18 are provided with holes 31, and reinforcing insert 21 is attached to the side wall of inner frame 3 of upper part 1 of the concentration bowl or at least one rib 4 of inner frame 3 of upper part 1 of the concentration bowl using fasteners 20 located in holes 31 of elements 18 (not shown in the drawings) which ensures the maintainability of the claimed invention.

In the case of at least one insert 7 made of wear-resistant material used to form at least one ledge 5, with the possibility of independent replacement, additionally equipped with reinforcing insert 21 and made in the form of a set of elements 18 of insert 7 made of wear-resistant arc-shaped material in plan, reinforcing insert 21 is attached to the side wall of inner frame 3 of upper part 1 of the concentration bowl or at least one rib 4 of inner frame 3 of upper part 1 of the concentration bowl using fasteners 20, as shown in FIGS. 13, 28 and 29 which ensures the maintainability of the claimed invention. Moreover, at least one element 18 of insert 7 made of wear-resistant material can be connected to at least two reinforcing inserts 21 which also ensures the maintainability of the claimed invention.

After that, the side wall of inner frame 3 of upper part 1 of the concentration bowl in the area of cavities 6 and working surface 15 of the concentration bowl in the area of cavities 6 are supplied with nozzles 16 for the injection of a fluidizing liquid. Within the framework of the implementation of the claimed invention, nozzles 16 for the injection of a fluidizing liquid can be made in the form of round holes as shown in FIGS. 14, 16, 18, 20, 22, 27, 34, 37, 39, 41, 43 and 44 which ensures the reliability of the claimed invention.

Next, lower part 2 of the concentration bowl is attached to upper part 1 of the concentration bowl.

At the same time, upper part 1 of the concentration bowl and lower part 2 of the concentration bowl are replaceable, independently of each other which ensures an increase in the service lifetime of the centrifugal concentrator and its reliability.

The described method makes it easy to create the modular concentration bowl with reliability, maintainability and a long service lifetime.

As one of the possible options for implementing the claimed method of manufacturing the modular concentration bowl, insert 7 made of wear-resistant material used to form ledge 5 is fixed on end surface 11 of at least one rib 4 of inner frame 3 of upper part 1 of the concentration bowl, close to the border of upper part 1 of the concentration bowl and lower part 2 of the concentration bowl which ensures the reliability of the claimed invention and an increase in its service lifetime.

Also, as one of the possible options for implementing the claimed method, all end surfaces 11 of ribs 4 of inner frame 3 of upper part 1 of the concentration bowl are provided with inserts 7 of wear-resistant material used to form ledges 5 which ensures the reliability of the claimed invention and an increase in its service lifetime, its maintainability as well as ease of implementation of the manufacturing method of the claimed invention.

Within the framework of the implementation of the claimed method of manufacturing the modular concentration bowl, the angle of inclination of working surface 15 of upper part 1 of the concentration bowl made of material 14 can be performed in the range from 15° to 90° to the horizontal surface. As an example of the implementation of such an angle of inclination of working surface 15, ledges 5 of working surface 15 can be performed with an increase in the thickness of ledges 5 in the direction from top to bottom, towards bottom 2 of the concentration bowl, as shown in FIG. 34.

The described implementation of the method makes it easy to create the modular concentration bowl with reliability, maintainability and a long service lifetime by restoring it.

The options for implementing the method described in the text of this application are not the only possible ones and are given for the purpose of the most visual disclosure of the essence of the invention.

The proposed modular concentration bowl is reliable and easy to manufacture, and also has a long service lifetime and maintainability, due to the presence of at least one insert used to form at least one ledge 5 and attached to inner frame 3 of upper part 1 of the concentration bowl. Inserts 7 made of wear-resistant material, reinforcing inserts 21, as well as their combination can be used as inserts. The proposed design of upper part 1 of the concentration bowl ensures the maintainability of the claimed invention as well as the simplicity of its manufacture, reliability and long service lifetime. In addition, at least one insert 7 made of wear-resistant material can be attached to at least one rib 4 of inner frame 3 of upper part 1 of the concentration bowl and additionally fixed with material 14 of working surface 15 of upper part 1 of the concentration bowl, at least on both sides.

Also, at least one ledge 5 can be made with the possibility of independent replacement which also ensures the maintainability of the claimed invention as well as the simplicity of its manufacture, reliability and long service lifetime.

The proposed modular concentration bowl can be implemented using industrial production.

The invention claimed is:

1. A modular concentration bowl of the centrifugal concentrator comprising:

an upper part and a lower part being interconnected, wherein the upper part forms a side wall of the bowl and the lower part form a bottom of the bowl; and a work surface attached to the upper part and the lower part, wherein the upper part of the bowl has an inner frame, wherein the working surface covers an inner surface of the upper part of the concentration bowl with a formation of ledges and cavities between the ledges, wherein at least one insert is attached to the inner frame of the upper part of the bowl to form at least one ledge.

2. The modular concentration bowl according to claim 1, wherein at least one insert is made of wear-resistant material.

3. The modular concentration bowl according to claim 1, wherein at least one insert is made of reinforcing.

4. The modular concentration bowl according to claim 1, wherein at least one insert of wear-resistant material attached to at least one reinforcing insert is used to form at least one ledge.

5. The modular concentration bowl according to claim 1, wherein the insert is fixed by the material of the working surface.

6. The modular concentration bowl according to claim 5, wherein the insert made of wear-resistant material is fixed by the material of the working surface, including the epoxy compound with the filler.

7. The modular concentration bowl according to claim 2, wherein the insert made of wear-resistant material is made protruding from the level of the working surface.

8. The modular concentration bowl according to claim 2, wherein at least one insert of wear-resistant material is fixed by the material of the working surface, at least on both sides.

9. The modular concentration bowl according to claim 2, wherein the inner frame of the upper part of the bowl contains ribs, and at least one insert of wear-resistant material is fixed on at least one rib.

10. The modular concentration bowl according to claim 1, wherein the inner frame of the upper part of the bowl contains ribs, and at least one reinforcing insert and at least one insert of wear-resistant material is attached to at least one rib.

11. The modular concentration bowl according to claim 1, wherein at least one insert is used to form at least one ledge close to the border of the upper and lower parts of the bowl.

12. The modular concentration bowl according to claim 1, wherein all the ledges are formed using inserts.

13. The modular concentration bowl according to claim 2, wherein the insert made of wear-resistant material is performed in the form of a set of rectangular elements in plan.

14. The modular concentration bowl according to claim 10, wherein the rib with the insert is additionally equipped with the shell.

15. The modular concentration bowl according to claim 1, wherein at least one ledge of the upper part of the concentration bowl is made with the possibility of independent replacement.

16. The modular concentration bowl according to claim 1, wherein the upper part and the lower part of the concentration bowl are made with the possibility of independent replacement.

17. The modular concentration bowl according to claim 1, wherein the upper part of the bowl is made of segments with the possibility of their independent replacement.

18. The modular concentration bowl according to claim 1, wherein the angle of inclination of the side wall of the frame to the horizontal surface ranges from 15° to 90°.

19. The modular concentration bowl according to claim 1, wherein the angle of inclination of the working surface to the horizontal surface is from 15° to 90°.

20. The modular concentration bowl of claim 1, wherein the cavities are equipped with nozzles.

21. A method of manufacture of the modular concentration bowl of the centrifugal concentrator, the method comprising:

attaching at least one insert to an inner frame of an upper part of the concentration bowl, covering the inner surface of the upper part of the concentration bowl with the a material of a working surface, attaching the lower part of the concentration bowl, wherein the upper part forms a side wall of the concentration bowl and the lower part form a bottom of the concentration bowl.

22. A method of manufacture of the modular concentration bowl of the centrifugal concentrator, wherein the inner surface of the upper part of the concentration bowl is covered with the material of the working surface, at least one ledge is attached to the inner frame of the upper part of the concentration bowl, for the formation of which at least one insert is used, is attached to the lower part of the concentration bowl.

23. A method of manufacture of the modular concentration bowl of the centrifugal concentrator, wherein the material of the working surface is mechanically removed from the inner surface of the worn upper part of the modular concentration bowl after which chemical etching of the mechanically treated surface is carried out, the surface of the ribs is restored, the inner surface of the upper part of the concentration bowl is covered with elastic material to form a working surface, at least one rib is provided with an insert of wear-resistant material, then the lower part of the concentration bowl is attached.

24. The method of manufacture of the modular concentration bowl according to claim 21, wherein, before applying the material of the working surface, at least one insert is attached to the inner frame of the upper part of the concentration bowl to form at least one ledge.

25. The method of manufacture of the modular concentration bowl according to claim 21, wherein the reinforcing insert is used as an insert.

26. The method of manufacture of the modular concentration bowl according to claim 21, wherein the insert made of wear-resistant material is used as the insert.

27. The method of manufacture of the modular concentration bowl according to claim 21, wherein at least one insert of wear-resistant material attached to at least one reinforcing insert is attached to the inner frame of the upper part of the concentration bowl.

28. The method of manufacture of the modular concentration bowl according to claim 21, wherein the ledges are made in the working surface, and cavities are made between the ledges.

29. The method of manufacturing the modular concentration bowl according to claim 28, wherein the cavities are supplied with nozzles.

30. The method of manufacture of the modular concentration bowl according to claim 21, wherein at least one insert of wear-resistant material is used to form at least one ledge close to the border of the upper and lower parts of the concentration bowl.

31. The method of manufacture of the modular concentration bowl according to claim 21, wherein the inner frame of the upper part of the concentration bowl is provided with ribs, and at least one insert of wear-resistant material is attached to the rib.

32. The method of manufacture of the modular concentration bowl according to claim 21, wherein all the ribs are provided with inserts.

33. The method of manufacture of the modular concentration bowl according to claim 32, wherein at least one rib is additionally provided with a shell, and an insert made of wear-resistant material is attached to the shell.

34. The method of manufacture of the modular concentration bowl according to claim 33, wherein at least one insert of wear-resistant material is attached to the shell using a connecting layer.

* * * * *